United States Patent
Bennett et al.

(10) Patent No.: US 8,255,413 B2
(45) Date of Patent: *Aug. 28, 2012

(54) METHOD AND APPARATUS FOR RESPONDING TO REQUEST FOR INFORMATION-PERSONALIZATION

(75) Inventors: Dominic Bennett, Los Altos, CA (US); Remigiusz K. Paczkowski, Belmont, CA (US)

(73) Assignee: Carhamm Ltd., LLC, Dover, DE (US)

( * ) Notice: Subject to any disclaimer, the term of this patent is extended or adjusted under 35 U.S.C. 154(b) by 82 days.

This patent is subject to a terminal disclaimer.

(21) Appl. No.: 11/207,590

(22) Filed: Aug. 19, 2005

(65) Prior Publication Data

US 2006/0041550 A1    Feb. 23, 2006

Related U.S. Application Data

(63) Continuation-in-part of application No. 11/015,583, filed on Dec. 17, 2004, now Pat. No. 8,078,602.

(60) Provisional application No. 60/603,140, filed on Aug. 19, 2004, provisional application No. 60/637,684, filed on Dec. 20, 2004, provisional application No. 60/660,798, filed on Mar. 11, 2005, provisional application No. 60/662,680, filed on Mar. 17, 2005.

(51) Int. Cl.
*G06F 7/00* (2006.01)
*G06F 17/30* (2006.01)

(52) U.S. Cl. ......................... 707/766; 707/770

(58) Field of Classification Search ............... 707/1–10, 707/100–104.1, 200–206, 759, 765, 766, 707/770, 796, 803; 709/217, 219
See application file for complete search history.

(56) References Cited

U.S. PATENT DOCUMENTS

| | | | |
|---|---|---|---|
| 4,455,083 A | 6/1984 | Elmes | |
| 4,575,579 A | 3/1986 | Simon et al. | |
| 4,719,567 A | 1/1988 | Whittington et al. | |
| 4,775,935 A | 10/1988 | Yourick | |

(Continued)

FOREIGN PATENT DOCUMENTS

EP     0631231     12/1994

(Continued)

OTHER PUBLICATIONS

Ling et al., Mining generalized query patterns from web logs, Jan. 3-6, 2001, IEEE, 9 pages.*

(Continued)

*Primary Examiner* — Jean B Fleurantin

(74) *Attorney, Agent, or Firm* — Brundidge & Stanger, P.C.

(57) ABSTRACT

The present invention relates to an advanced search engine. The advanced search engine may include a client component for monitoring an end-user's browsing activity, a remote server (may comprise one or more computers) for storing and processing data received from the client component, and a module that process web pages and serves search results to end-users. The advanced search engine may collect web pages for keywords of proven interest, fetch web pages requested by end-users, generate snippets or abstracts of the web pages, eliminate duplicate web pages, rank the importance of the web pages, and provide relevant web pages or links to web pages in response to an end-user search request for information regarding one or more keywords, for example. Particular aspects of the present invention are described in the claims, specification and drawings.

23 Claims, 14 Drawing Sheets

U.S. PATENT DOCUMENTS

| | | |
|---|---|---|
| 4,782,449 A | 11/1988 | Brinker et al. |
| 4,799,146 A | 1/1989 | Chauvel |
| 4,850,007 A | 7/1989 | Marino et al. |
| 4,977,594 A | 12/1990 | Shear |
| 5,027,400 A | 6/1991 | Baji et al. |
| 5,029,104 A | 7/1991 | Dodson et al. |
| 5,093,718 A | 3/1992 | Hoarty et al. |
| 5,099,420 A | 3/1992 | Barlow et al. |
| 5,105,184 A | 4/1992 | Pirani et al. |
| 5,159,669 A | 10/1992 | Trigg et al. |
| 5,165,012 A | 11/1992 | Crandall et al. |
| 5,196,838 A | 3/1993 | Meier et al. |
| 5,202,961 A | 4/1993 | Mills et al. |
| 5,220,420 A | 6/1993 | Hoarty et al. |
| 5,220,516 A | 6/1993 | Dodson et al. |
| 5,220,564 A | 6/1993 | Tuch et al. |
| 5,231,499 A | 7/1993 | Trytko |
| 5,247,517 A | 9/1993 | Ross et al. |
| 5,253,341 A | 10/1993 | Rozmanith et al. |
| 5,268,963 A | 12/1993 | Monroe et al. |
| 5,283,639 A | 2/1994 | Esch et al. |
| 5,283,731 A | 2/1994 | Lalonde et al. |
| 5,285,442 A | 2/1994 | Iwamura et al. |
| 5,297,249 A | 3/1994 | Bernstein et al. |
| 5,305,195 A | 4/1994 | Murphy |
| 5,307,456 A | 4/1994 | MacKay |
| 5,313,455 A | 5/1994 | van der Wal et al. |
| 5,315,580 A | 5/1994 | Phaal |
| 5,319,455 A | 6/1994 | Hoarty et al. |
| 5,321,740 A | 6/1994 | Gregorek et al. |
| 5,325,423 A | 6/1994 | Lewis |
| 5,325,483 A | 6/1994 | Ise et al. |
| 5,327,554 A | 7/1994 | Palazzi et al. |
| 5,333,237 A | 7/1994 | Stefanopoulos et al. |
| 5,347,632 A | 9/1994 | Filepp et al. |
| 5,355,472 A | 10/1994 | Lewis |
| 5,355,501 A | 10/1994 | Gross et al. |
| 5,361,091 A | 11/1994 | Hoarty et al. |
| 5,361,199 A | 11/1994 | Shoquist et al. |
| 5,361,393 A | 11/1994 | Rossillo |
| 5,367,621 A | 11/1994 | Cohen et al. |
| 5,373,375 A | 12/1994 | Weldy |
| 5,392,447 A | 2/1995 | Schlack et al. |
| 5,412,720 A | 5/1995 | Hoarty |
| 5,418,549 A | 5/1995 | Anderson et al. |
| 5,438,518 A | 8/1995 | Bianco et al. |
| 5,442,771 A | 8/1995 | Filepp et al. |
| 5,446,919 A | 8/1995 | Wilkins |
| 5,469,553 A | 11/1995 | Patrick |
| 5,481,741 A | 1/1996 | McKaskle et al. |
| 5,483,466 A | 1/1996 | Kawahara et al. |
| 5,491,785 A | 2/1996 | Robson et al. |
| 5,499,340 A | 3/1996 | Barritz |
| 5,500,890 A | 3/1996 | Rogge et al. |
| 5,515,098 A | 5/1996 | Carles |
| 5,515,270 A | 5/1996 | Weinblatt |
| 5,515,490 A | 5/1996 | Buchanan et al. |
| 5,517,612 A | 5/1996 | Dwin et al. |
| 5,524,195 A | 6/1996 | Clanton, III et al. |
| 5,524,197 A | 6/1996 | Uya et al. |
| 5,530,472 A | 6/1996 | Bregman et al. |
| 5,530,759 A | 6/1996 | Braudaway et al. |
| 5,530,852 A | 6/1996 | Meske et al. |
| 5,532,735 A | 7/1996 | Blahut et al. |
| 5,541,986 A | 7/1996 | Hou |
| 5,544,302 A | 8/1996 | Nguyen |
| 5,544,320 A | 8/1996 | Konrad |
| 5,548,745 A | 8/1996 | Egan et al. |
| 5,563,804 A | 10/1996 | Mortensen et al. |
| 5,564,043 A | 10/1996 | Siefert |
| 5,572,643 A | 11/1996 | Judson |
| 5,579,381 A | 11/1996 | Courville et al. |
| 5,583,560 A | 12/1996 | Florin et al. |
| 5,583,763 A | 12/1996 | Atcheson et al. |
| 5,584,025 A | 12/1996 | Keithley et al. |
| 5,590,046 A | 12/1996 | Anderson et al. |
| 5,594,509 A | 1/1997 | Florin et al. |
| 5,594,779 A | 1/1997 | Goodman |
| 5,596,718 A | 1/1997 | Boebert et al. |
| 5,602,905 A | 2/1997 | Mettke |
| 5,604,542 A | 2/1997 | Dedrick |
| 5,606,359 A | 2/1997 | Youden et al. |
| 5,608,850 A | 3/1997 | Robertson |
| 5,615,131 A | 3/1997 | Mortensen et al. |
| 5,615,325 A | 3/1997 | Peden |
| 5,617,526 A | 4/1997 | Oran et al. |
| 5,621,456 A | 4/1997 | Florin et al. |
| 5,627,886 A | 5/1997 | Bowman |
| 5,629,978 A | 5/1997 | Blumhardt et al. |
| 5,630,081 A | 5/1997 | Rybicki et al. |
| 5,635,979 A | 6/1997 | Kostreski et al. |
| 5,638,443 A | 6/1997 | Stefik et al. |
| 5,642,484 A | 6/1997 | Harrison, III et al. |
| 5,649,186 A | 7/1997 | Ferguson |
| 5,657,450 A | 8/1997 | Rao et al. |
| 5,664,948 A | 9/1997 | Dimitriadis et al. |
| 5,673,322 A | 9/1997 | Pepe et al. |
| 5,675,510 A | 10/1997 | Coffey et al. |
| 5,680,562 A | 10/1997 | Conrad et al. |
| 5,682,525 A | 10/1997 | Bouve et al. |
| 5,684,715 A | 11/1997 | Palmer |
| 5,684,969 A | 11/1997 | Ishida |
| 5,701,451 A | 12/1997 | Rogers et al. |
| 5,704,017 A | 12/1997 | Heckerman et al. |
| 5,706,434 A | 1/1998 | Kremen et al. |
| 5,706,502 A | 1/1998 | Foley et al. |
| 5,708,709 A | 1/1998 | Rose |
| 5,708,780 A | 1/1998 | Levergood et al. |
| 5,710,884 A | 1/1998 | Dedrick |
| 5,710,918 A | 1/1998 | Lagarde et al. |
| 5,712,979 A | 1/1998 | Graber et al. |
| 5,715,453 A | 2/1998 | Stewart |
| 5,717,860 A | 2/1998 | Graber et al. |
| 5,717,923 A | 2/1998 | Dedrick |
| 5,721,827 A | 2/1998 | Logan et al. |
| 5,721,908 A | 2/1998 | Lagarde et al. |
| 5,724,521 A | 3/1998 | Dedrick |
| 5,724,556 A | 3/1998 | Souder et al. |
| 5,724,567 A | 3/1998 | Rose et al. |
| 5,727,129 A | 3/1998 | Barrett et al. |
| 5,727,159 A | 3/1998 | Kikinis |
| 5,734,863 A | 3/1998 | Kodosky et al. |
| 5,737,619 A | 4/1998 | Judson |
| 5,737,739 A | 4/1998 | Shirley et al. |
| 5,740,252 A | 4/1998 | Minor et al. |
| 5,740,549 A | 4/1998 | Reilly et al. |
| 5,742,768 A | 4/1998 | Gennaro et al. |
| 5,742,905 A | 4/1998 | Pepe et al. |
| 5,745,681 A | 4/1998 | Levine et al. |
| 5,751,956 A | 5/1998 | Kirsch |
| 5,754,830 A | 5/1998 | Butts et al. |
| 5,754,938 A | 5/1998 | Herz et al. |
| 5,754,939 A | 5/1998 | Herz et al. |
| 5,758,111 A | 5/1998 | Shiratori et al. |
| 5,758,257 A | 5/1998 | Herz et al. |
| 5,760,767 A | 6/1998 | Shore et al. |
| 5,761,601 A | 6/1998 | Nemirofsky et al. |
| 5,761,662 A | 6/1998 | Dasan |
| 5,768,508 A | 6/1998 | Eikeland |
| 5,768,510 A | 6/1998 | Gish |
| 5,781,894 A | 7/1998 | Petrecca et al. |
| 5,787,253 A | 7/1998 | McCreery et al. |
| 5,787,254 A | 7/1998 | Maddalozzo, Jr. et al. |
| 5,793,972 A | 8/1998 | Shane |
| 5,794,210 A | 8/1998 | Goldhaber et al. |
| 5,794,259 A | 8/1998 | Kikinis |
| 5,796,952 A | 8/1998 | Davis et al. |
| 5,801,685 A | 9/1998 | Miller et al. |
| 5,802,320 A | 9/1998 | Baehr et al. |
| 5,805,735 A | 9/1998 | Chen et al. |
| 5,805,815 A | 9/1998 | Hill |
| 5,809,242 A | 9/1998 | Shaw et al. |
| 5,809,481 A | 9/1998 | Baron et al. |
| 5,809,512 A | 9/1998 | Kato |
| 5,812,642 A | 9/1998 | Leroy |
| 5,812,769 A | 9/1998 | Graber et al. |
| 5,819,047 A | 10/1998 | Bauer et al. |

| | | |
|---|---|---|
| 5,819,092 A | 10/1998 | Ferguson et al. |
| 5,822,526 A | 10/1998 | Waskiewicz |
| 5,832,502 A | 11/1998 | Durham et al. |
| 5,835,087 A | 11/1998 | Herz et al. |
| 5,835,092 A | 11/1998 | Boudreau et al. |
| 5,835,722 A | 11/1998 | Bradshaw et al. |
| 5,838,458 A | 11/1998 | Tsai |
| 5,848,246 A | 12/1998 | Gish |
| 5,848,396 A | 12/1998 | Gerace |
| 5,848,397 A | 12/1998 | Marsh et al. |
| 5,850,352 A | 12/1998 | Moezzi et al. |
| 5,850,433 A | 12/1998 | Rondeau |
| 5,854,897 A | 12/1998 | Radziewicz et al. |
| 5,855,008 A | 12/1998 | Goldhaber et al. |
| 5,861,880 A | 1/1999 | Shimizu et al. |
| 5,861,883 A | 1/1999 | Cuomo et al. |
| 5,862,260 A | 1/1999 | Rhoads |
| 5,862,325 A | 1/1999 | Reed et al. |
| 5,864,823 A | 1/1999 | Levitan |
| 5,870,769 A | 2/1999 | Freund |
| 5,872,850 A | 2/1999 | Klein et al. |
| 5,875,296 A | 2/1999 | Shi et al. |
| 5,877,766 A | 3/1999 | Bates et al. |
| 5,878,231 A | 3/1999 | Baehr et al. |
| 5,883,955 A | 3/1999 | Ronning |
| 5,884,025 A | 3/1999 | Baehr et al. |
| 5,886,683 A | 3/1999 | Tognazzini et al. |
| 5,887,133 A | 3/1999 | Brown et al. |
| 5,890,152 A | 3/1999 | Rapaport et al. |
| 5,892,917 A | 4/1999 | Myerson |
| 5,893,053 A | 4/1999 | Trueblood |
| 5,893,118 A | 4/1999 | Sonderegger |
| 5,894,554 A | 4/1999 | Lowery et al. |
| 5,897,622 A | 4/1999 | Blinn et al. |
| 5,898,434 A | 4/1999 | Small et al. |
| 5,901,287 A | 5/1999 | Bull et al. |
| 5,903,892 A | 5/1999 | Hoffert et al. |
| 5,905,492 A | 5/1999 | Straub et al. |
| 5,905,800 A | 5/1999 | Moskowitz et al. |
| 5,907,838 A | 5/1999 | Miyasaka et al. |
| 5,913,040 A | 6/1999 | Rakavy et al. |
| 5,918,012 A | 6/1999 | Astiz et al. |
| 5,918,013 A | 6/1999 | Mighdoll et al. |
| 5,918,014 A | 6/1999 | Robinson |
| 5,918,214 A | 6/1999 | Perkowski |
| 5,920,697 A | 7/1999 | Masters et al. |
| 5,923,845 A | 7/1999 | Kamiya et al. |
| 5,923,853 A | 7/1999 | Danneels |
| 5,929,850 A | 7/1999 | Broadwin et al. |
| 5,930,446 A | 7/1999 | Kanda |
| 5,930,700 A | 7/1999 | Pepper et al. |
| 5,930,801 A | 7/1999 | Falkenhainer et al. |
| 5,931,901 A | 8/1999 | Wolfe et al. |
| 5,931,907 A | 8/1999 | Davies et al. |
| 5,933,811 A | 8/1999 | Angles et al. |
| 5,933,832 A | 8/1999 | Suzuoka et al. |
| 5,936,679 A | 8/1999 | Kasahara et al. |
| 5,937,037 A | 8/1999 | Kamel et al. |
| 5,937,390 A | 8/1999 | Hyodo |
| 5,937,392 A | 8/1999 | Alberts |
| 5,937,411 A | 8/1999 | Becker |
| 5,943,478 A | 8/1999 | Aggarwal et al. |
| 5,944,791 A | 8/1999 | Scherpbier |
| 5,946,646 A | 8/1999 | Schena et al. |
| 5,946,664 A | 8/1999 | Ebisawa |
| 5,946,697 A | 8/1999 | Shen |
| 5,948,061 A | 9/1999 | Merriman et al. |
| 5,951,300 A | 9/1999 | Brown |
| 5,956,693 A | 9/1999 | Geerlings |
| 5,956,716 A | 9/1999 | Kenner et al. |
| 5,958,008 A | 9/1999 | Pogrebisky et al. |
| 5,958,015 A | 9/1999 | Dascalu |
| 5,959,621 A | 9/1999 | Nawaz et al. |
| 5,959,623 A | 9/1999 | van Hoff et al. |
| 5,960,409 A | 9/1999 | Wexler |
| 5,961,593 A | 10/1999 | Gabber et al. |
| 5,961,602 A | 10/1999 | Thompson et al. |
| 5,961,603 A | 10/1999 | Kunkel et al. |
| 5,963,909 A | 10/1999 | Warren et al. |
| 5,963,915 A | 10/1999 | Kirsch |
| 5,966,121 A | 10/1999 | Hubbell et al. |
| 5,970,473 A | 10/1999 | Gerszber et al. |
| 5,974,219 A | 10/1999 | Fujita et al. |
| 5,974,451 A | 10/1999 | Simmons |
| 5,978,807 A | 11/1999 | Mano et al. |
| 5,978,833 A | 11/1999 | Pashley et al. |
| 5,978,836 A | 11/1999 | Ouchi |
| 5,978,841 A | 11/1999 | Berger |
| 5,978,842 A | 11/1999 | Noble et al. |
| 5,983,227 A | 11/1999 | Nazem et al. |
| 5,983,244 A | 11/1999 | Nation |
| 5,983,268 A | 11/1999 | Freivald et al. |
| 5,987,466 A | 11/1999 | Greer et al. |
| 5,987,606 A | 11/1999 | Cirasole et al. |
| 5,991,735 A | 11/1999 | Gerace |
| 5,991,799 A | 11/1999 | Yen et al. |
| 5,995,597 A | 11/1999 | Woltz et al. |
| 5,995,943 A | 11/1999 | Bull et al. |
| 5,996,007 A | 11/1999 | Klug et al. |
| 5,996,011 A | 11/1999 | Humes |
| 5,999,526 A | 12/1999 | Garland et al. |
| 5,999,731 A | 12/1999 | Yellin et al. |
| 5,999,740 A | 12/1999 | Rowley |
| 5,999,912 A | 12/1999 | Wodarz et al. |
| 6,002,401 A | 12/1999 | Baker |
| 6,006,241 A | 12/1999 | Purnaveja et al. |
| 6,006,252 A | 12/1999 | Wolfe |
| 6,006,265 A | 12/1999 | Rangan et al. |
| 6,009,236 A | 12/1999 | Mishima et al. |
| 6,009,409 A | 12/1999 | Adler et al. |
| 6,009,410 A | 12/1999 | LeMole et al. |
| 6,011,537 A | 1/2000 | Slotznick |
| 6,012,083 A | 1/2000 | Savitzky et al. |
| 6,014,502 A | 1/2000 | Moraes |
| 6,014,638 A | 1/2000 | Burge et al. |
| 6,014,698 A | 1/2000 | Griffiths |
| 6,014,711 A | 1/2000 | Brown |
| 6,016,509 A | 1/2000 | Dedrick |
| 6,020,884 A | 2/2000 | MacNaughton et al. |
| 6,023,726 A | 2/2000 | Saksena |
| 6,025,837 A | 2/2000 | Matthews, III et al. |
| 6,025,886 A | 2/2000 | Koda |
| 6,026,368 A | 2/2000 | Brown et al. |
| 6,026,413 A | 2/2000 | Challenger et al. |
| 6,026,433 A | 2/2000 | D'Arlach et al. |
| 6,026,933 A | 2/2000 | King et al. |
| 6,029,045 A | 2/2000 | Picco et al. |
| 6,029,141 A | 2/2000 | Bezos et al. |
| 6,029,145 A | 2/2000 | Barritz |
| 6,029,182 A | 2/2000 | Nehab et al. |
| 6,029,195 A | 2/2000 | Herz |
| 6,035,332 A | 3/2000 | Ingrassia, Jr. et al. |
| 6,047,318 A | 4/2000 | Becker et al. |
| 6,047,327 A | 4/2000 | Tso et al. |
| 6,049,821 A | 4/2000 | Theriault et al. |
| 6,052,709 A | 4/2000 | Paul |
| 6,052,717 A | 4/2000 | Reynolds et al. |
| 6,052,730 A | 4/2000 | Felciano et al. |
| 6,055,572 A | 4/2000 | Saksena |
| 6,058,141 A | 5/2000 | Barger et al. |
| 6,061,054 A | 5/2000 | Jolly |
| 6,061,659 A | 5/2000 | Murray |
| 6,061,716 A | 5/2000 | Moncreiff |
| 6,065,024 A | 5/2000 | Renshaw |
| 6,065,056 A | 5/2000 | Bradshaw et al. |
| 6,067,559 A | 5/2000 | Allard et al. |
| 6,067,561 A | 5/2000 | Dillon |
| 6,067,565 A | 5/2000 | Horvitz |
| 6,070,140 A | 5/2000 | Tran |
| 6,073,105 A | 6/2000 | Sutcliffe et al. |
| 6,073,167 A | 6/2000 | Poulton et al. |
| 6,073,241 A | 6/2000 | Rosenberg et al. |
| 6,076,166 A | 6/2000 | Moshfeghi et al. |
| 6,078,916 A | 6/2000 | Culliss |
| 6,081,840 A | 6/2000 | Zhao |
| 6,084,581 A | 7/2000 | Hunt |
| 6,085,193 A | 7/2000 | Malkin et al. |
| 6,085,226 A | 7/2000 | Horvitz |

| | | |
|---|---|---|
| 6,085,242 A | 7/2000 | Chandra |
| 6,088,731 A | 7/2000 | Kiraly et al. |
| 6,091,411 A | 7/2000 | Straub et al. |
| 6,092,196 A | 7/2000 | Reiche |
| 6,094,655 A | 7/2000 | Rogers et al. |
| 6,094,677 A | 7/2000 | Capek et al. |
| 6,098,064 A | 8/2000 | Pirolli et al. |
| 6,098,065 A | 8/2000 | Skillen et al. |
| 6,101,510 A | 8/2000 | Stone et al. |
| 6,108,637 A | 8/2000 | Blumenau |
| 6,108,691 A | 8/2000 | Lee et al. |
| 6,108,799 A | 8/2000 | Boulay et al. |
| 6,112,215 A | 8/2000 | Kaply |
| 6,112,246 A | 8/2000 | Horbal et al. |
| 6,115,680 A | 9/2000 | Coffee et al. |
| 6,119,098 A | 9/2000 | Guyot et al. |
| 6,119,165 A | 9/2000 | Li et al. |
| 6,122,632 A | 9/2000 | Botts et al. |
| 6,125,388 A | 9/2000 | Reisman |
| 6,128,655 A | 10/2000 | Fields et al. |
| 6,128,663 A | 10/2000 | Thomas |
| 6,133,912 A | 10/2000 | Montero |
| 6,133,918 A | 10/2000 | Conrad et al. |
| 6,134,380 A | 10/2000 | Kushizaki |
| 6,134,532 A | 10/2000 | Lazarus et al. |
| 6,138,146 A | 10/2000 | Moon et al. |
| 6,138,155 A | 10/2000 | Davis et al. |
| 6,141,010 A | 10/2000 | Hoyle |
| 6,144,944 A | 11/2000 | Kurtzman et al. |
| 6,151,596 A | 11/2000 | Hosomi |
| 6,154,738 A | 11/2000 | Call |
| 6,154,771 A | 11/2000 | Rangan et al. |
| 6,157,924 A | 12/2000 | Austin |
| 6,157,946 A | 12/2000 | Itakura et al. |
| 6,161,112 A | 12/2000 | Cragun et al. |
| 6,163,778 A | 12/2000 | Fogg et al. |
| 6,167,438 A | 12/2000 | Yates et al. |
| 6,167,453 A | 12/2000 | Becker et al. |
| 6,178,443 B1 | 1/2001 | Lin |
| 6,178,461 B1 | 1/2001 | Chan et al. |
| 6,182,066 B1 | 1/2001 | Marques |
| 6,182,097 B1 | 1/2001 | Hansen et al. |
| 6,182,122 B1 | 1/2001 | Berstis |
| 6,182,133 B1 | 1/2001 | Horvitz |
| 6,183,366 B1 | 2/2001 | Goldberg et al. |
| 6,185,558 B1 | 2/2001 | Bowman et al. |
| 6,185,586 B1 | 2/2001 | Judson |
| 6,185,614 B1 | 2/2001 | Cuomo et al. |
| 6,191,782 B1 | 2/2001 | Mori et al. |
| 6,192,380 B1 | 2/2001 | Light et al. |
| 6,195,622 B1 | 2/2001 | Altschuler et al. |
| 6,198,906 B1 | 3/2001 | Boetje et al. |
| 6,199,079 B1 | 3/2001 | Gupta et al. |
| 6,202,093 B1 | 3/2001 | Bolam et al. |
| 6,204,840 B1 | 3/2001 | Petelycky et al. |
| 6,208,339 B1 | 3/2001 | Atlas et al. |
| 6,216,141 B1 | 4/2001 | Straub et al. |
| 6,216,212 B1 | 4/2001 | Challenger et al. |
| 6,219,676 B1 | 4/2001 | Reiner |
| 6,222,520 B1 | 4/2001 | Gerszberg et al. |
| 6,223,215 B1 | 4/2001 | Hunt et al. |
| 6,233,564 B1 | 5/2001 | Schulze, Jr. |
| 6,237,022 B1 | 5/2001 | Bruck et al. |
| 6,249,284 B1 | 6/2001 | Bogdan |
| 6,253,188 B1 | 6/2001 | Witek et al. |
| 6,253,208 B1 | 6/2001 | Wittgreffe et al. |
| 6,266,058 B1 | 7/2001 | Meyer |
| 6,269,361 B1 | 7/2001 | Davis et al. |
| 6,275,854 B1 | 8/2001 | Himmel et al. |
| 6,279,112 B1 | 8/2001 | O'Toole, Jr. et al. |
| 6,280,043 B1 | 8/2001 | Ohkawa |
| 6,285,987 B1 | 9/2001 | Roth et al. |
| 6,286,043 B1 | 9/2001 | Cuomo et al. |
| 6,286,045 B1 | 9/2001 | Griffiths et al. |
| 6,295,061 B1 | 9/2001 | Park et al. |
| 6,297,819 B1 | 10/2001 | Furst |
| 6,304,844 B1 | 10/2001 | Pan et al. |
| 6,308,202 B1 | 10/2001 | Cohn et al. |
| 6,311,194 B1 | 10/2001 | Sheth et al. |
| 6,314,451 B1 | 11/2001 | Landsman et al. |
| 6,314,457 B1 | 11/2001 | Schema et al. |
| 6,317,761 B1 | 11/2001 | Landsman et al. |
| 6,321,209 B1 | 11/2001 | Pasquali |
| 6,321,256 B1 | 11/2001 | Himmel et al. |
| 6,324,553 B1 | 11/2001 | Cragun et al. |
| 6,324,569 B1 | 11/2001 | Ogilvie et al. |
| 6,324,583 B1 | 11/2001 | Stevens |
| 6,327,574 B1 | 12/2001 | Kramer et al. |
| 6,327,617 B1 | 12/2001 | Fawcett |
| 6,332,127 B1 | 12/2001 | Bandera |
| 6,334,111 B1 | 12/2001 | Carrott |
| 6,335,963 B1 | 1/2002 | Bosco |
| 6,336,131 B1 | 1/2002 | Wolfe |
| 6,338,059 B1 | 1/2002 | Fields et al. |
| 6,338,066 B1 | 1/2002 | Martin et al. |
| 6,341,305 B2 | 1/2002 | Wolfe |
| 6,347,398 B1 | 2/2002 | Parthasarathy et al. |
| 6,351,279 B1 | 2/2002 | Sawyer |
| 6,351,745 B1 | 2/2002 | Itakura et al. |
| 6,353,834 B1 | 3/2002 | Wong et al. |
| 6,356,898 B2 | 3/2002 | Cohen et al. |
| 6,356,908 B1 | 3/2002 | Brown et al. |
| 6,360,221 B1 | 3/2002 | Gough et al. |
| 6,366,298 B1 | 4/2002 | Haitsuka et al. |
| 6,370,527 B1 | 4/2002 | Singhal |
| 6,377,983 B1 | 4/2002 | Cohen et al. |
| 6,378,075 B1 | 4/2002 | Goldstein et al. |
| 6,381,735 B1 | 4/2002 | Hunt |
| 6,381,742 B2 | 4/2002 | Forbes et al. |
| 6,385,592 B1 | 5/2002 | Angles et al. |
| 6,392,668 B1 | 5/2002 | Murray |
| 6,393,407 B1 | 5/2002 | Middleton et al. |
| 6,393,415 B1 | 5/2002 | Getchius et al. |
| 6,397,228 B1 | 5/2002 | Lamburt et al. |
| 6,401,075 B1 | 6/2002 | Mason et al. |
| 6,415,322 B1 | 7/2002 | Jaye |
| 6,418,440 B1 | 7/2002 | Kuo et al. |
| 6,418,471 B1 | 7/2002 | Shelton et al. |
| 6,421,675 B1 | 7/2002 | Ryan et al. |
| 6,421,724 B1 | 7/2002 | Nickerson et al. |
| 6,421,729 B1 | 7/2002 | Paltenghe et al. |
| 6,434,745 B1 | 8/2002 | Conley, Jr. et al. |
| 6,437,802 B1 | 8/2002 | Kenny |
| 6,438,215 B1 | 8/2002 | Skladman et al. |
| 6,438,578 B1 | 8/2002 | Schmid et al. |
| 6,438,579 B1 | 8/2002 | Hosken |
| 6,441,832 B1 | 8/2002 | Tao et al. |
| 6,442,529 B1 | 8/2002 | Krishan et al. |
| 6,446,128 B1 | 9/2002 | Woods et al. |
| 6,449,657 B2 | 9/2002 | Stanbach, Jr. et al. |
| 6,452,612 B1 | 9/2002 | Holtz et al. |
| 6,457,009 B1 | 9/2002 | Bollay |
| 6,459,440 B1 | 10/2002 | Monnes et al. |
| 6,460,036 B1 | 10/2002 | Herz |
| 6,460,042 B1 | 10/2002 | Hitchcock et al. |
| 6,460,060 B1 | 10/2002 | Maddalozzo et al. |
| 6,466,970 B1 | 10/2002 | Lee et al. |
| 6,477,550 B1 | 11/2002 | Balasubramaniam et al. |
| 6,477,575 B1 | 11/2002 | Koeppel et al. |
| 6,480,837 B1 * | 11/2002 | Dutta ................ 707/3 |
| 6,484,148 B1 | 11/2002 | Boyd |
| 6,487,538 B1 | 11/2002 | Gupta et al. |
| 6,490,722 B1 | 12/2002 | Barton et al. |
| 6,493,702 B1 | 12/2002 | Adar et al. |
| 6,496,931 B1 | 12/2002 | Rajchel et al. |
| 6,499,052 B1 | 12/2002 | Hoang et al. |
| 6,502,076 B1 | 12/2002 | Smith |
| 6,505,201 B1 | 1/2003 | Haitsuka |
| 6,513,052 B1 | 1/2003 | Binder |
| 6,513,060 B1 | 1/2003 | Nixon et al. |
| 6,516,312 B1 | 2/2003 | Kraft et al. |
| 6,523,021 B1 | 2/2003 | Monberg et al. |
| 6,526,411 B1 | 2/2003 | Ward |
| 6,529,903 B2 | 3/2003 | Smith et al. |
| 6,539,375 B2 | 3/2003 | Kawasaki et al. |
| 6,539,424 B1 | 3/2003 | Dutta |
| 6,564,202 B1 | 5/2003 | Schuetze et al. |
| 6,567,850 B1 | 5/2003 | Freishtat et al. |

| | | |
|---|---|---|
| 6,567,854 B1 | 5/2003 | Olshansky et al. |
| 6,570,595 B2 | 5/2003 | Porter |
| 6,572,662 B2 | 6/2003 | Manohar et al. |
| 6,584,479 B2 | 6/2003 | Chang et al. |
| 6,584,492 B1 | 6/2003 | Cezar et al. |
| 6,584,505 B1 | 6/2003 | Howard et al. |
| 6,594,654 B1 | 7/2003 | Salam et al. |
| 6,601,041 B1 | 7/2003 | Brown et al. |
| 6,601,057 B1 | 7/2003 | Underwood et al. |
| 6,601,100 B2 | 7/2003 | Lee et al. |
| 6,604,103 B1 | 8/2003 | Wolfe |
| 6,606,652 B1 | 8/2003 | Cohn et al. |
| 6,615,247 B1 | 9/2003 | Murphy |
| 6,622,168 B1 | 9/2003 | Datta |
| 6,631,360 B1 | 10/2003 | Cook |
| 6,642,944 B2 | 11/2003 | Conrad et al. |
| 6,643,696 B2 | 11/2003 | Davis et al. |
| 6,665,656 B1 | 12/2003 | Carter |
| 6,665,838 B1 | 12/2003 | Brown et al. |
| 6,678,731 B1 | 1/2004 | Howard et al. |
| 6,678,866 B1 | 1/2004 | Sugimoto et al. |
| 6,681,223 B1 | 1/2004 | Sundaresan |
| 6,681,247 B1 | 1/2004 | Payton |
| 6,686,931 B1 | 2/2004 | Bodnar |
| 6,687,737 B2 | 2/2004 | Landsman et al. |
| 6,691,106 B1 | 2/2004 | Sathyanarayan |
| 6,697,825 B1 | 2/2004 | Underwood et al. |
| 6,701,362 B1 | 3/2004 | Subramonian |
| 6,701,363 B1 | 3/2004 | Chiu et al. |
| 6,714,975 B1 | 3/2004 | Aggarwal et al. |
| 6,718,365 B1 | 4/2004 | Dutta |
| 6,721,741 B1 | 4/2004 | Eyal et al. |
| 6,721,795 B1 | 4/2004 | Eldreth |
| 6,725,269 B1 | 4/2004 | Megiddo |
| 6,725,303 B1 | 4/2004 | Hoguta et al. |
| 6,741,967 B1 | 5/2004 | Wu et al. |
| 6,757,661 B1 | 6/2004 | Blaser et al. |
| 6,760,746 B1 | 7/2004 | Schneider |
| 6,760,916 B2 | 7/2004 | Holtz et al. |
| 6,763,379 B1 | 7/2004 | Shuster |
| 6,763,386 B2 | 7/2004 | Davis et al. |
| 6,771,290 B1 | 8/2004 | Hoyle |
| 6,772,200 B1 | 8/2004 | Bakshi et al. |
| 6,785,659 B1 | 8/2004 | Landsman et al. |
| 6,785,723 B1 | 8/2004 | Genty et al. |
| 6,801,906 B1 | 10/2004 | Bates et al. |
| 6,801,909 B2 | 10/2004 | Delgado et al. |
| 6,826,534 B1 | 11/2004 | Gupta et al. |
| 6,826,546 B1 | 11/2004 | Shuster |
| 6,827,669 B2 | 12/2004 | Cohen et al. |
| 6,847,969 B1 | 1/2005 | Mathai et al. |
| 6,848,004 B1 | 1/2005 | Chang et al. |
| 6,850,967 B1 | 2/2005 | Spencer et al. |
| 6,853,982 B2 | 2/2005 | Smith et al. |
| 6,857,024 B1 | 2/2005 | Chen et al. |
| 6,874,018 B2 | 3/2005 | Wu |
| 6,877,027 B1 | 4/2005 | Spencer et al. |
| 6,880,123 B1 | 4/2005 | Landsman |
| 6,882,981 B2 | 4/2005 | Philippe et al. |
| 6,892,181 B1 | 5/2005 | Megiddo et al. |
| 6,892,223 B1 | 5/2005 | Kawabata et al. |
| 6,892,226 B1 | 5/2005 | Tso et al. |
| 6,892,354 B1 | 5/2005 | Servan-Schreiber et al. |
| 6,904,408 B1 | 6/2005 | McCarthy et al. |
| 6,910,179 B1 | 6/2005 | Pennell et al. |
| 6,934,736 B2 | 8/2005 | Sears et al. |
| 6,938,027 B1 | 8/2005 | Barritz |
| 6,957,390 B2 | 10/2005 | Tamir et al. |
| 6,958,759 B2 | 10/2005 | Safadi et al. |
| 6,968,507 B2 | 11/2005 | Pennell et al. |
| 6,973,478 B1 | 12/2005 | Ketonen et al. |
| 6,976,053 B1 | 12/2005 | Tripp et al. |
| 6,976,090 B2 | 12/2005 | Ben-Shaul et al. |
| 6,990,633 B1 | 1/2006 | Miyasaka |
| 6,993,532 B1 | 1/2006 | Platt et al. |
| 7,003,734 B1 | 2/2006 | Gardner et al. |
| 7,016,887 B2 | 3/2006 | Stockfisch |
| 7,039,599 B2 | 5/2006 | Merriman et al. |
| 7,043,526 B1 | 5/2006 | Wolfe |
| 7,051,084 B1 | 5/2006 | Hayton et al. |
| 7,054,900 B1 | 5/2006 | Goldston |
| 7,065,550 B2 | 6/2006 | Raghunandan |
| 7,069,515 B1 | 6/2006 | Eagle et al. |
| 7,076,546 B1 | 7/2006 | Bates et al. |
| 7,085,682 B1 | 8/2006 | Heller et al. |
| 7,100,111 B2 | 8/2006 | McElfresh et al. |
| 7,133,924 B1 | 11/2006 | Rosenberg et al. |
| 7,136,875 B2 | 11/2006 | Anderson et al. |
| 7,149,791 B2 | 12/2006 | Sears et al. |
| 7,155,729 B1 | 12/2006 | Andrew et al. |
| 7,162,739 B2 | 1/2007 | Cowden et al. |
| 7,181,415 B2 | 2/2007 | Blaser et al. |
| 7,181,488 B2 | 2/2007 | Martin et al. |
| 7,194,425 B2 | 3/2007 | Nyhan |
| 7,254,547 B1 | 8/2007 | Beck et al. |
| 7,283,992 B2 | 10/2007 | Liu et al. |
| 7,346,606 B2 | 3/2008 | Bharat |
| 7,349,827 B1 | 3/2008 | Heller et al. |
| 7,363,291 B1 | 4/2008 | Page |
| 7,421,432 B1 | 9/2008 | Hoelzle et al. |
| 7,424,708 B2 | 9/2008 | Andersson et al. |
| 7,451,065 B2 | 11/2008 | Pednault et al. |
| 7,454,364 B2 | 11/2008 | Shkedi |
| 7,464,155 B2 | 12/2008 | Mousavi et al. |
| 7,512,603 B1 | 3/2009 | Veteska et al. |
| 7,630,986 B1 | 12/2009 | Herz |
| 7,743,340 B2 | 6/2010 | Horvitz et al. |
| 7,844,488 B2 | 11/2010 | Merriman et al. |
| 2001/0011226 A1 | 8/2001 | Greer et al. |
| 2001/0029527 A1 | 10/2001 | Goshen |
| 2001/0030970 A1 | 10/2001 | Wiryaman et al. |
| 2001/0032115 A1 | 10/2001 | Goldstein |
| 2001/0037240 A1 | 11/2001 | Marks et al. |
| 2001/0037325 A1 | 11/2001 | Biderman et al. |
| 2001/0037488 A1 | 11/2001 | Lee |
| 2001/0044795 A1 | 11/2001 | Cohen et al. |
| 2001/0047354 A1 | 11/2001 | Davis et al. |
| 2001/0049320 A1 | 12/2001 | Cohen et al. |
| 2001/0049321 A1 | 12/2001 | Cohen et al. |
| 2001/0049620 A1 | 12/2001 | Blasko |
| 2001/0049716 A1 | 12/2001 | Wolfe |
| 2001/0051559 A1 | 12/2001 | Cohen et al. |
| 2001/0053735 A1 | 12/2001 | Cohen et al. |
| 2001/0054020 A1 | 12/2001 | Barth et al. |
| 2002/0002483 A1 | 1/2002 | Siegel et al. |
| 2002/0002538 A1 | 1/2002 | Ling |
| 2002/0004754 A1 | 1/2002 | Gardenswartz |
| 2002/0007307 A1 | 1/2002 | Miller |
| 2002/0007309 A1 | 1/2002 | Reynar |
| 2002/0007317 A1 | 1/2002 | Callaghan et al. |
| 2002/0008703 A1 | 1/2002 | Merrill et al. |
| 2002/0010626 A1 | 1/2002 | Agmoni |
| 2002/0010757 A1 | 1/2002 | Granik et al. |
| 2002/0010776 A1 | 1/2002 | Lerner |
| 2002/0016736 A1 | 2/2002 | Cannon et al. |
| 2002/0019763 A1 | 2/2002 | Linden et al. |
| 2002/0019834 A1 | 2/2002 | Vilcauskas, Jr. et al. |
| 2002/0023159 A1 | 2/2002 | Vange et al. |
| 2002/0026390 A1 | 2/2002 | Ulenas et al. |
| 2002/0032592 A1 | 3/2002 | Krasnick et al. |
| 2002/0035568 A1 | 3/2002 | Benthin |
| 2002/0038363 A1 | 3/2002 | MacLean |
| 2002/0040374 A1 | 4/2002 | Kent |
| 2002/0042750 A1 | 4/2002 | Morrison |
| 2002/0046099 A1 | 4/2002 | Frengut et al. |
| 2002/0049633 A1 | 4/2002 | Pasquali |
| 2002/0052785 A1 | 5/2002 | Tenenbaum |
| 2002/0052925 A1 | 5/2002 | Kim et al. |
| 2002/0053078 A1 | 5/2002 | Holtz et al. |
| 2002/0054089 A1 | 5/2002 | Nicholas |
| 2002/0055912 A1 | 5/2002 | Buck |
| 2002/0057285 A1 | 5/2002 | Nicholas, III |
| 2002/0059094 A1 | 5/2002 | Hosea et al. |
| 2002/0059099 A1 | 5/2002 | Coletta |
| 2002/0065802 A1 | 5/2002 | Uchiyama |
| 2002/0068500 A1 | 6/2002 | Gabai et al. |
| 2002/0069105 A1 | 6/2002 | do Rosario Botelho et al. |
| 2002/0073079 A1 | 6/2002 | Terheggen |

| | | |
|---|---|---|
| 2002/0077219 A1 | 6/2002 | Cohen et al. |
| 2002/0078076 A1 | 6/2002 | Evans |
| 2002/0078192 A1 | 6/2002 | Kopsell et al. |
| 2002/0087499 A1 | 7/2002 | Stockfisch |
| 2002/0087621 A1 | 7/2002 | Hendriks |
| 2002/0091700 A1 | 7/2002 | Steele et al. |
| 2002/0091875 A1 | 7/2002 | Fujiwara et al. |
| 2002/0094868 A1 | 7/2002 | Tuck et al. |
| 2002/0099605 A1 | 7/2002 | Weitzman et al. |
| 2002/0099767 A1 | 7/2002 | Cohen et al. |
| 2002/0099812 A1 | 7/2002 | Davis et al. |
| 2002/0099824 A1 | 7/2002 | Bender et al. |
| 2002/0103811 A1 | 8/2002 | Fankhauser et al. |
| 2002/0107847 A1 | 8/2002 | Johnson |
| 2002/0107858 A1 | 8/2002 | Lundahl et al. |
| 2002/0111910 A1 | 8/2002 | Walsh |
| 2002/0111994 A1 | 8/2002 | Raghunandan |
| 2002/0112035 A1 | 8/2002 | Carey et al. |
| 2002/0112048 A1 | 8/2002 | Gruyer et al. |
| 2002/0116494 A1 | 8/2002 | Kocol |
| 2002/0120648 A1 | 8/2002 | Ball et al. |
| 0200/2122065 | 9/2002 | Segal et al. |
| 2002/0123912 A1 | 9/2002 | Subramanian et al. |
| 2002/0128904 A1 | 9/2002 | Carruthers et al. |
| 2002/0128908 A1 | 9/2002 | Levin et al. |
| 2002/0128925 A1 | 9/2002 | Angeles |
| 2002/0152121 A1 | 10/2002 | Hiroshi |
| 2002/0152126 A1 | 10/2002 | Lieu et al. |
| 2002/0152222 A1 | 10/2002 | Holbrook |
| 2002/0154163 A1 | 10/2002 | Melchner |
| 2002/0156781 A1 | 10/2002 | Cordray et al. |
| 2002/0156812 A1 | 10/2002 | Krasnoiarov et al. |
| 2002/0169670 A1 | 11/2002 | Barsade et al. |
| 2002/0169762 A1 | 11/2002 | Cardona |
| 2002/0170068 A1 | 11/2002 | Rafey et al. |
| 2002/0171682 A1 | 11/2002 | Frank et al. |
| 2002/0175947 A1 | 11/2002 | Conrad et al. |
| 2002/0194151 A1 | 12/2002 | Fenton et al. |
| 2002/0198778 A1 | 12/2002 | Landsman et al. |
| 2003/0004804 A1 | 1/2003 | Landsman et al. |
| 2003/0005000 A1 | 1/2003 | Landsman et al. |
| 2003/0005067 A1 | 1/2003 | Martin et al. |
| 2003/0005134 A1 | 1/2003 | Martin et al. |
| 2003/0011639 A1 | 1/2003 | Webb |
| 2003/0014304 A1 | 1/2003 | Calvert et al. |
| 2003/0014399 A1 | 1/2003 | Hansen et al. |
| 2003/0018778 A1* | 1/2003 | Martin et al. ............ 709/224 |
| 2003/0018885 A1 | 1/2003 | Landsman et al. |
| 2003/0023481 A1 | 1/2003 | Calvert et al. |
| 2003/0023488 A1 | 1/2003 | Landsman et al. |
| 2003/0023698 A1 | 1/2003 | Dieberger et al. |
| 2003/0028529 A1 | 2/2003 | Cheung et al. |
| 2003/0028565 A1 | 2/2003 | Landsman et al. |
| 2003/0028870 A1 | 2/2003 | Weisman et al. |
| 2003/0032409 A1 | 2/2003 | Hutcheson et al. |
| 2003/0033155 A1 | 2/2003 | Peerson et al. |
| 2003/0040958 A1 | 2/2003 | Fernandes |
| 2003/0041050 A1 | 2/2003 | Smith et al. |
| 2003/0046150 A1* | 3/2003 | Ader et al. ............ 705/14 |
| 2003/0050863 A1 | 3/2003 | Radwin |
| 2003/0052913 A1 | 3/2003 | Barile |
| 2003/0074448 A1 | 4/2003 | Kinebuchi |
| 2003/0088554 A1 | 5/2003 | Ryan et al. |
| 2003/0105589 A1 | 6/2003 | Liu et al. |
| 2003/0110079 A1 | 6/2003 | Weisman et al. |
| 2003/0110080 A1 | 6/2003 | Tsutani et al. |
| 2003/0115157 A1 | 6/2003 | Circenis |
| 2003/0120593 A1 | 6/2003 | Bansal et al. |
| 2003/0120654 A1 | 6/2003 | Edlund et al. |
| 2003/0131100 A1 | 7/2003 | Godon et al. |
| 2003/0135490 A1 | 7/2003 | Barrett et al. |
| 2003/0135853 A1 | 7/2003 | Goldman et al. |
| 2003/0154168 A1 | 8/2003 | Lautenbacher |
| 2003/0171990 A1 | 9/2003 | Rao et al. |
| 2003/0172075 A1 | 9/2003 | Reisman |
| 2003/0176931 A1 | 9/2003 | Pednault et al. |
| 2003/0182184 A1 | 9/2003 | Strasnick et al. |
| 2003/0195837 A1 | 10/2003 | Kostic et al. |
| 2003/0195877 A1* | 10/2003 | Ford et al. ............ 707/3 |
| 2003/0206720 A1 | 11/2003 | Abecassis |
| 2003/0208472 A1 | 11/2003 | Pham |
| 2003/0220091 A1 | 11/2003 | Farrand et al. |
| 2003/0221167 A1 | 11/2003 | Goldstein et al. |
| 2003/0229542 A1 | 12/2003 | Morrisroe |
| 2004/0002896 A1 | 1/2004 | Alanen et al. |
| 2004/0024756 A1 | 2/2004 | Rickard |
| 2004/0030798 A1 | 2/2004 | Andersson et al. |
| 2004/0044677 A1 | 3/2004 | Huper-Graff et al. |
| 2004/0068486 A1 | 4/2004 | Chidlovskii |
| 2004/0073485 A1 | 4/2004 | Liu et al. |
| 2004/0078294 A1 | 4/2004 | Rollins et al. |
| 2004/0095376 A1 | 5/2004 | Graham et al. |
| 2004/0098229 A1 | 5/2004 | Error et al. |
| 2004/0098449 A1 | 5/2004 | Bar-Lavi et al. |
| 2004/0117353 A1 | 6/2004 | Ishag |
| 2004/0133845 A1 | 7/2004 | Forstall et al. |
| 2004/0162738 A1 | 8/2004 | Sanders et al. |
| 2004/0162759 A1 | 8/2004 | Willis |
| 2004/0163101 A1 | 8/2004 | Swix et al. |
| 2004/0163107 A1* | 8/2004 | Crystal ............ 725/32 |
| 2004/0167928 A1 | 8/2004 | Anderson et al. |
| 2004/0181525 A1 | 9/2004 | Itzhak et al. |
| 2004/0181604 A1 | 9/2004 | Immonen |
| 2004/0193488 A1 | 9/2004 | Khoo et al. |
| 2004/0210533 A1 | 10/2004 | Picker et al. |
| 2004/0225716 A1 | 11/2004 | Shamir et al. |
| 2004/0247748 A1 | 12/2004 | Bronkema |
| 2004/0249709 A1 | 12/2004 | Donovan et al. |
| 2004/0249938 A1 | 12/2004 | Bunch |
| 2004/0254810 A1 | 12/2004 | Yamaga et al. |
| 2004/0267723 A1 | 12/2004 | Bharat |
| 2005/0015366 A1 | 1/2005 | Carrasco et al. |
| 2005/0021397 A1 | 1/2005 | Cui et al. |
| 2005/0027821 A1 | 2/2005 | Alexander et al. |
| 2005/0027822 A1 | 2/2005 | Plaza |
| 2005/0033657 A1 | 2/2005 | Herrington et al. |
| 2005/0038819 A1 | 2/2005 | Hicken et al. |
| 2005/0080772 A1 | 4/2005 | Bem |
| 2005/0086109 A1 | 4/2005 | McFadden et al. |
| 2005/0091106 A1 | 4/2005 | Reller et al. |
| 2005/0091111 A1 | 4/2005 | Green et al. |
| 2005/0097088 A1 | 5/2005 | Bennett et al. |
| 2005/0102202 A1 | 5/2005 | Linden et al. |
| 2005/0102282 A1 | 5/2005 | Linden |
| 2005/0125382 A1 | 6/2005 | Karnawat et al. |
| 2005/0131762 A1 | 6/2005 | Bharat et al. |
| 2005/0132267 A1 | 6/2005 | Aviv |
| 2005/0149404 A1 | 7/2005 | Barnett et al. |
| 2005/0155031 A1 | 7/2005 | Wang et al. |
| 2005/0182773 A1 | 8/2005 | Feinsmith |
| 2005/0187823 A1 | 8/2005 | Howes |
| 2005/0203796 A1 | 9/2005 | Anand et al. |
| 2005/0204148 A1 | 9/2005 | Mayo |
| 2005/0216572 A1 | 9/2005 | Tso et al. |
| 2005/0222901 A1 | 10/2005 | Agarwal et al. |
| 2005/0222982 A1 | 10/2005 | Paczkowski et al. |
| 2005/0240599 A1 | 10/2005 | Sears |
| 2005/0273463 A1 | 12/2005 | Zohar et al. |
| 2005/0283469 A1 | 12/2005 | Veteska et al. |
| 2005/0289120 A9 | 12/2005 | Soulanille et al. |
| 2006/0015390 A1 | 1/2006 | Rijsinghani et al. |
| 2006/0026233 A1 | 2/2006 | Tenembaum et al. |
| 2006/0031253 A1 | 2/2006 | Newbold et al. |
| 2006/0053230 A1 | 3/2006 | Montero |
| 2006/0136524 A1 | 6/2006 | Wohlers et al. |
| 2006/0136528 A1 | 6/2006 | Martin et al. |
| 2006/0136728 A1 | 6/2006 | Gentry et al. |
| 2006/0235965 A1 | 10/2006 | Bennett et al. |
| 2006/0253432 A1 | 11/2006 | Eagle et al. |
| 2007/0016469 A1 | 1/2007 | Bae et al. |
| 2007/0038956 A1 | 2/2007 | Morris |

FOREIGN PATENT DOCUMENTS

| | | |
|---|---|---|
| EP | 0822535 | 2/1998 |
| EP | 1045547 | 10/2000 |
| EP | 1154611 | 11/2001 |
| EP | 1 207 468 A2 | 5/2002 |
| EP | 1207468 | 5/2002 |

| | | |
|---|---|---|
| JP | 343825 | 2/1991 |
| JP | 11066099 | 3/1999 |
| JP | 2001084256 | 3/2001 |
| JP | 2001147894 | 5/2001 |
| JP | 20010222535 | 8/2001 |
| JP | 2001312482 | 11/2001 |
| JP | 2002024221 | 1/2002 |
| JP | 2002032401 | 1/2002 |
| JP | 2002073545 | 3/2002 |
| JP | 2002092284 A | 3/2002 |
| JP | 2002524782 A | 8/2002 |
| JP | 2002259371 | 9/2002 |
| JP | 2002334104 | 11/2002 |
| JP | 2002334104 A | 11/2002 |
| JP | 2003058572 | 2/2003 |
| JP | 2003141155 | 5/2003 |
| JP | 2003178092 | 6/2003 |
| JP | 2003242411 A | 8/2003 |
| JP | 20030271647 | 9/2003 |
| JP | 2004-355376 | 12/2004 |
| WO | WO 9847090 | 10/1998 |
| WO | WO 99/38321 | 7/1999 |
| WO | WO 99/44159 | 9/1999 |
| WO | WO 99/46701 | 9/1999 |
| WO | WO 99/55066 | 10/1999 |
| WO | WO 99/59097 | 11/1999 |
| WO | WO 00/04434 | 1/2000 |
| WO | WO 00/54201 | 9/2000 |
| WO | WO 01/03028 | 1/2001 |
| WO | WO 01/15052 | 3/2001 |
| WO | WO 01/39024 A2 | 5/2001 |
| WO | WO 01/44992 | 6/2001 |
| WO | WO 01/63472 | 8/2001 |
| WO | WO 01/69929 | 9/2001 |
| WO | WO 01/90917 | 11/2001 |
| WO | WO 02/44869 A2 | 6/2002 |
| WO | WO 03/010685 | 2/2003 |

OTHER PUBLICATIONS

Payton D et al: "Dynamic collaborator discovery in information intensive environments" ACM Computing Surveys, ACM, New York, NY, vol. 31, No. ZES, 1999, pp. 1-8.
PCT International Search Report re: International Application No. PCT/US05/29615 dated Feb. 20, 2006.
Diligenti et al., "A Unified Probalistic Framework for Web Page Scoring Systems", Jan. 2004, IEEE, vol. 16, No. 1, pp. 4-16, 13 pages.
Leuski et al., "Lighthouse: Showing The Way to Relevant Information", Oct. 9-10, 2000, IEEE, pp. 125-129, 5 pages.
Non-final rejection dated Jun. 22, 2009 issued in U.S. Appl. No. 11/207,590, 8 pages.
PCT International Search Report and Written Opinion of the International Searching Authority for International Application PCT/US06/09954 (filed Mar. 17, 2006), mailed Aug. 30, 2006, 8 pages.
Greening, Dan R., "Tracking Users: What Marketers Really Want to Know", Web Techniques, Jul. 1999, downloaded from www.webtechniques.com/archives/1999/07/, pp. 1-9, 9 pages.
Bae, Sung Min, et al., "Fuzzy Web Ad Selector", IEEE Intelligent Systems, vol. 18, Issue 6, Nov./Dec. 2003, pp. 62-69, 8 pages.
Lee, Ching-Cheng, et al., "Category-Based Web Personalization System", COMPSAC 2001, Oct. 8-12, 2001, pp. 621-625, 5 pages.
PCT International Search Report and Written Opinion of the International Searching Authority for International Application PCT/2005/045722, mailed Jan. 19, 2007, 12 pages.
Srivastava, Jaideep, et al., "We Usage Mining: Discovery and Applications of Usage Patterns From Web Data", SIGKDD Exporations, vol. 1, Issue 2, Jan. 2000, pp. 12-23, 12 pages.
Ishitani, Lucila, et al., "Masks: Bringing Anonymity and Personalization Together", IEEE Security & Privacy, vol. 1, Issue 3, May/Jun. 2003, pp. 18-23, 6 pages.
Gralla, Preston, How the Internet Works, Special Edition, Ziff-Davis Press, Emeryville, CA, © 1997, pp. 254 and 266-271, 9 pages.
ACM Portal USPTO Search, "Communications of the ACM: vol. 52, Issue 1", Association for Computing Machinery, dated Jan. 2009, 1 page.

Aggarwal, Charu C. et al. 2001. Intelligent Crawling on the World Wide Web with Arbitrary Predicates. ACM, pp. 96-105.
BackWeb Technologies Ltd., BackWEB User's Guide, 1997, [48 pgs.].
Bae, Sung Min, et al., "Fuzzy Web Ad Selector", IEEE Intelligent Systems, vol. 18 Issue 6, Nov./Dec. 2003, pp. 62-69.
Broder, Alan J., "Data Mining the Internet and Privacy", WEBKDD '99, LNAI 1836, Springer-Verlag, Berlin, Germany, (c) 2000, pp. 56-73.
Bucklin, Randolph E., et al., "Choice and the Internet: From Clickstream to Research Stream", Marketing Letters, vol. 13, No. 3, Aug. 2002, pp. 245-258.
Claypool, et al., Inferring User Interest, Worcester Polytechnic Inst., IEEE Internet Computing, Nov.-Dec. 2001, pp. 32-39 [8 pgs.].
CODELIFTER.COM: JavaScript Index Windows and Frames. [online] [retrieved on Dec. 19, 2005]. Retrieved from the internet<URL://http://www.codelifter.com/main/javascript/index_windowframes.html > [Cited by EPO as "X" reference for EP 02 77 8589 in Supplementary European Se.
comScore Marketing Solutions and Media Metrix (9 sheets), webpage) [online], 2003 comScore Networks, Inc. (retrieved on Oct. 8, 2003), retrieved from the internet: <URL:http://vAvw.comscore.com>.
Copernic, Copernic: Software to Search, Find, and Manage Information, Copernic Technologies, Inc. 2004, 2 pgs. (retrieved on Apr. 6, 2004). Retrieved from the Internet<URL:http://www.copernic.com/en/index.html>.
Diligenti, Michelangelo et al. 2004. A Unified Probalistic Framework for Web Page Scoring Systems. IEEE, vol. 16, No. 1. Jan. 2004, pp. 4-16.
Dogpile, Dogpile Web Search Home Page, InfoSpace, Inc. 2004, p. 1 of 1, (retrieved on Apr. 1, 2004). Retrieved from the Internet: <URL:http://www.dogpile.com.html>.
Eick, Stephen G., "Visual Analysis of Website Browsing Patterns", Visual Interfaces to Digital Libraries, Springer-Verlag, Berlin, Germany, (c) 2002, pp. 65-77.
Eirinaki, Magdalini, et al., "Web Mining for Web Personalization", ACM Transactions on Internet Technology (TOIT), vol. 3, Issue 1, Feb. 2003, pp. 1-27.
EPO Communication in European Appln. No. 02778589, completed Dec. 21, 2005 (2 Sheets).
EPO Communication in European Appln. No. 04795209, mailed Feb. 17, 2011 [160 pages].
EPO Communication in European Appln. No. 04795209, mailed Feb. 17, 2011 [4 pages].
EPO File History of EP 2004795209, downloaded from European Patent Office on Apr. 13, 2011 [164 pgs.].
EPO, Communication for EP 03 75 5344, Feb. 14, 2011 [4 pgs.].
EPO, File history of EP—03755344.3, Method and Apparatus for Displaying Messages in Computer Systems, as of Feb. 21, 2011 [121 pgs.].
EPO, File history of EP 2004794999, downloaded from EPO Apr. 13, 2011 [204 pgs.].
EPO, File history of EP1714221 (downloaded from EPO on Apr. 13, 2011) [139 pages].
EPO, Supplementary European Search Report for EP 03 75 5344, Jun. 30, 2009, mailed Jul. 10, 2009 [2 pgs.].
Favela, Jesus et al. 1997. Image-Retrieval Agent: Integrating Image Content and Text. IEE, vol. 1.14, pp. 36-39.
Fenstermacher, Kurt D., et al., "Client-Side Monitoring for Web Mining", Journal of the American Society for Information Science and Technology, vol. 54, Issue 7, May 2003, pp. 625-637.
Fenstermacher, Kurt D., et al., "Mining Client-Side Activity for Personalization", WECWIS 2002, (c) 2002, pp. 205-212.
Friedman, Batya, et al., "Informed Consent in the Mozilla Browser: Implementing Value-Sensitive Design", HICSS-35 '02, Jan. 2002, pp. 10-19.
Fu, Xiaobin, et al., "Mining Navigation History for Recommendation", IUI 2000, New Orleans, LA, (c) 2000, pp. 106-112.
Google Search, "Result Search Query Build Search Engine Index Using Gather Consumer Navigate Search", http://scholar.google.com/scholar, dated Apr. 7, 2010, 3 pages.

Gralla, Preston, How the Internet Works, Special Edition, Ziff-Davis Press, Emeryville, CA, .(c) 1997, pp. 254 and 266-271.
Greening, Dan R., "Tracking Users: What Marketers Really Want to Know", Web Techniques, Jul. 1999, downloaded from: www.webtechniques.com/archives/1999/07/, pp. 1-9.
Hancock, Wayland, "A new way to get information from the Internet," American Agent & Broker, Nov. 1997, 69, 11, pgs. 65-66 [2 pgs.].
Heinle et al. 1997. Designing with JavaScript: Creating Dynamic Web Pages.Sep. 1997, pp. 1-33, 46, 83 [Cited by EPO as "A" reference for EP 02 77 8589 in Supplementary European Search Report dated Dec. 21, 2005].
Hongyu Liu et al., "Focused Crawling by Learning HMM from User's Topic-Specific Browsing" Proceedings of the IEEE/WIC/ACM International Conference on Web Intelligence (WI '04) 0/7695-2100-2/04.
Hun, Ke et al. 2003. A Probabilistic Model for Intelligent Web Crawlers. IEEE, pp. 278-282.
International Preliminary Report on Patentability and Written Opinion in PCT Appln. No. PCT/US2004/033777, mailed Jan. 19, 2006.
International Preliminary Report on Patentability and Written Opinion in PCT Appln. No. PCT/US2005/001022, dated Apr. 26, 2006.
International Preliminary Report on Patentability and Written Opinion in PCT Appln. No. PCT/US2005/029615, mailed Mar. 9, 2006.
International Preliminary Report on Patentability and Written Opinion in PCT Appln. No. PCT/US2005/035352, mailed Sep. 11, 2007.
International Preliminary Report on Patentability and Written Opinion in PCT Appln. No. PCT/US2006/009954, mailed Aug. 30, 2006.
International Preliminary Report on Patentability and Written Opinion in PCT Appln. No. PCT/US2006/025102, mailed Jul. 26, 2007.
International Preliminary Report on Patentability and Written Opinion in PCT Appln. No. PCT/US2006/25104, mailed Jan. 23, 2007.
International Preliminary Report on Patentability and Written Opinion in PCT Appln. No. PCT/US2007/061944, mailed Feb. 14, 2008.
International Preliminary Report on Patentability in PCT Appln. No. PCT/US2006/008049, dated Nov. 6, 2007.
International Preliminary Report on Patentability in PCT Appln. No. PCT/US2006/008050, dated Nov. 6, 2007.
International Preliminary Report on Patentability in PCT Appln. No. PCT/US2006/025103, dated Mar. 24, 2009.
International Search Report and Written Opinion in PCT Appln. No. PCT/US2006/008049, mailed Oct. 19, 2007.
International Search Report and Written Opinion in PCT Appln. No. PCT/US2006/008050, mailed on Oct. 19, 2007.
International Search Report and Written Opinion of the International Search Authority for Intl. Appl. No. PCT/US05/45722 mailed Jan. 19, 2007.
International Search Report and Wrtitten Opinion in PCT Appln. No. PCT/US2006/025103, mailed Jan. 29, 2008.
International Search Report in EP Appln. No. 05802579-1527, dated May 2, 2008.
International Search Report in PCT Appln. No. PCT/US2004/033777, mailed Jan. 19, 2006.
International Search Report in PCT Appln. No. PCT/US2005/001022, mailed Apr. 24, 2006.
International Search Report in PCT Appln. No. PCT/US2005/029615, mailed Mar. 9, 2006.
International Search Report in PCT Appln. No. PCT/US2005/035352, mailed Sep. 11, 2007.
International Search Report in PCT Appln. No. PCT/US2006/009954, mailed Aug. 30, 2006.
International Search Report in PCT Appln. No. PCT/US2006/025102, mailed Jul. 26, 2007.
International Search Report in PCT Appln. No. PCT/US2006/25104, mailed Jan. 23, 2007.
International Search Report in PCT Appln. No. PCT/US2007/061944, mailed Feb. 14, 2008.
IRTORG—Internet Related Technologies: "irt.org—JavaScript Windows FAQ Knowledge Base" Internet Article, Online! Jun. 3, 2000, XP002360403, Retrieved from the Internet : URL:http://web.archive.org/web/20000619232700/developer.irt.org/script/window.

htm> (retrieved on Dec. 12, 2005) [Cited by EPO as "X"reference for EP 02 77 8589 in Supplementary European Search Report dated Dec. 21, 2005].
Ishitani, Lucila, et al., "Masks: Bringing Anonymity and Personalization Together", IEEE Security & Privacy, vol. 1, Issue 3, May/Jun. 2003, pp. 18-23.
Japanese Patent Office, Office Action mailed Jul. 26, 2010 from Japanese Serial No. JP2008-519504 filed Jun. 28, 2006.
Japanese Patent Office, Official Action issued Dec. 17, 2010, mailed Dec. 27, 2010 in Japanese Patent Application No. 2007-528053 (non-official translation), 7 pgs.
Keys. 1998. Every Possible Internet Advertisement Drastic Increase of Click Through Rate by Interactivity and Multimedia. Nikkei Internet Technology. Dec. 22, 1998. January Issue (1999), vol. 18, pp. 118-127.
Kipo, Official Action in Korean Patent Appln. No. 10-2006-7008977.
Kiyomitsu, Hidenari, et al., "Web Reconfiguration by Spatio-Temporal Page Personalization Rules Based on Access Histories", Applications and the Internet, San Diego, CA, Jan. 8-12, 2001, pp. 75-82.
Klemm, Reinhard P., "WebCompanion: A Friendly Client-Side Web Prefetching Agent", IEEE Transactions on Knowledge and Data Engineering, vol. 11, No. 4, Jul./Aug. 1999, pp. 577-594.
Kurohashi, Sadao, et al. 1997. The Method for Detecting Important Descriptions of a Word Based on its Density Distribution in Text. Information Processing Society of Japan. vol. 38, Issue No. 4 (Apr. 15, 1997), pp. 845-854.
Lee, Ching-Cheng, et al., "Category-Based Web Personalization System", COMPSAC 2001, Oct. 8-12, 2001, pp. 621-625.
Leuski, Anton et al. 2000. Lighthouse: Showing the Way to Relevant Information. IEEE, Oct. 2000, pp. 125-129.
Liu, Jian-Guo, et al., "Web Mining for Electronic Business Application", PDCAT 2003, Aug. 27-29, 2003, pp. 872-876.
Liu, Jian-Guo, et al., "Web Usage Mining for Electronic Business Applications", Machine Learning and Cybernetics, Shanghai, China, Aug. 2004, pp. 1314-1318.
Lu, Hongjun, et al., "Extending a Web Browser with Client-Side Mining", APWeb 2003, LNCS 2642, Springer-Verlag, Berlin, Germany, (c) 2003, pp. 166-177.
Luxenburger, Julia, et al., "Query-Log Based Authority Analysis for Web Information Search", WISE 2004, LNCS 3306, Springer-Verlag, Berlin, Germany, Nov. 1, 2004, pp. 90-101.
Metacrawler, Web Search Home Page—MetaCrawler, InfoSpace, Inc. 2004, p. 1 of 1 (retrieved on Apr. 6, 2004), Retrieved from the internet: <URL:http://www.metacrawler.com.html>.
Mitchell, T., "Decision Tree Learning Based on Machine Learning" (Apr. 5, 2003), lecture slides for textbook Machine Learning, McGraw Hill, 1997, pp. 46-74 [29 pgs.].
Mobasher, Bamshad, et al., "Automatic Personalization Based on Web Usage Mining", Communications of the ACM, vol. 43, Issue 8, Aug. 2000, pp. 142-151.
Montgomery, Alan et al., Learning About Customers Without Asking, Carnegie Mellon University, Tepper School of Business, Jan. 2002 [35 pgs.].
Netscape Communications Corp., Netcaster Developer's Guide, Netscape Communicator, Sep. 25, 1997 [112 pgs.].
NielsenIINetRatings (24 sheets), webpage [online], 2003 NetRatings, Inc. (retrieved on Oct. 8, 2003), retrieved from the internet: <URL:http://www.nielsen-netratings.com>.
Nilsson, B. A., and Robb, J., "Invasion of the Webcasters," Pc World, vol. 15, No. 9 (Sep. 1997) p. 204-216 [9 pgs.].
Office Action mailed Feb 2, 2010 from European Serial No. 06013103.4 filed Jun. 16, 2006.
Office Action mailed Nov. 2, 2005 from U.S. Appl. No. 10/061,107, filed Jan. 25, 2002.
Office Action mailed Aug. 3, 2009 from U.S. Appl. No. 11/427,226, filed Jun. 28, 2006.
Office Action mailed Feb. 4, 2010 from U.S. Appl. No. 11/427,243, filed Jun. 28, 2006.
Office Action mailed Jun. 7, 2010 from U.S. Appl. No. 11/427,226, filed Jun. 28, 2006.
Office Action mailed Dec. 8, 2008 from U.S. Appl. No. 11/427,243, filed Jun. 28, 2006.

Office Action mailed Aug. 10, 2009 from U.S. Appl. No. 11/427,282, filed Jun. 28, 2006.
Office Action mailed Oct. 10, 2007 from U.S. Appl. No. 11/207,590, filed Aug. 19, 2005.
Office Action mailed May 12, 2008 from U.S. Appl. No. 11/427,243, filed Jun. 28, 2006.
Office Action mailed Oct. 12, 2010 from U.S. Appl. No. 11/427,243, filed Jun. 28, 2006.
Office Action mailed Aug. 13, 2003 from U.S. Appl. No. 10/061,107, filed Jan. 25, 2002.
Office Action mailed Sep. 13, 2006 from U.S. Appl. No. 10/700,820, filed on Nov. 4, 2003.
Office Action mailed Jan. 14, 2004 in U.S. Appl. No. 10/061,107, filed Jan. 25, 2002.
Office Action mailed Oct. 16, 2008 from U.S. Appl. No. 11/207,590, filed Aug. 19, 2005.
Office Action mailed Sep. 16, 2004 from U.S. Appl. No. 10/056,932, filed Jan. 25, 2002.
Office Action mailed Mar. 18, 2005 from U.S. Appl. No. 10/056,932, filed Jan. 25, 2002.
Office Action mailed Jun. 22, 2009 from U.S. Appl. No. 11/207,590, filed Aug. 19, 2005.
Office Action mailed Jun. 24, 2008 from U.S. Appl. No. 11/207,592, filed Aug. 19, 2005.
Office Action mailed May 24, 2007 from U.S. Appl. No. 10/700,820, filed on Nov. 4, 2003.
Office Action mailed Apr. 25, 2006 from U.S. Appl. No. 10/700,820, filed on Nov. 4, 2003.
Office Action mailed Feb. 25, 2009 from U.S. Appl. No. 11/207,592, filed Aug. 19, 2005.
Office Action mailed Jun. 25, 2009 from U.S. Appl. No. 11/427,243, filed Jun. 28, 2006.
Office Action mailed Dec. 26, 2006 from U.S. Appl. No. 10/700,820, filed on Nov. 4, 2003.
Office Action mailed Mar. 26, 2010 from U.S. Appl. No. 11/207,590, filed Aug. 19, 2005.
Office Action mailed Apr. 27, 2010 from U.S. Appl. No. 11/427,282, filed Jun. 28, 2006.
Office Action mailed Jul. 27, 2005 from U.S. Appl. No. 10/056,932, filed Jan. 25, 2002.
Office Action mailed Oct. 27, 2010 from U.S. Appl. No. 11/207,590, filed Aug. 19, 2005.
Office Action mailed Sep. 27, 2007 from U.S. Appl. No. 11/207,592, filed Aug. 19, 2005.
Office Action mailed Sep. 28, 2010 from U.S. Appl. No. 10/061,107, filed Jan. 25, 2002.
Office Action mailed Sep. 5, 2003 from U.S. Appl. No. 10/056,932, filed Jan. 25, 2002.
Office Action mailed May 7, 2004 from U.S. Appl. No. 10/056,932, filed Jan. 25, 2002.
Office Action mailed Oct. 19, 2007 from U.S. Appl. No. 11/207,589, filed Aug. 19, 2005.
Offie Action mailed May 5, 2006 from U.S. Appl. No. 10/061,107, filed Jan. 25, 2002.
Otsuka, Shingo, et al. 2004. The Analysis of Users Behavior Using Global Web Access Logs. IPSJ SIG Technical Report, vol. 2004 No. 71 (Jul. 13, 2004), pp. 17-24.
Paepcke, Andreas, et al., "Beyond Document Similarity: Understanding Value-Based Search and Browsing Technologies", ACM SIGMOD Record, vol. 29, Issue 1, Mar. 2000, pp. 80-92.
Paganelli, Laila, et al., "Intelligent Analysis of User Interactions with Web Applications", IUI '02, San Francisco, CA, Jan. 13-16, 2002, pp. 111-118.
Park, Joon S., et al., "Secure Cookies on the Web", IEEE Internet Computing, vol. 4, Issue 4, Jul./Aug. 2000, pp. 36-44.
Payton, D., et al. 1999. Dynamic collaborator discovery in information intensive environments. ACM Comput. Surv. 31, 2es, Article 8 (Jun. 1999), pp. 1-8.
PCT International Preliminary Report on Patentability, dated Jan. 9, 2008, for International Application No. PCT/US06/023386.
PCT International Search Report and Written Opinion dated Jul. 12, 2007, for International Application No. PCT/US06/023386.
PCT International Search Report and Written Opinion dated Jul. 26, 2007, for International Application No. PCT/US06/025102.
PCT International Search Report and Written Opinion dated Jun. 28, 2006, for International Application No. PCT/US06/025103.
PCT International Search Report and Written Opinion mailed Feb. 14, 2008, for International Application No. PCT/US07/061944.
PCT International Search Report dated Jan. 23, 2007, for International Application No. PCT/US06/025104.
PCT International Search Report for PCT/US03/13985 mailed Aug. 8, 2003; total of 1 sheet.
Pierrakos, Dimitrios, et al., "Web Usage Mining as a Tool for Personalization: A Survey", User Modeling and User-Adapted Interaction, vol. 13, No. 4, (c) 2003, pp. 311-372.
Schonberg, Edith, et al., "Measuring Success", Communications of the ACM, vol. 43, Issue 8, Aug. 2000, pp. 53-57.
Shahabi, Cyrus, et al., "Efficient and Anonymous Web-Usage Mining for Web Personalization", INFORMS Journal on Computing, vol. 15, No. 2, Spring 2003, pp. 123-148.
Shopping with WhenUShop, Webpage [on-line]; WhenU.com [retrieved on Mar. 19, 2002]. Retrieved from the Internet: URL:http://www.whenu.com.
SideStep, The Traveler's Search Engine; Webpage (online) (retrieved on Oct. 7, 2004); retrieved from the Internet: <URL:http://www.sidestep.com/main.html.
Smith, Lindsay I. 2002. A Tutorial on Principal Components Analysis. Feb. 26, 2002.
Soumen Chakrabarti et al., "Focused Crawling: A New Approach to Top-Specific Web Resource Discovery" Computer Networks 31 (1999), pp. 1623-1640.
Srivastava, Jaideep, et al., "Web Usage Mining: Discovery and Applications of Usage Patterns from Web Data", SIGKDD Explorations, vol. 1. Issue 2, Jan. 2000, pp. 12-23.
Supplemental Notice of Allowability from U.S. Appl. No. 11/207,589, filed Aug. 19, 2005.
Takahashi. 2001. JavaScript Lab: Safe Control of Pop-up Windows. Web Designing. Mainichi Communications, Inc. Jun. 10, 2001. No. 9, vol. 12, pp. 86-89 (separate volume of Mac Fan of June 10 issue).
U.K. Intellectual Property Office, Examination Report in Great Britain application, GB0724938.6, dated Jan. 11, 2010, 2 pages.
U.K. Intellectual Property Office, Official Action for British Application No. GB0724938.6, filed Jun. 28, 2008, Feb. 16, 2011—UK IPO Decision of Rejection.
U.K. Intellectual Property Office, Official Action mailed Jul. 16, 2010 for British Application No. GB0724938.6, filed Jun. 28, 2008 [1 pg.].
U.S. Appl. No. 10/061,107, filed Apr. 18, 2011 PTO Office Action.
U.S. Appl. No. 11/420,191, filed Mar. 25, 2011 PTO Office Action.
Uehara, Satoru, et al., "An Implementation of Electronic Shopping Cart on the Web System Using component-Object Technology", Proc. of the 6th International Conf./ on Object-Oriented Real-Time Dependable Systems, Jan. 8-10, 2001, pp. 77-84.
USPTO, Office Action in U.S. Appl. No. 11/688,160, mailed Feb. 16, 2011.
USPTO, Office Action mailed Nov. 28, 2006 for U.S. Appl. No. 10/227,168, filed Aug. 23, 2002.
USPTO, Office Action mailed Jul. 3, 2006 from U.S. Appl. No. 10/227,168, filed Aug. 23, 2002.
Visual Search ToolBar—Graphically Enhance Search Results, 2004 Viewpoint Corporation; Webpage [online] [retrieved on Oct. 7, 2004]; retrieved from the Internet: <URL:http://www.viewpoint.com/pub/toolbar/download.html.
Wenyin, Liu, et al., "Ubiquitous Media Agents: A Framework for Managing Personally Accumulated Multimedia Files", Multimedia Systems, vol. 9, No. 2, Aug. 2003, pp. 144-156.
WIPO, International Preliminary Report on Patentability (Chap. I of PCT) for PCT/US04/33777, Jan. 23, 2006 [4 pgs].
WIPO, International Preliminary Report on Patentability (Chap. I of PCT) for PCT/US05/01022, Aug. 14, 2006 [6 pgs].
WIPO, International Search Report for PCT/US04/33777, Jan. 19, 2006 [3 pgs.].
WIPO, International Search Report for PCT/US05/01022, Apr. 24, 2006 [3 pgs.].

WIPO, Written Opinion of the International Searching Authority for PCT/US04/33777, Jan. 23, 2006 [3 pgs].

WIPO, Written Opinion of the International Searching Authority for PCT/US05/01022, Apr. 26, 2006 [5 pgs].

Xu, Cheng-Zhong, et al., "A Keyword-Based Semantic Prefetching Approach in Internet News Services", IEEE Transactions on Knowledge and Data Engineering, vol. 16, Issue 5, May 2004, pp. 601-611.

Yuichi Yagawa et al. TV Program Planning Agent using Analysis Method of User's Taste; IEICE Technical Report vol. 98, No. 437: The Institute of Electronics, Information and Communication Engineers; Dec. 1, 1998, vol. 98, No. 437, pp. 9-16.

Zaiane, Osmar R., et al., "Discovering Web Access Patterns and Trends by Applying OLAP and Data Mining Technology on Web Logs", IEEE International Forum on Research and Technology Advances in Digital Libraries, Santa Barbara, CA, Apr. 22-24, 1998, pp. 19-29.

Ad Close, Webpage [online]. C/net Downloads.com [retrieved on Oct. 4, 2001]. Retrieved from the Internet <URL http//download.cnet.com/downloads/0-10059-10-915154.html>.

Ad Muncher, Webpage [online]. C/net Downloads.com [retrieved on Oct. 4, 2001]. Retrieved from the Internet <URL:http//download.cnet.com/downloads/0-33567-18-100-2750044.html>.

AdDelete, Webpage [online]. C/net Download.com [retrieved on Oct. 4, 2001]. Retrieved from the Internet <URL:http//download.cnet.com/downloads/0-10059-100-7003126.html>.

Adextinguisher-Introduction and News Sections. Webpage [online][retrieved on Oct. 4, 2001]. Retrieved from the Internet URL:http//adext.magenet.net.html.

AdPurger, Webpage [online]. C/net Downloads.com [retrieved on Oct. 4, 2001]. Retrieved from the Internet <URL:http//download.cnet.com/downloads/0-10068-100-5067717.html>.

AdsOff, Webpage [online]. C/net Downloads.com [retrieved on Oct. 3, 2001]. Retrieved from the Internet <URL:http//download.cnet.com/downloads/0-10059-100-9 12651.html>.

AdSubract SE, Webpage [online]. C/net Downloads.com [retrieved on Oct. 4, 2001]. Retrieved from the Internet <URL:http//download.cnet.com/downloads/0-3356727-100-5963713.html>.

Advertising Killer, Webpage [online]. C/net Downloads.com [retrieved on Oct. 3, 2001]. Retrieved from the Internet <URL.http//download.cnet.com/downloads/0-10059-100-1539520.html>.

Advisory Action dated Nov. 19, 2008 issued in U.S. Appl. No. 11/015,583, 3 pages.

AllGone, Webpage [online]. C/net Downloads.com [retrieved on Oct. 4, 2001]. Retrieved from the Internet <URL:http//download.cnet.com/downloads/0-10068-100-2915974.html>.

AnalogX Pow, Webpage [online]. C/net Downloads.com [retrieved on Oct. 3, 2001]. Retrieved from the Internet <URL:http//download.cnet com/downloads-0-3356748-100-915372.html>.

Banner Zapper, Webpage [online]. C/net Downloads.com [retrieved on Oct. 4, 2001]. Retrieved from the Internet <URL:http//download.cnet.com/downloads/0-3356727-100-6384611.html>.

BanPopup, Webpage [online]. C/net Downloads.com [retrieved on Oct. 4, 2001]. Retrieved from the Internet <URL:http//download.cnet.com/downloads/0-10059-100-6901908.html>.

Black List. Webpage [online]. C/net Downloads.com [retrieved on Oct. 4, 2001]. Retrieved from the Internet <URL.http/download cnet.com/downloads/0-10059-100-902347 html>.

Claria—Company Information—Corporate Review, webpage [online], retrieved on Mar. 3, 2005, retrieved from the internet: <URL:http://www.claria.com/companyinfo.html>.

Close Popup 4.0, Webpage [online]. Take a Hike Software [retrieved on Oct. 4, 2001]. Retrieved from the Internet <URL:http//www.ryanware.com/close_popup.html>.

Close Popup, Webpage [online]. C/net Downloads.com [retrieved on Oct. 4, 2001]. Retrieved from the Internet <URL:http//download.cnet.com/downloads/0-10059-100-905799.html>.

CobraSoft PopStop, Webpage (online). C/net Downloads.com [retrieved on Oct. 4, 2001]. Retrieved from the Internet <URL:http// download cnet.com/downloads/0-10058-100-6926765.html>.

Compare Prices and Read Reviews on AdsOff! Epenions.com. Webpage [online]; Jan. 21, 2001. Obtained from corresponding International Application PCT Search.

CrushPop 2000, Webpage [online]. www.32bit.com [retrieved on Oct. 4, 2001]. Retrieved from the Internet <URL.http//32bit.com/software/listings/Internet/Special/180P/13794.html>.

Definition of "close button", Microsoft Press Computer Dictionary, 3rd ed. (Redmond WA: Microsoft Press, 1997).

Directive 2002/58/EC of the European Parliament and of the Council of Jul. 12, 2002 concerning the processing of personal data and the protection of privacy in the electronic communications sector (Directive on privacy and electronic communications), Official Journal L 201, Jul. 30, 2002 p. 0037-0047 (downloaded.

DoubleClick products (17 total pgs); Webpage [online] [retrieved on Jun. 11, 2003]; Retrieved from the Internet: <URL: http://www.doubleclick.com>.

Final Office Action dated Mar. 26, 2010 issued in U.S. Appl. No. 11/207,590, 8 pages.

Final Rejection dated May 21, 2008 issued in U.S. Appl. No. 11/015,583, 8 pages.

Google search for "define: close button", Mar. 2, 2007.

Heller, Laura, "Target gets mod in Manhattan", DSNRetailing Today, v40 n16, Aug. 20, 2001:2, 37.

InterMute, Webpage [online]. C/net Downloads.com [retrieved on Oct. 3, 2001]. Retrieved from the Internet <URL:http//download.cnet.com/downloads/0-10059-100-906599.html>.

International Preliminary Report on Patentability in PCT Appln. No.PCT/US2004/07714, dated Oct. 1, 2005 [4 pages].

International Search Report in PCT Appln. No. PCT/US2004/07714, mailed Mar. 31, 2005 [1 page].

Internet Citation: "Gator.com offers one-click shopping at over 5,000 e-commerce site today"; Jun. 14, 1999; XP002145278; Date retrieved: Jun. 28, 2001. URL:http://www.gator.com/company/press/pr061499b.html.

Kourbatov, Opening a Window, Jul. 8, 2000, plublished by www.javascripter.net, whole document.

Langheinrich, M., et al. "Unintrusive Customization Techniques for Web Advertising," NEC Corporation, C&C Media Research Laboratories, Kanagawa, Japan, Computer Networks, vol. 31, No. 11, pp. 1259-1272, May 1999 (in Conf. Proc. 8th Int'l WWW Conf., Toronto, Canada, May 11-14, 1999).

Marcebra Net, Webpage [online]. C/net Downloads.com [retrieved on Oct. 4, 2001]. Retrieved from the Internet <URL:http//download.cnet.com/downloads/0-3364666-100-5210875.html>.

Mr. KillAd. Webpage [online]. C/net Downloads.com [retrieved on Oct. 4, 2001]. Retrieved from the Internet <URL:http//download.cnet.com/downloads/0-10059-100-895339 html>.

Nagger, Webpage [online]. C/net Downloads.com [retrieved on Oct. 4, 2001]. Retrieved from the Internet <URL:http//download.cnet.com/downloads/0-3356748-100-2497932 html>.

NoAds 2000.6.30.1, Webpage [online] south bay software [retrieved on Oct. 4, 2001]. Retrieved from the Internet <URL:http//www.southbaypc.com/NoAds.html>.

Non-Final Rejection dated Dec. 20, 2006 issued in U.S. Appl. No. 11/015,583, 8 pages.

Non-Final Rejection dated Jul. 20, 2009 issued in U.S. Appl. No. 11/015,583, 7 pages.

NoPops 1.1, Webpage [online]. WebAttack.com [retrieved on Oct. 4, 2001]. Retrieved from the Internet <URL:http//www.webattack.coM/get/nopops.shtml>.

Paraben's AdStopper, Webpage [online]. C/net Downloads.com [retrieved on Oct. 4, 2001]. Retrieved from the Internet <URL:http//download.cnet.com/downloads/0-10059-100-2643648.html>.

PCT International Search Report for application No. PCT/US02/35981, 3 sheets; mailed Apr. 4, 2003.

Pierre Maret, et al.; Multimedia Information Interchange: Web Forms Meet Data Servers; Proceedings of the IEEE International Conference on Multimedia Computing and Systems; vol. 2, Jun. 7-11, 1999, pp. 499-505; XP000964627; Florence, Italy.

Popki Popup Closer 1.4, Webpage [online]. WebAttack.com [retrieved on Oct. 4, 2001]. Retrieved from the Internet <URL:http//www.webattack.com/get/popki.shtml>.

PopKill, Webpage [online]. C/net Downloads.com [retrieved on Oct. 4, 2001]. Retrieved from the Internet <URL:http//download.cnet.com/downloads/0-10059-100-6967054.html>.

PopNot, Webpage [online]. C/net Downloads.com [retrieved on Oct. 4, 2001]. Retrieved from the Internet <URL http//download.cnet.com/downloads/0-10059-100-5112702.html>.

PopUp Eraser, Webpage [online]. C/net Downloads.com [retrieved on Oct. 4, 2001]. Retrieved from the Internet <URL:http//download.cnet.com/downloads/0-10059-100-6322841.html>.

Popup Hunter, Webpage [online]. C/net Downloads.com [retrieved on Oct. 4, 2001].Retrieved from the Internet <URL:http//download.cnet.com/downloads/0-10059-100-1451171.html>.

PopUp Killer, Webpage [online]. C/net Downloads.com [retrieved on Oct. 3, 2001]. Retrieved from the Internet <URL.http//download.cnet.com/downloads/0-10059-100-7253644 html>.

Popup Smasher, Webpage [online]. C/net Downloads.com [retrieved on Oct. 4, 2001]. Retrieved from the Internet <URL:http/download.cnet.com/downloads/0-3364664-100-7209048.html>.

Pop-up stopper, Webpage [online]. C/net Downloads.com [retrieved on Oct. 3, 2001]. Retrieved from the Internet <URL:http//download.cnet.com/downloads/0-10059-100-6803957.sub.--html&- gt;.

PopupDummy, Webpage [online]. C/net Downloads.com [retrieved on Oct. 4, 2001]. Retrieved from the Internet <URL:http//download.cnet.com/downloads/0-10059-100-6943327.html>.

Privacy and Electronic Communications (EC Directive) Regulations 2003 (PECR), No. 2426, Electronic Communication, Sep. 2003.

Ready, Kevin et al., "Plug-n-Play Java Script" (Indianapolis, IN: New Riders Publishing, 1996): 19-22, 39, 40 and 43-45.

Restriction Requirement dated Oct. 31, 2007 issued in U.S. Appl. No. 11/015,583, 6 pages.

Surf in Peace 2.01, Webpage [online]. WebAttack.com [retrieved on Oct. 4, 2001]. Retrieved from the Internet <URL:http//www.webattack.com/get/sip.shtml>.

U.S. Appl. No. 09/993,887, filed on Nov. 27, 2001, by Jax B. Cowden, et al.

U.S. Appl. No. 09/993,904, filed on Nov. 27, 2001, by Jax B. Cowden, et al.

U.S. Appl. No. 09/993,906, filed on Nov. 27, 2001, by Jax B. Cowden, et al.

U.S. Appln. No. 11/210,209 —Oct. 16, 2007 Office Action.

U.S. Appln. No. 11/211,197 —Jun. 23, 2006 PTO Office Action.

U.S. Appln. No. 11/427,243—May 10, 2011 PTO Office Action.

Ultraseek Server Detailed Feature List, http://software.infoseek.com/products/ultraseek/ultrafeatures.htm, Accessed from Apr. 1998 archive from http://web.archive.org/web/19980419092128/http://software.infoseek.com/products/.

U.S. Appl. No. 09/993,888, filed on Nov. 27, 2001, by Mark E. Pennell, et al.

Web Magician, Webpage [online]. RocketDownLoad.com [retrieved on Oct. 4, 2001]. Retrieved from the Internet <URL:http/www.rocketdownload.com/Details/Inte/webmag.html>.

Written Opinion in PCT Appln. No. PCT/US2004/07714, mailed Mar. 31, 2005 [3 pages.].

www.conversionruler.com/faq.php, Feb. 4, 2003.

Zero Popup, Webpage [online]. C/net Downloads.com [retrieved on Oct. 4, 2001]. Retrieved from the Internet <URL:http//download.cnet.com/downloads/0-3356748-100-7163307.html>.

Non-Final Rejection dated Oct. 15, 2007 issued in U.S. Appl. No. 11/207,589.

Non-Final Rejection dated Sep. 25, 2007 issued in U.S. Appl. No. 11/207,592.

Non-Final Rejection dated Apr. 21, 2006 issued in U.S. Appl. No. 10/700,820.

Final Rejection dated Sep. 11, 2006 issued in U.S. Appl. No. 10/700,820.

Non-Final Rejection dated Dec. 21, 2006 issued in U.S. Appl. No. 10/700,820.

Final Rejection dated May 22, 2007 issued in U.S. Appl. No. 10/700,820.

"NTT-AT Business Development for Supporting Information Distribution Age (2) InfoGather," Business Communication, Japan, Business Communication Institute Co., Ltd., Feb. 1, 1999, vol. 36, No. 2, pp. 55-57.

Shingo Ohtsuka et al., "The Analysis of Users Behavior using Global Web Access Logs," IEICE Technical Reports, Japan, The institute of Electronics, Information and Communication Engineers, Jul. 6, 2004, vol. 104, No. 176 (DE2004-12), pp. 13-18.

Chakrabarti S. et al., "Focused crawling; a new approach to topic-specific Web resource discovery" computer Networks, Elsevier Science Publishers B.V., Amsterdam, NL, May 17, 1999, vol. 31, No. 11-16, pp. 1623-1640, XP004304579.

* cited by examiner

| 602 Version of crumb | 604 Time Written | 606 Commercial Flag | 608 Keyword | 610 Character Set |
|---|---|---|---|---|
| 3 | secs since 1970 hex. eg: 4166FAFC | 0 = no, 1 = yes, 2 = unknown (always 1) | 2005 Chevrolet Corvette | utf-8 |

FIG. 6

| 802 CatID | 702 Day | 0 | -1 | -2 | -3 |
|---|---|---|---|---|---|
| 10494 | 704 Hit? | 1 | 0 | 1 | 1 |

FIG. 7

| 802 CategoryID | 804 Recency | 806 Frequency | 808 Banner Clicks | 810 Comment |
|---|---|---|---|---|
| 10494 | 3 | 4 | 4 | |
| 98409 | 1 | 6 | 4 | Heavy and recent |
| 65625 | 14 | 6 | 3 | Heavy last month |
| 68530 | 1 | 0 | 0 | Light but recent |
| 147374 | 12 | 0 | 0 | Light last month |

FIG. 8

| Bucket # | 0 | 1 | 2 | 3 | 4 | 5 | 6 | 7 |
|---|---|---|---|---|---|---|---|---|
| Time Slice | N/A | 0-5 min | 5-15 min | 15-30 min | 30-60 min | 1-2 hrs | 2-4 hrs | 4-12 hrs |
| Bucket # | 8 | 9 | 10 | 11 | 12 | 13 | 14 | 15 |
| Time Slice | 12-24 hrs | 1-3 days | 3-7 days | 7-14 days | 14-21 days | 21-30 days | 30-45 days | 45-60 days |

FIG. 9

| Bucket # | 0 | 1 | 2 | 3 | 4 | 5 | 6 | 7 |
|---|---|---|---|---|---|---|---|---|
| # Days w/ a visit | 0 | 1 | 2 | 3 | 4 or 5 | 6 to 10 | 11 to 30 | 31 to 60 |

FIG. 10

| 1102<br>CategoryID | 1104<br>Category Leaf Name | 1106<br>Revenue Priority |
|---|---|---|
| 9870 | Uncategorized | 0 |
| 10494 | Luxury Auto | 1 |
| 98409 | SUVs | 2 |
| 95625 | Payroll Software | 3 |
| 68530 | Florida except Orlando | 4 |

FIG. 11

Factors Used To Determine Relevance Score

Initial Visit Metrics—
Click Rate: 12% (high)
Pages Viewed: 5
Dwell Time: 55 sec.
Purchase/Registration: 80% yes

Subsequent Visit Metrics—
Pages Viewed: 15
Dwell Time: 300 sec.
Purchase/Registration: 15% yes

User Level Metrics—
Category Involvement Level: Expert
Search Engine Usage Level: Maven
Geography Relevance Score: High

Relevance Score: 97

|  | Loyal | Switcher | Competitive Loyal |
|---|---|---|---|
| Heavy | Uniques 333,253<br>CTR 7.90%<br>Conv. Rate 8.00% | Uniques 500,332<br>CTR 6.20%<br>Conv. Rate 4.10% | Uniques 1,990,098<br>CTR 3.82%<br>Conv. Rate 2.15% |
| Medium | Uniques 467,000<br>CTR 5.40%<br>Conv. Rate 7.20% | Uniques 898,922<br>CTR 5.50%<br>Conv. Rate 3.15% | Uniques 1,210,000<br>CTR 2.20%<br>Conv. Rate 1.05% |
| Light | Uniques 211,009<br>CTR 3.00%<br>Conv. Rate 6.50% | Uniques 524,422<br>CTR 3.10%<br>Conv. Rate 2.80% | Uniques 1,299,878<br>CTR 1.40%<br>Conv. Rate .55% |

FIG. 16

| Advertiser Short Domain | Traffic Source | Keyword | Impressions | Clicks | Click Through Rate (CTR%) | Conversion Rate | AVG Rank in Listing |
|---|---|---|---|---|---|---|---|
| orbitz.com | google.com | acapulco | 258 | 0 | 0.00% | 0.00% | 2.9 |
| | | aer lingus | 249 | 3 | 1.20% | 0.00% | 2.4 |
| | | aeromexico | 307 | 3 | 0.98% | 0.00% | 2.5 |
| | | air canada | 2 | 0 | 0.00% | 0.00% | 21.5 |
| | | air china | 211 | 3 | 1.42% | 0.00% | 1.8 |
| | | air fare | 565 | 17 | 3.01% | 0.00% | 3.9 |
| | | air fares | 731 | 44 | 6.02% | 6.82% | 3.3 |
| | | air ticket | 227 | 19 | 8.37% | 0.00% | 1.6 |
| | | air tickets | 353 | 31 | 8.78% | 0.00% | 1.6 |
| | | air tran | 16 | 0 | 0.00% | 0.00% | 3.1 |
| | | air travel | 307 | 29 | 9.45% | 3.45% | 1.9 |
| | | airfare | 2,268 | 187 | 8.25% | 3.74% | 1.8 |
| | | airfares | 967 | 105 | 10.86% | 1.90% | 1.8 |
| | | airline | 726 | 40 | 5.51% | 2.50% | 3.7 |
| | | airline fares | 493 | 33 | 6.69% | 6.06% | 2.2 |
| | | airline flights | 549 | 65 | 11.84% | 15.38% | 1.6 |
| | | airline ticket | 603 | 61 | 10.12% | 0.00% | 1.9 |
| | | airline tickets | 10,717 | 800 | 7.46% | 5.75% | 2.0 |
| | | airlines | 4,318 | 125 | 2.89% | 3.20% | 1.5 |
| | | airplane tickets | 405 | 11 | 2.72% | 0.00% | 2.9 |

FIG. 17

Lorem ipsum nonsense — 2001

2003: Lorem ipsum dolor sit amet, consectetur adipisicing elit, sed do eiusmod tempor incididunt ut labore et dolore magna aliqua. Ut enimad minim veniam, quis nostrud exercitation ullamco laboris nisi ut aliquip ex ea commodo consequat.

2004: Duis aute irure dolor in reprehenderit in voluptate velit esse cillum dolore eu fugiat nulla pariatur. Excepteur sint occaecat cupidatat non proident, sunt in culpa qui officia deserunt mollit anim id est laborum.

2005: Fusce neque wisi, ornare sed, aliquet sit amet, ultricies a, est. Ut rhoncus eros nec mauris. Phasellus vitae felis nec elit tincidunt auctor. Aliquam congue, metus ultrices tincidunt blandit, elit pede dapibus turpis, at accumsan urna diam sed purus. Pellentesque imperdiet. Nulla mattis erat eget lorem. Maecenas at magna. Sed in sem. Suspendisse at orci a justo ultricies iaculis. Etiam dictum. Quisque pellentesque hendrerit orci. Etiam nibh orci, fermentum eget, placerat sit amet, faucibus id, elit. Nulla sollicitudin congue leo.

Duis justo sem, sodales nec, scelerisque id, vestibulum nec, diam. Phasellus enim. Duis sodales tincidunt enim. Sed metus. Nulla facilisi. Ut facilisis risusut purus. Suspendisse magna. Cras nec purus in sem posuere elementum. Aenean ac arcu ut augue condimentum euismod. Fusce ut metus. Fusce vel ante varius neque rhoncus placerat. Ut quis quam vitae purus facilisis vestibulum.

FIG. 20

METHOD AND APPARATUS FOR RESPONDING TO REQUEST FOR INFORMATION-PERSONALIZATION

RELATED APPLICATIONS

This application claims the benefit of U.S. provisional Patent Application Nos. 60/603,140 entitled "Method and Apparatus for Responding to End-User Request for Information" by Westover et al. filed on Aug. 19, 2004; 60/637,684 entitled "Method and Device Publishing Cross-Network User Behavioral Data" by Wohlers et al. filed on Dec. 20, 2004; 60/662,680 entitled "Method and Device for Publishing Behavioral Observations to Customers" by Eagle et al. filed on Mar. 17, 2005; and 60/660,798 entitled "Method and Apparatus for Responding to End-User Requests for Information" by Westover et al. filed on Mar. 11, 2005. This application continues-in-part the disclosure of U.S. patent application Ser. No. 11/015,583 entitled "Search Engine for a Computer Network" by Anthony G. Martin filed on Dec. 17, 2004. These identified applications are incorporated by reference for all purposes.

This application is related to the contemporaneously filed U.S. patent application Ser. No. 11/207,589 entitled "Method and Apparatus for Responding to End-User Request for Information—Collecting," filed on Aug. 19, 2005 and issued as U.S. Pat. No. 7,444,358 on Oct. 28, 2008, and U.S. patent application Ser. No. 11/207,592, entitled "Method and Apparatus for Responding to End-User Request for Information—Ranking", also filed on Aug. 19, 2005, and issued as U.S. Pat. No. 7,836,009 on Nov. 16, 2010.

FIELD OF THE INVENTION

The present invention relates to an advanced search engine. The advanced search engine may include a client component for monitoring an end-user's browsing activity, a remote server (may comprise one or more computers) for storing and processing data received from the client component, and a module that process web pages and serves search results to end-users. The advanced search engine may collect web pages for keywords of proven interest, fetch web pages requested by end-users, generate snippets or abstracts of the web pages, eliminate duplicate web pages, rank the importance of the web pages, and provide relevant web pages or links to web pages in response to an end-user search request for information regarding one or more keywords, for example. Technical problems solved, measures used and results obtained are discussed below.

BACKGROUND

One approach to search engines, taken by Google, is to organize the world's information and make it universally accessible and useful. Another approach, once taken by Dogpile, is to have a meta-search engine aggregate the results of other search engines. These approaches create a great haystack of results. For instance, the keyword "cheap travel" returns about 18,000,000 results from Google, about 85,800,000 from Yahoo and 68,377,619 from MSN, as of summer 2005!

Much work has been done to float the "needles" to the top of the results haystack, to devise methods of ranking links returned in response to a query. Google's published patent applications propose, in their titles, to use local inter-connectivity, article information, location awareness and other factors to decide on the position of results. Yahoo, Overture and Microsoft also have worked to refine their presentation of results.

In any set of information, a search term is sometimes not enough to determine what results are sought. In one sense, the search term may be ambiguous, as extensively discussed in Bharat et al., "Generating User Information for Use in Targeted Advertising", US 2005/0131762 A1 published Jun. 16, 2005 and in Carrasco et al., "Disambiguation of Search Phrases Using Interpreation Clusters", US 2005/0015366 A1 published Jan. 20, 2005. The term "jaguar" might refer to cars, animals, a football team, or an operating system. Even if a term were unambiguous, different users might prefer to access different information. For instance, teenage travelers, business travelers and luxury travelers look for different travel arrangements and accommodations, potentially using similar search terms.

It is desirable to return the most relevant results, whether in response to a search or, more generally, on an information feed. The growing number of documents published on web sites (and of documents accessible on private servers) invites development of alternative or improved technology to quickly return relevant results responsive to users' queries. In effect, to find the 50 or 100 most relevant web sites for a particular user whose keyword is "cheap travel" and effectively summarize them for the user. This further invites development of technologies that personalize the information returned, whether content, sponsored content or advertising, based on the interests of the user.

BRIEF DESCRIPTION OF THE DRAWINGS

FIG. 6 is an example of a cookie that stores the most recent commercial keyword of interest.

FIG. 7 is an example of summary data maintained by the behavior watcher that may be written to persistent memory.

FIG. 8 illustrates a bit string further summarized by category.

FIG. 9 illustrates buckets that may be applied to recency of using search words, clicking through, entering URL destinations or other indications of user interest.

FIG. 10 illustrates buckets that can be applied to frequency of visits.

FIG. 11 illustrates how a category ID can be associated with both the category name and a revenue priority.

FIG. 13 depicts a web page highly relevant to the keyword "cars".

FIG. 15 juxtaposes the results for "cars" from Yahoo!, msn Search and Google with an embodiment of the search engine described herein.

FIG. 16, illustrates user differentiation using results from a behavior watching module.

FIG. 17 depicts traffic to a particular domain, from a particular search engine, by keyword.

FIG. 20 depicts how the window scoring routine begins with the first word of text within the document.

DETAILED DESCRIPTION

Figure 1:
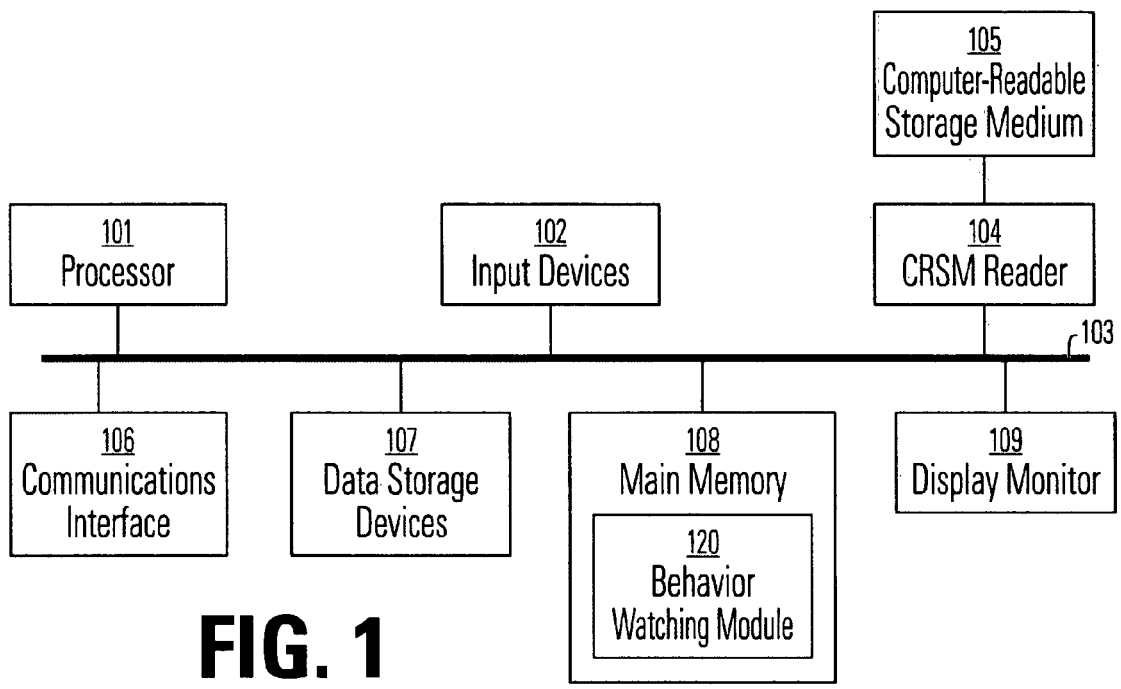
FIG. 1 is a schematic diagram of an example computer that may be used in various embodiments.

The following detailed description is made with reference to the figures. Preferred embodiments are described to illustrate, not to limit the scope of the claims. Those of ordinary skill in the art will recognize a variety of equivalent variations on the description that follows. Persons of ordinary skill in the art will recognize, however, that the embodiments described can be practiced without one or more of the specific details. In other instances, well-known details are not shown or described to avoid obscuring aspects of the embodiment.

Being computer-related, it can be appreciated that the components disclosed herein may be implemented in hardware, software, or a combination of hardware and software e.g., firmware). Software components may be in the form of computer readable program code stored in a computer-readable storage medium, such as memory, mass storage device, or removable storage device. For example, a computer readable medium may comprise computer-readable program code for performing the function of a particular component. Likewise, computer memory may be configured to include one or more components, which may then be executed by a processor. Components may be implemented separately in multiple modules or together in a single module.

Embodiments and aspects of embodiments described below can be applied to solve various technical problems. One problem applies to a large network: how to monitor and usefully aggregate patterns of communication among users, search engines and documents accessed. In one scenario, the users are surfing the Internet at widely disbursed personal computers; the search engines include Baidu, Google, Yahoo! and MSN; the documents are pages posted on web sites around the world. In another, employees use an enterprise intranet with an enterprise search engine to locate reference documents exposed on workgroup servers. Addressing these problems may involve positioning a behavior observing module where it can monitor the communication channels in use and report observations to a server, preferably without disrupting the users' routines. In one embodiment, the behavior observing module may run on the user's personal computer (such as a desktop, laptop or handheld computer or media center device). The module can observe both communications and the status of the user's machine when the communications take place. For example, what search terms and results did a user follow to a particular web site? The module can achieve distributed processing and substantially reduce the resources required to aggregate communication behavior by filtering reports and categorically encoding activity. It may report observations to the server as resources are available or when a user browses to an affiliated domain. As part of the ordinary uploading of cookies to domains accessed, observation cookies can be transmitted to the server. The server can aggregate reported patterns of communication. One technical result is receiving reports from communication monitors positioned across a large network and aggregating patterns, including the status or state of individual computers when communications took place. In turn, the aggregated patterns of communications can be used to pre-organize information for retrieval or publication, in anticipation of a query or contact.

A related technical problem is how to organize over-abundant electronic records based on the current and recent status of a particular terminal connected to a network, to enhance the relevance of the first records presented to a user. The over-abundant electronic records may come from web sites world wide, such as the web sites for "jaguar." Or, they may be documents stored on workgroup servers. They are over-abundant in the sense that they are too numerous to display on a user's screen without repeatedly pressing "page down" or the like. The current and recent status of the terminal, preferably associated with a particular user, may include web sites visited within the last 24 hours (or some other period) before a search query was submitted. Or, it may include a history of documents retrieved from workgroup servers. Either type of activity may be preprocessed and categorically classified. The period for reporting terminal status may precede a query or request for a personalized electronic journal that selects and filters the information based on the current and recent status of the terminal. The technical method again involves a behavior watching module running on the user's computer. In this embodiment, the module summarizes terminal status, publishes the summary to an electronic record (e.g., a cookie) and communicates the record to a search engine or other site that the user contacts. Reporting categorical summaries of status or activity distributes processing and reduces the need for server-based resources. The search engine uses the information, for instance, to determine what sense of "jaguar" is of interest? A highly involved auto category user who searches for "jaguar" would get Jaguar auto related links, while a person with no relevant category involvement would get a mix of auto, animal, etc. links. Category profiles may be developed to further categorize a user's interests. A new parent in the suburbs might be recognized from content accessed and be assigned to a different category for home accessories or cars than a single gen-X 20-something person. Life change events also might be recognized, such as marriage, home buying or parenthood. Like the "jaguar" example, for a "travel Italy" inquiry, the search engine might determine the style of travel that interests the user and organize the over-abundant electronic records accordingly. The technical result is respond to a query or contact based on an electronic report of the status or recent activity of a terminal, selecting from over-abundant electronic records a particular set of records that are most likely relevant to the current and recent status of the terminal.

Figure 12:
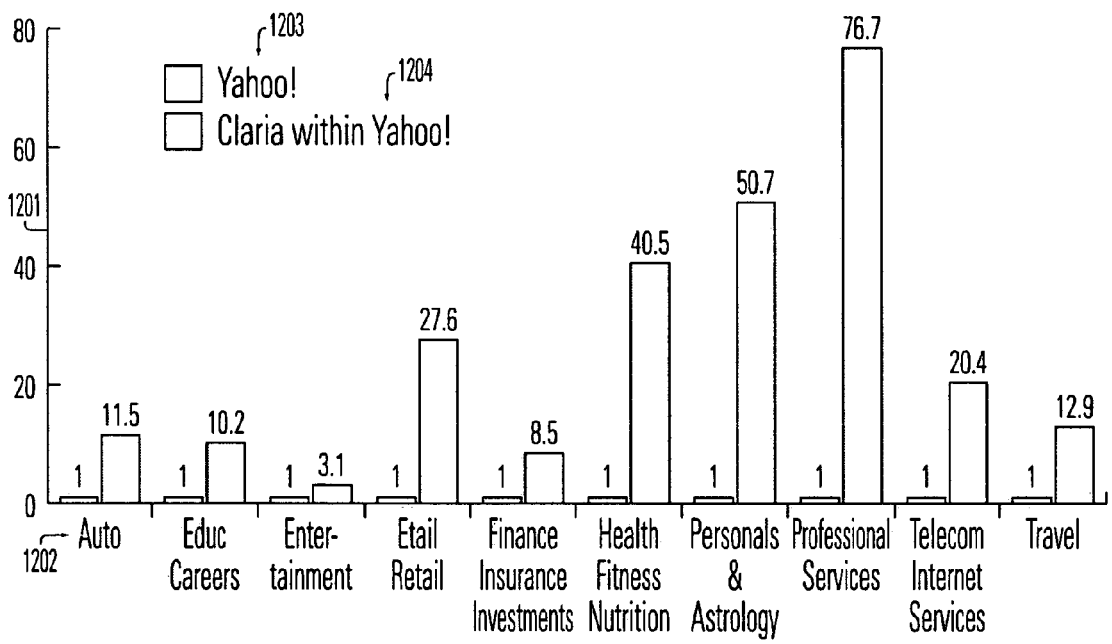
FIG. 12 compares the insight that a behavior watching module on a user's machine gives regarding web surfing with the limited view that a server can achieve.

Web-wide behavioral targeting differs substantially from site-side behavioral targeting. Practicing site-side behavioral targeting, a group of affiliated sites attempt to identify commercial behaviors. The sites typically serve ads, such as portals and news sites. Messages are displayed on the affiliated sites, responsive to behavior that is recognized from visits to the affiliated sites. The results of site-side behavioral targeting are better than non-behaviorally targeted campaigns, but depend on insight that can be gained from a narrow portion of user's behavior, as illustrated by FIG. 12, which is described below. Web-wide behavioral targeting, in contrast to site-side, can identify commercial surfing behavior and, optionally, non-commercial surfing behavior of interest, across all sites, even sites to do not accept advertising. This is significant because 90% of commercial Web activity takes place at sites or on pages that do not display advertising. Therefore, portals see less than 10% of user's total commercial activity, as measured by page views. Non-portal publishers see less than 3% of their users' total commercial activity. A behavior watching module may simplify the relationship with web site operators and allow messages to be displayed across a larger network of publishers than participate in site-side behavioral targeting. Web-wide behavioral targeting produces better results than site-side behavioral targeting.

Referring now to FIG. 1, there is shown a schematic diagram of an example computer that may be used in various embodiments. Depending on its configuration, the computer shown in the example of FIG. 1 may be employed as a client computer, a server computer, or other data processing device. The computer of FIG. 1 may have less or more components to meet the needs of a particular application. As shown in FIG. 1, the computer may include a processor 101, such as those from the Intel Corporation, Advanced Micro Devices or IBM, for example. The computer may have one or more buses 103 coupling its various components. The computer may include one ore more input devices 102 (e-g., keyboard, mouse), a computer-readable storage medium (CRSM) 105 (e.g., floppy disk, CD-ROM), a CRSM reader 104 (e.g., floppy drive, CD-ROM drive), a display monitor 109 (e.g., cathode ray tube, flat panel display), a communications interface 106 (e.g., network adapter, modem) for coupling to a network, one or more data storage devices 107 (e.g., hard disk drive, optical drive, FLASH memory), and a main memory 108 (e.g., RAM). Software embodiments may be stored in a computer-readable storage medium 105 forwarding into a data storage device 107 or main memory 108. Software embodiments in main memory 108 may be executed by processor 101. In the example of FIG. 1, main memory 108 is shown as having a behavior watching and message delivery program 120, which is further described below. Behavior watching and message delivery program 120 and other programs in main memory 108 may be loaded from a computer-readable storage medium 105, a data storage device 107, or over the Internet by way of communications interface 106, for example. Behavior watching and message delivery program 120 and other programs in main memory 108 may be executed by processor 101.

Figure 2:
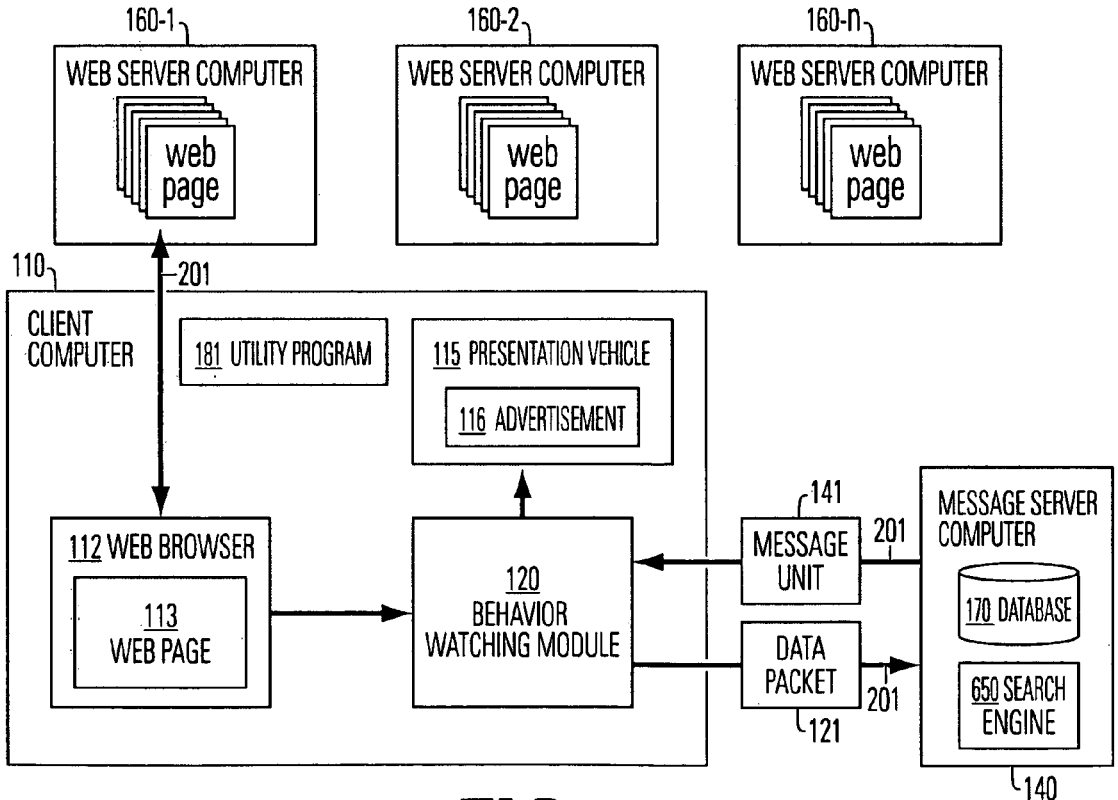
FIG. 2 shows a schematic diagram of a computing environment in which this technology may operate.

FIG. 2 shows a schematic diagram of a computing environment in which this technology may operate. In the example of FIG. 2, the computing environment includes one or more web server computers 160 (i.e., 160-1, 160-2, ..., 160-n), one or more client computers 110, one or more message server computers 140, and other computers not specifically shown. In the example of FIG. 2, a client computer 110 communicates with server computers (e.g., a web server computer or a message server computer) over the Internet. As such, arrows 201 denote Internet connections in this example. Intermediate nodes such as gateways, routers. bridges, Internet service provider networks, public-switched telephone networks, proxy servers, firewalls, and other network components are not shown for clarity.

A client computer 110 is typically, but not necessarily, a personal computer such as those running the Microsoft Windows™ operating system, far example. A consumer may employ a suitably equipped client computer 110 to get on the Internet and access computers coupled thereto. For example, a client computer 110 may be used to access web pages from a web sever computer 160.

A web server computer 160 may be a server computer hosting a website, which comprises web pages designed to attract consumers surfing on the Internet. A web server computer 160 may include web pages supporting advertisements, downloadable computer programs, products available for online purchase, and so on. As can be appreciated, a website may be on one or more server computers.

A message server computer 140 may include the functionalities of a web server computer 160. In one embodiment, a message server computer 140 further includes a database 170 and a search engine 650. Database 170 may be a commercially available database, such as those available from the Oracle Corporation. Database 170 may store client data received from behavior watching and message delivery programs 120 running in client computers 110. The client data may be transmitted from a client computer 110 to message server computer 140 in a data packet 121. The client data may include navigation and behavioral data obtained by a behavior watching and message delivery program 120 by monitoring a consumer's on-line activities. In the example of FIG. 2, message server computer 140 is shown as communicating with one client computer 110 for clarity of illustration. In practice, message server computer 140 receives data packets 121 containing client data from a plurality of client computers 110, each of which has a behavior watching and message delivery program 120. A message server computer 140 may also include downloadable computer programs and files for supporting, updating, and maintaining software components on a client computer 110.

Web server computers 160 and message server computers 140 are typically, but not necessarily, server computers such as those available from Sun Microsystems, Hewlett-Packard, or International Business Machines. A client computer 110 may communicate with a web server computer 160 or a message server computer 140 using client-sever protocol. It is to be noted that client-server computing is well known in the art and will not be further described here.

As shown in FIG. 2, a client computer 110 may include a web browser 112 and a behavior watching and message delivery program 120. Web browser 112 may be a commercially available web browser or web client. In one embodiment, web browser 112 comprises the Microsoft Internet Explorer.TM. web browser. A web browser allows a consumer on a client computer to access a web page. In the example of FIG. 2, web browser 112 is depicted as displaying a web page 313 from a web server computer 160, A web page, such as web page 113, has a corresponding address referred to as a "URL" (Uniform Resource Locator), Web browser 112 is pointed to the URL of a web page to receive that web page in client computer 110. Web browser 112 may be pointed to a URL by entering the URL at an address window of web browser 112, or by clicking a link 203 (ie., 203-1, 203-2, . . . , 203-n) pointed to that URL, for example.

In one embodiment, behavior watching and message delivery program 120 is downloadable from a message server computer 140 or a web server computer 160. Behavior watching and message delivery program 120 may be downloaded to a client computer 110 in conjunction with the downloading of another computer program. For example, behavior watching and message delivery program 120 may be downloaded to client computer 110 along with a utility program 181 that is provided free of charge or at a reduced cost. Utility program 181 may be a wallet or calendar program, for example. Utility program 181 may be provided to a consumer in exchange for the right to deliver advertisements to that consumer's client computer 110 via behavior watching and message delivery program 120. In essence, revenue from advertisements delivered to the consumer helps defray the cost of creating and maintaining the utility program. Behavior watching and message delivery program 120 may also be provided to the consumer along with free or reduced cost access to an online service, for example.

Behavior watching and message delivery program 120 is a client-side program in that it is stored and run in a client computer 110. Behavior watching and message delivery program 120 may comprise computer readable program code for displaying advertisements in a client computer 110 and for monitoring the online activity of a consumer on the client computer 110. It is to be noted that the mechanics of monitoring a consumer's online activity, such as determining where a consumer is navigating to the URL of web pages received in client computer 110, the domain names of websites visited by the consumer, what the consumer is typing on a web page, what keyword the consumer is providing to a search engine, whether the consumer clicked on a link or an advertisement, when the consumer activates a mouse or keyboard, and the like, is, in general, known in the art and not a further described here. For example, behavior watching and message delivery program 120 may learn of consumer online activities by receiving event notifications from web browser 112.

Behavior watching and message delivery program 120 may record the consumer's online activity for reporting to message server computer 140. The recorded consumer online activity is also referred to as "client data," and provided to message server computer 140 using data packets 121. Message server computer 140 may use the client data to provide targeted advertisements to the consumer. Message server computer 140 may include the advertisement or data for displaying the advertisement in a message unit 141. In the example of FIG. 2, the targeted advertisement is labeled as advertisement 116 and displayed in a presentation vehicle 115. Presentation vehicle 115 may be a pop-under, pop-up, separate browser window, custom browser window, or other means for displaying an advertisement on a computer screen. Techniques for delivering advertisements to client computers using a client-side program are also disclosed in commonly-owned U.S. application Ser. No. 10/152,204, entitled "Method and Apparatus for Displaying Messages in Computer Systems," filed on May 21, 2002 by Scott G. Eagle, David L. Goulden, Anthony G. Martin, and Eugene A. Veteska, issued June 27, 2006 as U.S. Pat. No. 7,069,515, which is incorporated herein by reference in its entirety.

As will be more apparent below, behavior watching and message delivery programs are primarily used to obtain client data far building a search engine index, not necessarily to display presentation vehicles in a client computer 110, That is, a behavior watching and message delivery program does not necessarily have to display advertisements in a client computer 110. This is advantageous in that consumers may be allowed to obtain a free or reduced cost utility program 181 (or other benefits) without having to see advertisements from the provider or sponsor of the utility program.

Figure 3:
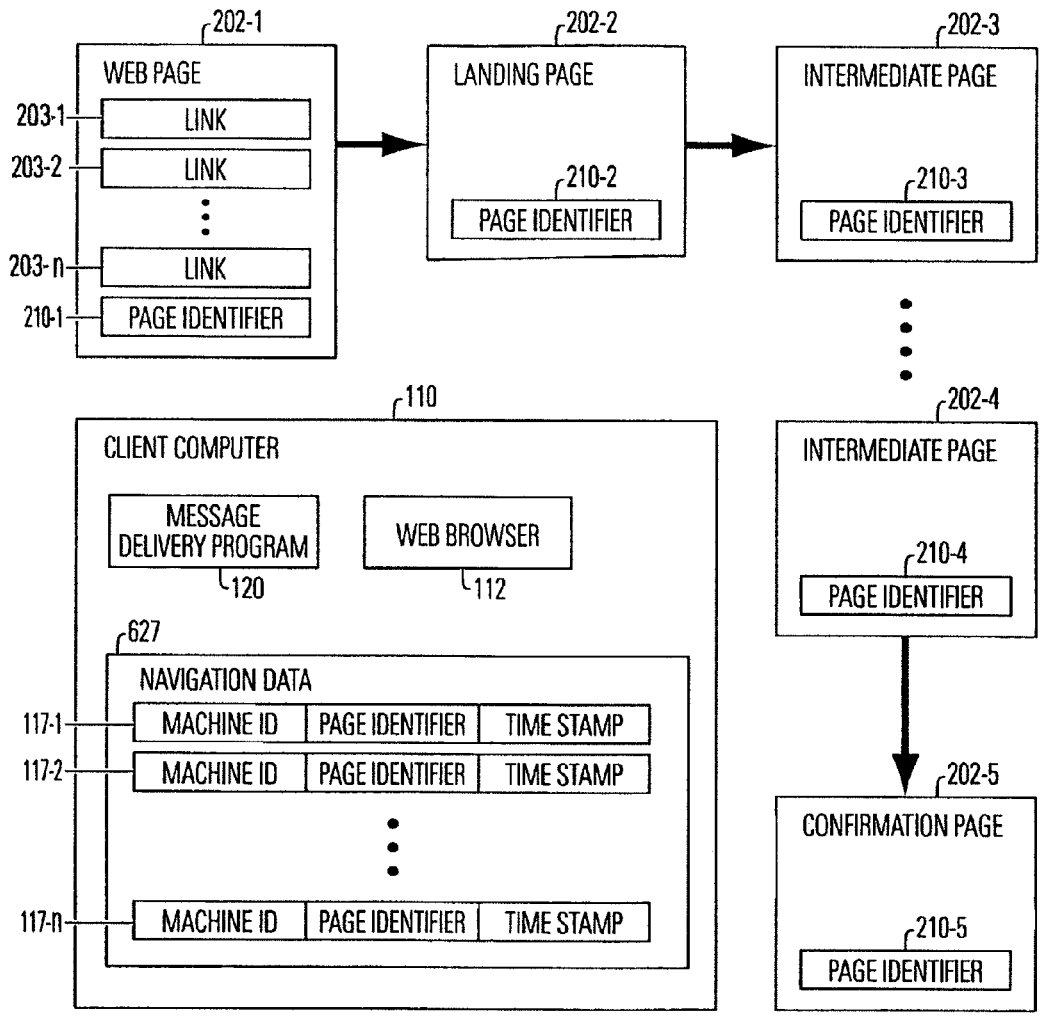
FIG. 3 schematically illustrates the tracking of a conversion process.

FIG. 3 schematically illustrates the tracking of a conversion process. A "conversion" occurs when a consumer makes an online purchase or registration in response to an advertisement presented to her. As will be more apparent below, the embodiments may use conversion as a factor in ranking a keyword-link combination. In the example of FIG. 3, web pages 202 (i.e., 202-1, 202-2, . . . ) may be sequentially displayed in the same or separate windows of web browser 112. Each web page 202 includes a page identifier 210 (i.e., 210-1, 210-2, 210-3 . . . , 210-4, 210-5), which may be a URL. Behavior watching and message delivery program 120 records the URLs of web pages 202 viewed by the consumer as well the amount of time the consumer spent with each web page as navigation data. For purposes of the present disclosure, the web pages "viewed" by consumers are those web pages received in client computers. In the example of FIG. 3, navigation data 627 comprises log entries 117 (i.e., 117-1, 117-2, . . . , 117-n). Each log entry 117 includes a machine ID anonymously identifying the client computer 110 (or the consumer), a page identifier, and a time stamp indicating when the log entry 417 was made. The time stamps between log entries 117 provide an estimate of the amount of time the consumer spent viewing the indicated web page. A log entry 117 may be created for each web page 202 viewed by the consumer. For example, a log entry 117-1 may be created when the consumer clicks oh a link 501 to receive web page 202-2. In client computer 110, a log entry 117-2 may be created when the consumer receives web page 202-3 in client computer 110, and so on.

In the example of FIG. 3, web page 202-2 is also referred to as a "landing page" because it is the web page directly pointed to by an advertisement having a link in web page 202-1. A website that sells products on line may also have a "confirmation page" 202-5. A confirmation page is a web page provided to the consumer to confirm a just completed online purchase. Alternatively, a confirmation page may involve confirmed submission of registration information. A website may have "intermediate pages" 202-3, 202-4, and so on between a landing page 202-2 and a confirmation page 202-5. An intermediate page may be an online product catalog, shopping cart, and other types of web pages. The page identifiers of landing and confirmation pages of popular or partner websites may be stored in database 170 of message server computer 140, the page identifiers of the landing and confirmation pages may be compared to those in navigation data 627 of client computers 110 to determine the number of consumers making online purchases from a particular web page. As can be appreciated, web pages from which consumers make purchases may be highly relevant, and may thus be deemed a consumer preferred page. Techniques for monitoring consumer purchase behavior are also disclosed in commonly-owned U.S. application Ser. No. 10/464,419, entitled "Generation of Statistical Information in a Computer Network," filed by David L. Goulden and Dominic Bennett on Jun. 17, 2003, published Dec. 23, 2004 as U.S. Pub. No. 2004-0260744, and issued July 15, 2008 as U.S. Pat. No. 7,401,140, which is incorporated herein by reference in its entirety.

Process Flow

Figures 4, 5:
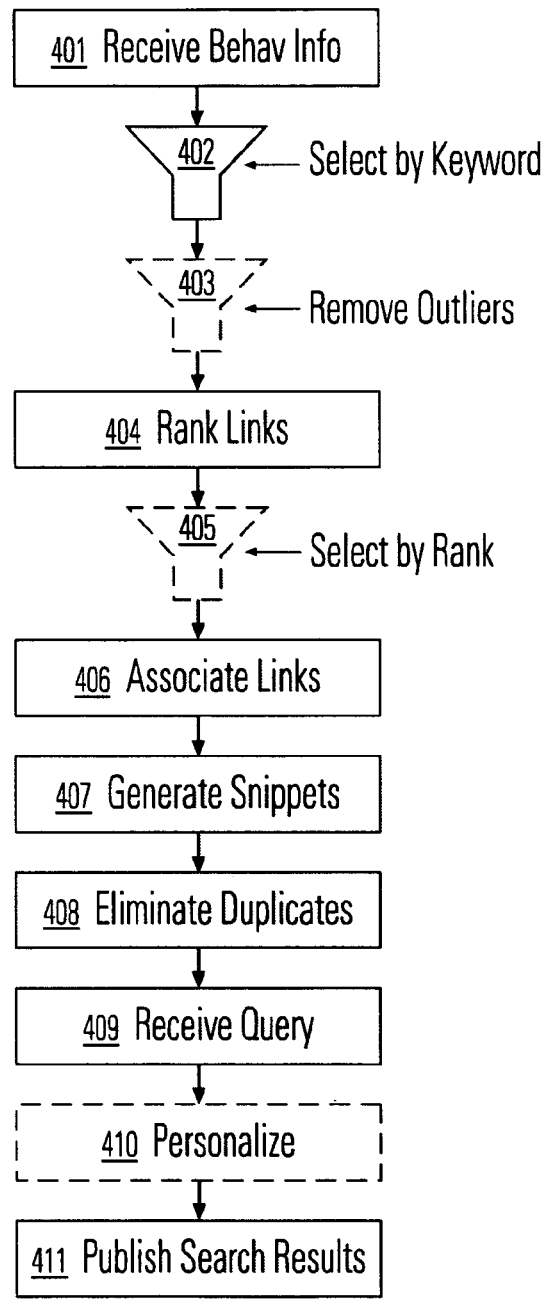
FIG. 4 depicts a high level block diagram of components that can function together to produce a search engine that personalizes sponsored and non-sponsored information delivery.
FIG. 5 is an example of a cookie or data record that reports a URL clicked.

FIG. 4 is a high level block diagram of components that can function together to produce a search engine that personalizes sponsored and non-sponsored information delivery. As background, behavior watching modules currently capture behavioral web-navigation information on over 40 million machines in the U.S. and abroad. The information collected will expand and be adapted as needed. This navigational behavior information is currently used to power web-wide GMT ad vehicles (e.g., pop-ups and slide-unders) as well as power many data-rich applications that give unique insights into consumer behavior across the web. The behavior watching module has the ability to see the entire search life-cycle, from observing the initial keyword entered, to the resultant links displayed, to post-click metrics including dwell times, pages viewed, repeat visits, and post-click purchases or registrations. By aggregating a user's behavior, category profiles and life change events can be determined. User sophistication with search engine usage and degree of category involvement can be determined over time. Using this information, one can select and re-rank the search results, filtered by humans who requested the searches, not by bots.

Data Collection

Web usage statistics are collected (407) using behavior watching modules (120) for users searching on selected search engines across the Internet or an enterprise intranet. The modules send back information related to their searches and how effective their searches were on each particular search engine for each particular keyword. The information is captured in a database, which is loaded daily or at some other concurrent frequency. Information available includes what the user saw and how they responded. URLs seen by the user may be displayed in algorithmic or natural sections the results. Pertinent information available for a single search term includes machine id, keyword, search engine where search was performed, resultant URLs, algorithmic URLs, bidded URLs, paid inclusion URLs, whether or not a URL was clicked, number of pages viewed, dwell time, repeat visits and user metrics such as category involvement and search engine sophistication.

Some statistics from U.S. users can bring to life the analytical reach of data collection and ranking. The one million most frequently used keywords presently account for just more than half of the searches conducted on the major search engines, 53% of the searches. The 10,000 most frequent searches account for 38%. The distribution of keywords entered as searches can be represented by a Zipf distribution, which plots as a straight line on a graph with logarithmic scale on both axes. See, e.g., Jacob Nielson, "Diversity is Power for Specialized Sites", Alertbox (Jun. 16, 2003) accessed Aug. 13, 2005 at http://www.useit.com/alertbox/20030616.html. It is estimated that 2,000 behavior watching modules will generate enough data to rank the 10,000 most frequent searches. A larger group of behavior watching modules will cover the most frequent searches. A base of 40 million behavior watching modules may capture 30 billion rows of data per month, filtered from 150 billion page views observed. Among the page views observed, on the order of 8 billion commercial events per month are noted, including more than 2.5 million purchases. These numbers and even a passing familiarity with statistics should excite the reader to aggregating the intelligence and behavior of a multiplicity of searchers, and presenting by popular acclaim the most significant web sites on the first page of results from a search engine. A search engine that uses aggregated consumer behavior is well-positioned to rate the authority and popularity of pages/documents as responsive to a search request.

FIGS. 5-11 are examples of data records or cookies that can communicate information from the behavior watching module to a ranking and link-following server and to a search engine that produces personalized results. FIG. 5 is an example of a cookie or data record that reports a URL clicked. A keyword 501, time stamp 502 and list of one or more URLs selected by the user 503 are conveyed, for instance in a cookie when a user reaches a web site affiliated with one of the servers or in a data record when the behavior watching module reports activity, independently of Internet surfing behavior. Additional data regarding conversion status, return conversion status, rank in a list that a user saw, etc. can be included in such a cookie or data record.

FIG. 6 is an example of a cookie from that stores the most recent commercial keyword of interest. This may be the most recent commercial keyword of interest from a search or a keyword associated with a URL or click-through. More than one recent commercial keyword of interest may be stored in one or more cookies, following the example of FIG. 6. One attribute or field of this cookie is the version of the crumb 602. Another is the time written 604, which may be expressed in seconds from 1970 to the time the cookie is written. A commercial flag 606 may be used to categorize the keyword type, for instance between key words that are of current commercial interest and key words that are for sale. The keyword may be included 608, either in text or as a shorthand code. A character set 610 such as UFT-8 may be included to assist with decoding of the keyword 608. This may be important in international settings.

FIG. 7 is an example of summary data maintained by the behavior watcher 120 that may be written to persistent memory 122. In this example, a category ID 802 is a shorthand for a particular category. Bins are allocated for a current period 702, such as a day. The periods may be of equal length for different lengths. In one embodiment, a bit string implements the bins. A history of 60 days may be implemented by 60 bits plus storage for a category ID. Each bin corresponds to a particular time segment. A bit flag indicates whether there was activity 704 related to the category during the particular time segment. At a regular time corresponding to the shortest period represented by any bin, the bit string is updated. Data are shifted into older bins, making room in the most recent bin. Data regarding recent activity is summarized into the most recent bin, labeled zero in the figure. If bins represent unequal amounts of time, special provisions are made at the boundaries between shorter and longer time bins, either algorithmically or by allocating additional storage. For instance, activity during any one-hour segment during a preceding day may result in setting the bit flag in a day-long time segment. The day-long time segment is flag "0" only if the hour segment flag at midnight is "0" when the midnight update takes place. This is an example of an algorithmic provision at the boundary between a one-hour segment and a day-long segment. Alternatively, storage may be allocated for bins to record number of visits in a particular time segment. This may significantly increase the amount of storage required, without necessarily changing how a reported-behavior aware server 132 responds. Compact storage is preferred when there are hundreds of categories and the practical limit for the size of a cookie is 2K to 4K bytes. Cookies can be sent to a server that archives user activity data. The user activity data can be used for analysis or targeting of ads. A bit string can be further summarized by category, shown in FIGS. 8-10.

FIG. 9 illustrates buckets that may be applied to recency of using search words, clicking through, entering URL destinations or other indications of user interest. The most recent visit is recorded by membership in a particular bucket. One of 15 or 16 buckets can be identified with four bits. In the figure, the buckets are of unequal length. A single, most recent visit record such as illustrated by FIG. 6 or an entry kept in memory can be used to assign a category to a particular bucket.

Figure 19:
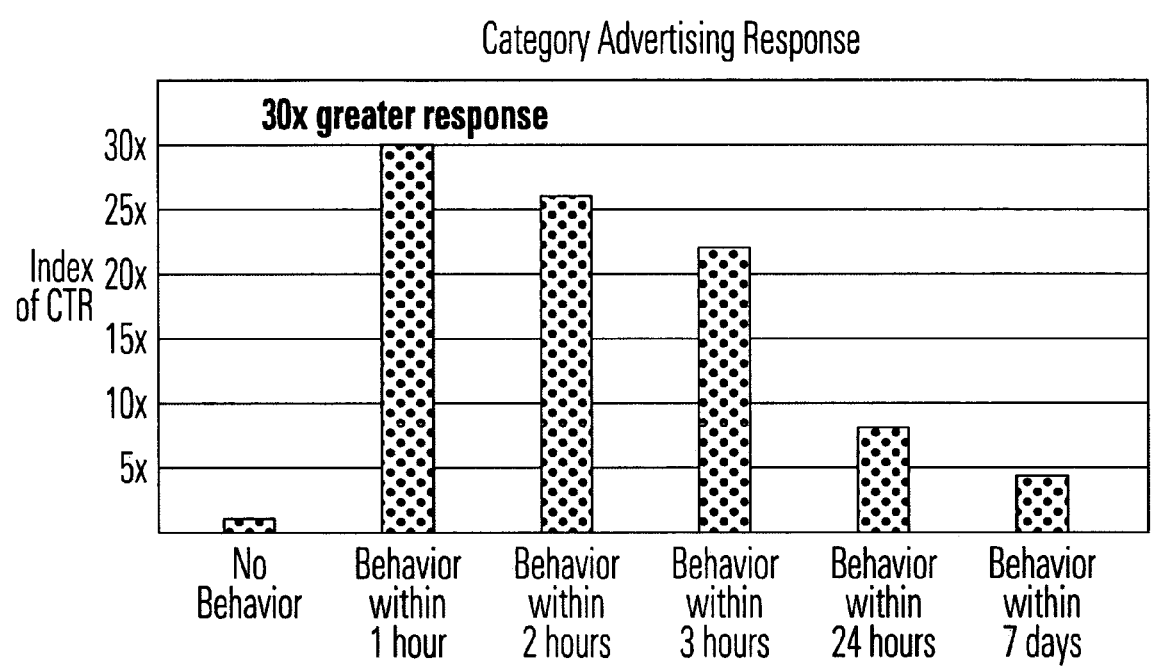
FIG. 19 provides data regarding the importance of recent behavior in response to banner ads, measured by click through rates.

FIG. 19 provides data regarding the importance of recent behavior in response to banner ads, measured by click through rates. A user who had behavior within the last hour in an advertising category was 30 times as likely to respond to a banner ad as one with no behavior over the last 7 days in the category. Behavior in the last hour, two hours or three hours has been observed to generate a huge increase in responsiveness to banner ads. Even behavior within the last seven days correlates strongly with a user's interest. Preferably, the selection of recency bucket sizes reflects the observed power of recent behavior illustrated by the figure.

FIG. 10 illustrates buckets that can be applied to frequency of visits. When the bit string of FIG. 7 is organized by days, activity in a category can be assigned to buckets of different visit frequencies, such as 0, 1, 2, 3, 4 or 5, 6 to 10, 11 to 30, or 31 to 60 days out of the last 60 days in which the user indicated interest. The number of bits set in the bit string is counted and summarized using this categorization.

With the categorical coding of recency and frequency in mind, we turn to FIG. 8. A single cookie may record data for many category IDs 802. For each category ID, three or more metrics of user interest may be recorded. One or more recency categories 804 can be recorded. The recording of recency can be applied to key words submitted to search engines or to other kinds of user behavior, described above. One or more frequency categories 806 can be recorded, applied to key words submitted or other kinds of user behavior. Banner clicks 808 can be separately categorized by recency, frequency or both. The comments in data column 810 are editorial comments to explain the data in the table and are not part of the data. Category ID 98409 experienced heavy and recent user interest. Category ID 65625 experienced heavy user interest last month. Category ID 68530 experienced light, recent user interest. Category 147374 experienced light activity last month, which probably also should be reflected by a nonzero value under frequency 806.

The behavior watcher module 120 preferably sorts the category history information in FIG. 8 so that the most important categories are listed first. Alternatively, the system could leave the category sorting to the reported-behavior responsive server 132. As illustrated in FIG. 11, a category ID 1102 can be associated with both the category name 1104 and a revenue priority 1106. It may be useful to sort category history information by revenue priority 1106, especially if only a portion of the client-sided user behavior data is transmitted to a reported-behavior responsive server 132.

The statistics returned regarding web usage may or may not distinguish between commercial and non-commercial keyword searches. This distinction is made at the time of loading into the database where keywords are checked against the ever-changing list of commercial terms, for instance, terms bidded by Overture. If a keyword is determined to be commercial, then it is assigned a keyword id, which may be compatible with the Overture keyword id list. If the keyword is not deemed commercial, then another id is assigned in the data loading process.

These two types of data (commercial and non-commercial) are loaded into separate sections of a data warehouse. At the time of a new search engine loading run, keyword data is extracted from both the commercial and non-commercial tables. The results are joined and unique keyword ids are assigned from a master table. A keyword can sometimes be found in both the commercial and non-commercial contexts. For instance, if the commercial nature of a keyword is tied to whether it's being bidded upon, a keyword which is not commercial today may become a commercial tomorrow, if it receives a bid. This duality of keywords creates non-unique keyword ids as the same keyword may have both a keyword id created by a bidding process and a second one created through the load process. To eliminate this, it is preferred to create and-maintain a single unique keyword id for every keyword. This list is updated when new keywords are discovered, and assigns existing ids to keywords already in the system.

Some preprocessing may be performed by the behavior watching module to simplify the URLs reported. URLs are unwrapped and cleaned in a separate process. URLs are often wrapped by search engines to enable the serving search engine to track clicks on served URLs. There are many different forms of URL wrapping. For example, a wrapped URL from yahoo.com might be: http://rds.yahoo.com/S=2766679/K=bmw/v=2/SID=w/1=WS1/R=2/SS=100040736/H=1/SHE=0/*-http://www.bmwmotorcycles.com/. Unwrapping the URL produces http://www.bmwmotorcycles.com From the server's perspective, the process begins with receipt (401) of behavioral information. The server uses whatever information it receives. From the user's perspective, the behavior watching module will report its observations and the user will receive search results ordered aggregating the user's information with others and/or will receive personalized to the user's recent behavior.

De-duping may also occur at the URL level. Information for two URLs which are identical is aggregated into one single URL. If two URLs differ even slightly however, (e.g., by a slash) then the two distinct versions are kept and another attempt at de-duplication is made as described below, for instance, using a combination of title and generated snippet.

Conversion data can be associated to a specific search by an algorithm that ties a search URL click to a specific conversion event, which occurred within a predetermined window. Usage and conversion data are matched for advertiser domains (URLs) that have clicks at the machine id, query time, advertiser domain level. For a particular machine with a click on a particular advertiser domain, if a conversion stat is observed within a predetermined window, then the conversion is attributed to that search click. If the conversion falls outside of the predetermined window, then the search click is not attributed.

For machine id-advertiser domain pairs that have a conversion stat attributed, subsequent future conversions are attributed as repeat conversions. These attributes also may be carried along and are available for use by a ranking algorithm (404). Metrics included with search data include number of visits, time spent (dwell time) and pages viewed.

Domain event data are joined to user data (with conversion metrics) at the machine id-advertiser domain level across sources, for combining search behavior for U.S. machines at google.com, msn.com, and yahoo.com. These results are put into time series order within machine id and advertiser domain. Domain events which occur within a predetermined time period following a search click are assigned as post-click metrics for that search click on that particular advertiser domain. If post-click metrics cannot be assigned to a particular search-click, the record is thrown out.

Several of the domain event data elements are subject to inaccuracies manifested in the client-sent stats. Both time spent and pages viewed are occasionally misreported, and at other times, accurately reported, but in need of logically driven limits to be imposed.

Time spent can be misrepresented by machines having bad or inaccurate clocks. It can be accurately represented but in need of caps in such a case when a machine is left on a particular domain for an extended period of time. In order to cap outliers and to maintain a reasonable threshold for time spent on a site post click, a time limit of 30 minutes has been employed. A cap for pages viewed has also been implemented and set at 5. Other time and pages viewed caps may be substituted. These caps can be implemented on the behavior watching client side or after data are received at a host. In addition, user activity can be monitored by the behavior watching module so that extended periods of inactivity are not counted as dwell time.

When data are joined and aggregated at the machine-id, keyword, and URL level, the resulting data structure may include: machine-id, keyword, keyword_id, URL, URL_ID, domainid (corresponds to the domain of the URL), clicks, dwell_per_click, pages_per click, conversions_per_click, rank_position (from search results list viewed by the user). Optionally, only keywords of predetermined interest (402 may be processed. For instance, keywords having commercial interest, such as bidded keywords, may be processed.

Outliers optionally may be removed (403), to avoid scoring anomalies. One example of an outlier is a link that is returned only once by a search engine and followed with enthusiasm by the user when was returned. A single strong sample point can give a link an unbeatable average score. A link that appeared just before a keyword was rescored could potentially be ranked in the top position for that keyword on the basis of a single sample! Accordingly, one example of optionally removing outliers is to not rank links unless they have been followed a predetermined number of times. For instance, if a link has not been selected by users and followed at least 10 or 100 times, it might remain unranked until its activity level reached the predetermined level or threshold Ranking Algorithm A URL ranking algorithm (404) has been developed to identify and rank links for any given keyword. Many variations on combining the aggregated observations have merit, as discussed below. One combination uses URL click rate and dwell time metrics (time spent at the domain and/or number of pages viewed), to select and rank URLs.

Optionally, user responses can be normalized for the position of a URL in a search result set. Position produces an inherent bias in URL click data for search results, which may be desirable or not. URLs occupying higher ranks garner higher clicks. In order to account for this bias, a normalization algorithm was developed to put clicks on links in disparate positions on equal footing.

Data is aggregated for each position and average click through rates, average time spent, and average pages viewed are calculated. For each rank position (1-n), there are at least three average aggregate measures of that position's importance: click through rate, time spent and pages viewed. Normalization of these measures can be expressed as:

$$\frac{\text{Pages Viewed Inflation Factor for Position } n}{} = \frac{Avg \text{ Pages Viewed (Position 1)}}{Avg \text{ Pages Viewed (Position } n)}$$

$$\frac{\text{Dwell Time Inflation Factor for Position } n}{} = \frac{Avg \text{ Dwell Time (Position 1)}}{Avg \text{ Dwell Time (Position } n)}$$

-continued $$\frac{\text{Pages Viewed Inflation Factor for Position } n}{} = \frac{Avg \text{ Pages Viewed (Position 1)}}{Avg \text{ Pages Viewed (Position } n)}$$

This embodiment calculates and ranks top URLs for any keyword (404) based upon observed user metrics.

This embodiment may re-rank results based upon a time share metric, which corresponds to an individual machine's percentage vote. The algorithm takes into account user web surfing patterns and effectively places users on equal voting for relevant links. The premise is that a user has a certain amount of time which is spent on a site post a search click. These times are totaled to form the individual user's total time value which was spent viewing sites post search clicks. Percentages of the total time are then calculated for each URL click made by that particular user, resulting in a time fraction vote.

In using this methodology, users who in general spend less time surfing the Web have the same voting power as users who tend to spend longer amounts of time. This evens the playing field across all categories. Alternatively, other embodiments may take into account other factors which make up an individual user's profile. Users identified as category experts may have a higher vote. For example, a user highly involved in the electronics category may have his vote count more for links clicked than a user who is new to the category. The voting blocks may take place within a particular category, and not across all categories as a whole.

The following detailed computational example applies to a specific keyword-URL pair through the aggregation and cleansing process.

Links in higher positions garner higher clicks and hence possess higher click through rates. It follows that users also tend to spend longer amounts of time and view more pages at URLs occupying these higher ranks. In order to account for this bias, a normalization process is applied.

Average clicks, average dwell time, and average pages viewed are calculated for each position regardless of keyword or URL combinations. These numbers are shown below as Position Averages. Average fraction clicks, dwell time and page views are also shown for this keyword, URL combination. These average fractions correspond to the percentage of each metric devoted by all machines to each keyword, URL, position grouping.

| Kwd | URL | POS | Position Average Share of Clicks | Position Average Share of Dwell Time | Position Average Share of Page Views | Average Fraction Clicks | Average Fraction Dwell Time | Average Fraction Page Views |
|---|---|---|---|---|---|---|---|---|
| 01 | 101 | 1 | 0.15 | 0.14 | 0.18 | .25 | .14 | .08 |
| 01 | 101 | 3 | 0.13 | 0.12 | 0.15 | .21 | .17 | .09 |
| 01 | 101 | 7 | 0.09 | 0.11 | 0.1 | .32 | .18 | .11 |

Inflation factors are calculated for each position and applied to the appropriate observed metrics, normalizing them for position. The normalizing equation:

$$\text{Inflation Factor For Position } n = \frac{\text{Average (Position 1)}}{\text{Average (Position } n)}$$

Clicks, dwell time, and page views in lower positions are factored up by the appropriate inflation factor observed for that particular position. In the example below, the average fraction dwell time for position 7 pre-normalization was 0.32. After the application of the inflation factor, the average fraction dwell time was 0.53. This number is now a normalized dwell time.

| Kwd | URL | POS | Clicks Inflation Factor For Position n | Dwell Time Inflation Factor For Position n | Page Views Inflation Factor For Position n | Normalized Clicks | Normalized Dwell Time | Normalized Page Views |
|---|---|---|---|---|---|---|---|---|
| 01 | 101 | 1 | 1.00 | 1.00 | 1.00 | 0.25 | 0.14 | 0.08 |
| 01 | 101 | 3 | 1.15 | 1.17 | 1.20 | 0.24 | 0.20 | 0.11 |
| 01 | 101 | 7 | 1.67 | 1.27 | 1.80 | 0.53 | 0.23 | 0.20 |

Weighted averages are calculated for each metric at each position, and totals are calculated across the positions for clicks, and all of the weighted average fraction measurements; clicks, time and page views.

Over time, with new reports of web usage from behavior watching modules, URLs for a particular keyword will adjust their positions. A URL in position 1 this week may be in position 7 the next. Adjusting for position is therefore a cleanup and adjustment process.

| Kwd | URL | POS | Absolute Clicks | Weighted Average Fraction Clicks | Weighted Average Fraction Time | Weighted Average Fraction Page Views |
|---|---|---|---|---|---|---|
| 01 | 101 | 1 | 155 | 38.75 | 21.70 | 12.40 |
| 01 | 101 | 3 | 124 | 30.05 | 24.59 | 13.39 |
| 01 | 101 | 7 | 98 | 52.27 | 22.45 | 19.40 |
| 01 | 101 | ALL | 377 | 121.06 | 68.74 | 45.20 |

The final result is the Weighted Average of Normalized Totals for Keyword 01, URL 101, at any position. Computed for every keyword, URL combination a single score is calculated for each metric needed for the ranking algorithm. These metrics are now normalized for position, and for multiple rank occurrences.

| KWD | URL | POS | Absolute Clicks | Weighted Average Fraction Clicks | Weighted Average Fraction Time | Weighted Average Fraction Page Views |
|---|---|---|---|---|---|---|
| 01 | 101 | ANY | 377 | 0.32 | 0.18 | 0.12 |

Ranks for scoring can be based on time that a user spends viewing pages on the domain. The information received from the behavior watching module may limit the maximum amount of time that will be assigned for any viewing session or it may track the user's behavior, such as window navigation between programs, mouse clicks or mouse movement, and disregard periods of inactivity when calculating dwell time.

Ranking may ignore links that were selected by users less than a predetermined number of times, which may be predetermined as a fixed number or a function of traffic for the keyword or category. Ignoring outlier links may avoid giving a high ranking to a link that was rarely presented by the search engines and followed only once or twice.

Ranks for scoring also can be based on a combination of click through rate, dwell time and the number of pages or documents viewed after following the link. Combining these factors, in some instances one of the factors will dominate: all or more than two thirds of the ranking weight may be assigned to just one of click through rate, dwell time or number of pages or documents viewed. Alternatively, they may be equally weighted, plus or minus 10%, or the factors may be assigned weighting ratios of approximately 2-1-1, plus or minus 10%, so that one factor is given approximately half of the combined weighting.

Another factor that can be used in ranking is return visits. If the user returns to the domain within a predetermined time after leaving it or within a predetermined number of navigation events, the user's return to the site can be assigned significance. Return to the site may reflect a favorable impression after considering other sites.

Conversion from browser to buyer or registered lead can considered to be particularly worthwhile as a factor. Again, conversion may include both a purchase in the domain and a registration. In some instances, such as car or home purchases, registration may be more realistic measure, because the purchase may be impractical or infrequently completed at a web site. Return conversion also may be taken into account.

Results may be segregated for analysis by search engine and ranks scored. Then, the separate rank scores may be combined into an overall ranking.

Statistical or other analysis can be applied within categories or keywords to determine which combination of ranking factors best attracts users to follow a link responsive to a search. It is anticipated that ranking information will be used differently among categories of keywords. Time spent will be important in the auto is category. Conversions will be much more important music downloads category.

Optionally, click segmentation bands may be applied. These bands give precedence to URLs with high numbers of clicks. Employing these bands may improve the resultant links on selected algorithms.

Segmentation bands are identified based upon total clicks received by a particular URL. For instance:
Tier 1: URLs with 100+ clicks
Tier 2: URLs with between 50 and 99 clicks
Tier 3: URLs with between 10 and 49 clicks
Tier 4: URLs with less than 10 clicks URLs for a particular keyword are first put into the appropriate segmentation band. Once the band is identified, these URLs are set in descending order by rank score.

A predetermined number of links, such as the top 15 links (4XX), may be selected for data collection, to be followed by a spider engine (4XX).

Three tables are generated as output from the rank process:

Keyword table (KEYWORDID, KEYWORD)
URL table (DOMAINID, URL_ID, URL)
Rank Table (keyword, URL, rank)

Following Links

Traditional crawling programs at other search engines (ex: Slurp at Yahoo!, Googlebot at Google, MSNBot at MSN) crawl the entire web in search of relevant pages to index to be used in determining the rank order of links to display for a given keyword. The embodiment disclosed here, in contrast, is given a succinct number of URLs to crawl, which may optionally be selected (405) from links reported by the behavior watching module. These links are pre-ranked, hence this information retrieval process needs not determine the relative importance of a given URL from its connections to others, but rather to obtain the best possible descriptive information from the URL.

This embodiment takes a specific set of URLs and performs several specific tasks: It strips out all HTML tags and returns first 100k or another predetermined chunk of the text on the page to a file. It takes and stores a mapping from the text object's value into a uniform scalar space to be used as a text signature or text fingerprint. It calculates an MD5 or other fingerprint of the document (with or without html tags). It calculates a summary count of the characters within the text extracted from the document.

Figure 18:
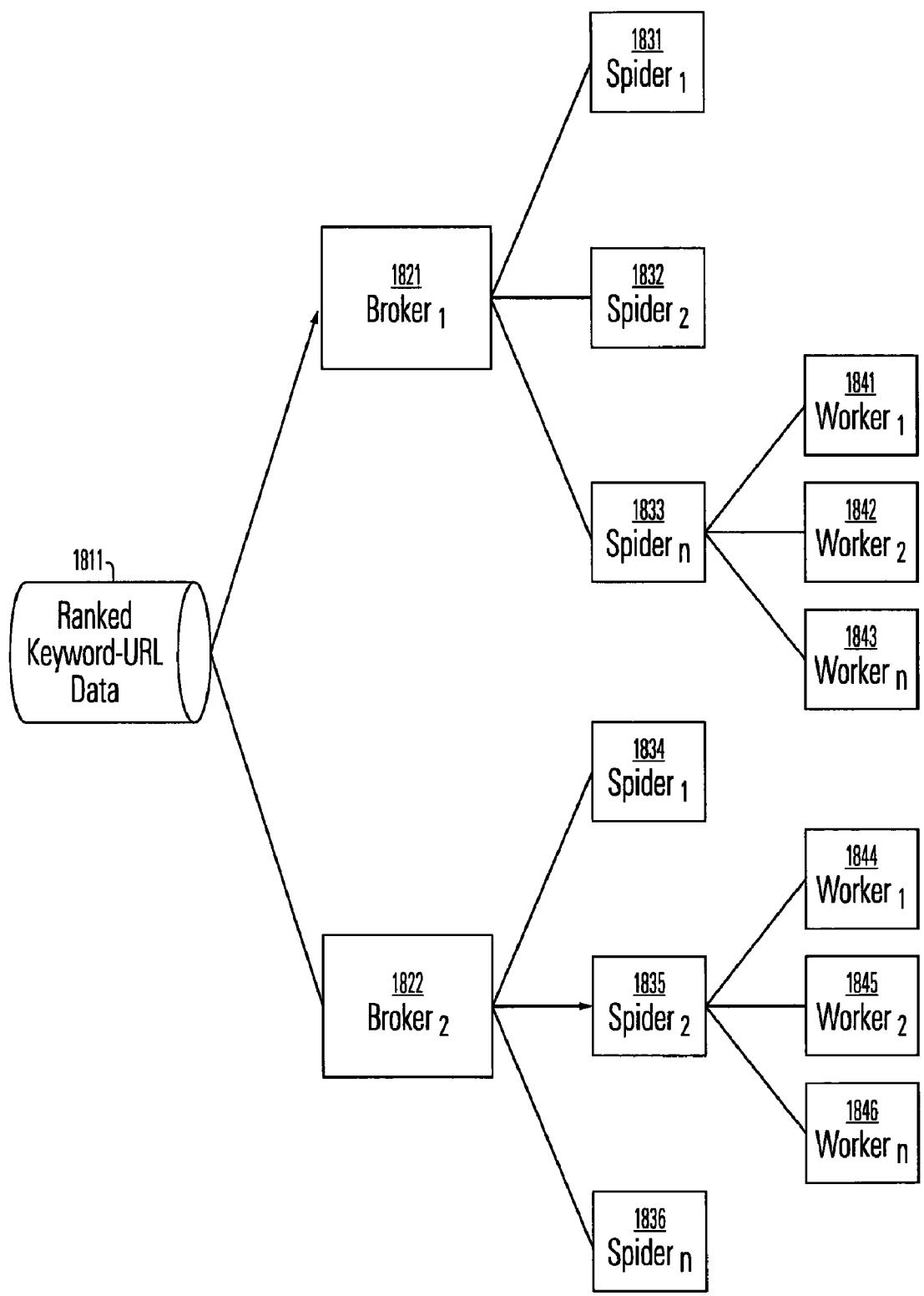
FIG. 18 shows an example of a web spider that may be implemented by a Java application operating in a Linux environment.

This method may be implemented by a Java application which operates in a Linux environment as illustrated by FIG. 18. The application (1811) is a brokered one which allows for a large and scalable number of threads to run simultaneously across multiple Linux servers. In the current configuration, each Linux server (1821, 1822) can handle up to 10 spider instances (1831-33, 1834-36). Each spider in turn runs 200 worker threads (1841-43, 1844-46). At capacity, this configuration is able to spider 800 links a second.

Total threads working for a single broker can be arrived at by the following equation: With i number of spiders each having j number of workers (threads):

$$\text{Total threads for } i \text{ \# of Spiders:} \sum_{i=1}^{n}\left(\sum_{j=1}^{n} worker_j\right)$$

The dual-broker model (1821, 1822) can segregate keywords by keyword velocity. General keywords are funneled through a robust, heavy duty version of the ranking algorithm. Fast moving keywords (e.g., news, current events) can be processed through a nimble, express version of the ranking algorithm, which uses less history. Keyword velocity is a measure of how quickly the popularity of a keyword changes. The highest velocity keywords can be selected by comparing the number of keyword searches in the last 24 hours (day 0) against the 24 hours before that (day-1). A different time span, such as four or eight hours, can be used, of course. How far the ratio day 0/day-1 varies from "1" is the keyword velocity. If the ratio is less than 1, the keyword is becoming less popular, "old news." If the ratio is much more than 1, the keyword may relate to a new story. Generally, a predetermined number of relatively high velocity keywords are re-indexed at a predetermined interval or as resources permit. In one embodiment, the top 10,000 keywords are re-indexed each day. While one metric of keyword velocity or volatility has been described, variations are anticipated.

The heavy duty version handles the ranked keyword URL pairs. These ranked keywords URL pairs are made available through an Oracle table on a database. The URL_TABLE includes: DOMAINID, URLID, URL, LENGTH, SIGNATURE_H, SIGNATURE_T, SPIDER_DATE and HOST The DOMAINID, URLID, and URL fields are populated from a reference database prior to following the links. After the link-following process for a specific URL, the LENGTH, SIGNATURE_H, SIGNATURE_T, SPIDERDATE, and HOST fields are written back to the database.

Brokers use Java Database Connectivity (JDBC) to connect in to the Oracle database. The broker accesses the URL_TABLE from the ranking-process. The broker makes a request for ¹⁄₁₀₀th of the total number of domains which are available in the URL table for which SPIDER_DATE is null. All URLs associated with these domains are extracted by the broker where they are grouped by domain. Individual spider boxes talk to the Broker via Remote Method Invocation (RMI) requesting URLs for domains 1,000 domains at a time. Domains are then passed from the spider to a worker who takes all of the URLs associated with its domain and operates upon those URLs.

URLs are passed to the workers grouped by domain in order to accommodate generally accepted crawling or link following practices so as not to swamp domains with thousands of requests simultaneously. It is a generally accepted practice to not access a single domain with more than one request at a time. The link following process (406) respects this generally accepted principle by assigning each worker all URLs associated with a given domain.

The link following process (406) is a robust, scalable, application which fetches content and calculates statistics from a specific URL. Once a worker receives a domain and its associated URLs, it accesses that URL using HTTP protocols. If a good response code is received, a link following worker goes to work on that page. The worker receives a 200 response code (status OK) more than 98% of the time. If the page returns an HTTP code indicating a redirect (codes 301, 302, 303 and 307), further action must be taken by the worker or system in order to obtain information about that URL. A worker will follow up to 5 redirects from an initial URL before abandoning. Once the worker reaches an end point, the following tasks take place: Acquire HTTP return code from the URL. If a good response code is acquired: Identify title meta tag if available; calculate an MD5 fingerprint of the entire document (both HTML and text); parse HTML from the page; and write back first 1,000 k of text to disk.

Once the content is parsed and written back to the disk, a subsequent operator takes over. This operator makes several calculations used for the document fingerprint and writes those and other statistics back to the Oracle database. The system writes back the following fields to Oracle: URL_TABLE, DOMAINID, URLID, URL, LENGTH, SIGNATURE_H, SIGNATURE_T, SPIDER_DATE and HOST.

LENGTH is a count of characters in the text of the document (first 1,000 k). This feature can be used for de-duping URLs later in the process (408). SIGNATURE_H is the MD5 hash code signature. SIGNATURE_T is a CRC32 checksum code of the text (first 1000 k). SPIDER_DATE indicates the date and time that the particular URL was accessed. HOST pertains to which spider machine stored the text of the URL.

The following system may create three different measures designed to aid in document de-duplication (409). This de-duplication process aims at identifying documents that are identical or very similar within a given keyword result set. In a prior step not separately shown, URLs are de-duped at the URL level. Easily identified duplicates such as two occurrences of the exact same URL are eliminated. The system attempts to eliminate URLs that do not appear to point to the same page, but in fact do. In one embodiment, mathematical signatures (fingerprints) are taken for each URL and compared to other URLs within a given keyword result set. Three exemplary signatures are a length signature, an MD5 signature and a CRC32 checksum. Other signatures may be substituted.

For the length signature, the character length of the text document is calculated. This measure aids in the de-duping process to aid in giving context to a page which has been identified as a duplicate. For instance, if two sites show identical MD5 and CRC32 signatures, but have very disparate URLs, the signature is analyzed. If the length signature is low, meaning the page is small, it is likely that these two URLs share, for instance, a standard warning screen as would be found prior to entering an adult content site.

An MD5 signature typically is a way to verify data integrity. The MD5 algorithm takes as input a message of arbitrary length and produces as output a 128-bit "fingerprint" or "message digest" of the input. The MD5 algorithm is intended for digital signature applications, where a large file must be "compressed" in a secure manner. The system computes an MD5 signature for the entire document, reducing the identity comparison process to a 128-bit comparison, for instance.

A CRC32 checksum generates the cyclic redundancy checksum polynomial of 32-bit lengths. This is usually used to validate the integrity of data being transmitted. The CRC is a "digital fingerprint" of a file, With CRC32 you can "melt down" a huge 20 MB (or even much bigger) file to have a small, handy reference to it, a single 32-bit number like 7d9c42fb (hexadecimal notation) which reflects the entire contents of this huge file. The system computes a CRC32 signature of the text of the document, giving insights into the text content of the page.

Another signature that can be calculated and used is Rabin's fingerprinting algorithm, for instance Broeder's implementation, which produces a compact checksum.

Any of the checksums or fingerprints can be applied to the whole document, the whole document less HTML tags stripped away, the selected chunk of the document that is cached, the title and snippets or some other predetermined excerpt from the document. More or less than 1,000 k of the document can be used.

The process completes a run for a particular URL with data being written to an Oracle database and a spider box. The Oracle database receives fingerprint information (length, MD5, crc32), spider date/time, and host location information written to URL_TABLE and a spider date/time stamp written to KEYWORD table. The spider box receives files for data links that it followed: URL, title (if it was obtained during the initial fetch from the URL) and text of the document (first 1,000 k) to be used for snippet generation. The text contains elements of the meta description and the body of the document Snippet Generation A snippet generation process generates titles and snippets for display (407). The snippet process takes a keyword phrase and URL combination, comes up with the best title describing that URL, and creates the best snippet (i.e., abstract, description) for that URL outlining in a 200 character space the information contained in the URL that pertains to the keyword. Snippet generation follows the link following process. Snippets are created from the text of the document retrieved from the chosen URL.

The keyword "somec bicycles" produces the following sample text for display:

---
Upland Sports Group: Somec Bicycle Frames

... is a mystique to Italian bicycles; an aura born of precision, innovative materials and artistry. Societa Mecchanica, better known as Somec, has contributed to ...
www.uplandsg.com/somec/ - 12k - Aug 17, 2004 - Cached - Similar pages
---

In this example, the title is "Upland Sports . . . Frames". The snippet is the two lines following the title. The URL is on the bottom line.

Titles are usually generated from the title of the page retrieved when a link is followed. Most sites annotate the title of the page for search engines through the use of HTML meta tags. A tag identifying the title is present on over 97% of all URLs.

In the 3% of URLs for which the HTML tags do not supply a title, the process composes a title. If there is text available for the URL, the process takes the first approximately 70 characters of text (respecting word boundaries) and creates a title. If there was no text generated from the URL, the domain name is stripped from the URL (all information between www and .com) and displayed as the title.

Snippet generation is a mix of art and science. The process creates snippets leveraging mathematical equations and linguistic science. In one embodiment, snippets can be comprised of 1 single sub-snippet, or up to 3 sub-snippets separated by ellipses (. . . ). A scoring algorithm decides which sub-snippets when combined (or not in the case of a single sub-snippet) produce the best score.

The snippet scoring algorithm is a multi-step process which scores various portions of the document's text. In four parts, it includes keyword tokenization, window scoring, window trading and final determination.

Keyword tokenization is applied because keywords are not always single words. Keywords are often multi-word phrases. The process tokenizes or single outs individual words within a phrase. Identifying individual word tokens typically includes searching for word separators such as spaces, periods, commas, or colon/semicolons. Once the tokenization of the keyword phrase is complete, the window scoring routine can commence.

In one version of window scoring, windows of three different sizes are calculated within the text of the document, for instance, for sub-snippet of lengths 200 characters, 100 characters and 66 characters. FIG. 20 depicts how the window scoring routine begins with the first word of text (2003) within the document(2001). In the first case, the window spans 200 characters. This window receives a score based upon several metrics. Once the score is calculated, the window moves 1 character to the right and calculates another score for the next window. Alternatively, the window may move one word to the right, aligning either the window start or window end with word boundaries. This process iterates (2004, 2005) until a score for the final window is obtained. Intelligence may be built into the algorithm to eliminate the need to compute the score for each entire window, but rather add the additional information to the previous window's score and subtract the information which was lost in the move.

When the process is complete, there may exist:
  i windows of length 200 (where i=document length–200)
  j windows of length 100 (where j=document length–100)
  k windows of length 66 (where k=document length–66)

Window scoring may be based on one or more metrics, such as the number of unique tokens found within the window, the total number of tokens found within the window, and/or the longest string of tokens found within the window. A formula for each window is computed from a combination of these metrics and assigned to that window.

In the case where there is one 200 character snippet, the window with the highest score is chosen. The two highest scoring windows of length 100 are chosen for the two sub-snippet model. The three highest scoring windows of length 66 are chosen for the three sub-snippet model.

The best scores are calculated for each model (1, 2, or 3 sub-snippets). A final algorithm may be applied when 2 or 3 windows are eligible for a snippet. If the global window score can be increased by one window giving up characters to another, then that action is seen as a gain and it is taken. If the global window score cannot be raised in this manner, the snippets are used without trading.

The output from snippet generation may include 5 different scores: Score of single sub-snippet model; score of non-traded two sub-snippet model; score of traded two sub-snippet model; score of the non-traded three sub-snippet model; and/or score of the traded three sub-snippet model. Of these, the single highest score is chosen and that sub-snippet model is applied to that keyword, URL combination.

For a sample keyword="red dog run", the following steps may be followed:

Step 1: Tokenize keyword into three tokens:

---
Token1 = red
Token2 = dog
Token3 = run
---

Step 2a: Locate instances of the tokens within the text document

```
-------red----------dog--------dog---------
-----run-------red----------red-------------
-------red-dog-run---------dog-----------
---run----red-------run----run------------
```

Step 2b: Score the windows and identify the top ones. In this example, the three sub-snippet model, the best 3 windows were calculated.

```
-------red----------dog--------dog---------
[------run------red--]---------red-------------       (1)
---[----red-dog-run--]-------dog-----------           (2)
--run-----[-red-----run---]-run------------           (3)
```

Step 3: Allow for trading to occur. In this case, if window 1 can give up some of the non-token containing characters within it's left edge to window 3. This allows window 3 to expand and include the final token 'run', increasing the overall global score of the snippet.

```
-------red----------dog--------dog---------
------[run------red--]---------red-------------       (1)
---[----red-dog-run--]-------dog-----------           (2)
---run-----[-red-----run----run]------------          (3)
```

In an alternative embodiment, the snippet generation process may involve the creation of an approximately 200 byte field used as a descriptor for the associated link. Snippet generation takes place post spidering and is created from the complete text of the document associated with the chosen URL or at least the portion of the document stored.

Personalization (410) and Ranking

Within the ranking algorithm, there is the ability to select anonymous users who, based upon their behavioral profile, would have their votes for particular categories of links count more than other users.

Users who are heavy searchers (based upon their observed search behavior) would have their votes count more on links that they click more than the votes of novice searchers on that same link. In this way, the search experts would help produce more relevant ranking results.

Similarly, users who are highly involved in a particular category would have their votes count higher in that category than users who have no involvement in that category. Using behavior watching modules, one can identify users who are highly involved in various categories such as digital cameras, fantasy sports, or automobiles. For example, a user identified as being highly involved in the digital camera category would have his vote count more for links he clicked after a search for 'Cannon G3' than a user who is new to the category searching on that same keyword.

Identification of a user's category involvement status also drives personalization. A user with a high degree of involvement in a particular category would get different results from a user identified as less involved. This personalized results serving would require the presence of a cookie like object available on a particular machine. This lifestyle cookie would provide the search engine with a behavioral profile of the user, obtained from the users category navigational patterns. These category specific navigational patterns would be obtained from information contained in a categorization structure that also can be used for targeted advertising. For commercial purposes, a budget category or likely budget can be inferred from sites visited. Visitors to IKEA and Target are likely to have a different budget for apparel than visitors to Sachs Fifth Avenue or Bloomingdale's. Similarly, Hyatt Hotels are in a different budget category than youth hostels.

Personalization based on observed communications is much more powerful than user-entered customization, because research shows that only 8-14 percent of users manually personalized their content. Personalization highly correlates with pages viewed at a domain: users who personalize have been reported to view 130 percent more pages at the domain than users who do not personalize.

Sometimes different behavioral profiles can be leveraged to make a difference in search results (411). Other times, differences between two users' behavioral profiles does not help in the context of a particular search keyword.

Some examples are helpful. First, an ambiguous search terms example: A highly involved auto category user who searches for "jaguar" would get more Jaguar auto related links than jaguar animal related links as compared to a normal mix of auto and animal related links for someone with no identifiable category involvement. Identification and usage of these behaviorally profiles could slant results, without completely replacing results. In the example above, the auto category involved user could get 100% auto results, or just a larger percentage of auto results than found among popular websites.

Next, a sub-category identification example: Three users search for the keyword "rental, car". Three separate sets of results come up, each personalized for the users. Each user has a particular behavioral profile obtained from their past navigational patterns observed within the travel category. These behaviors are readily identifiable from the observed communications.

User 1: Frequent business traveler—his rental car results would be slanted toward the business traveler car rental results, possibly more about frequent rental points, etc.

User 2: Budget traveler—his rental car results would be slanted toward the budget traveler; rent-a-wreck type results, specials on sub-compact cars etc.

User 3: Luxury Traveler—his rental car results would be slanted toward the high-end luxury traveler; sports car rentals, classic car rentals, etc.

FIG. 12 compares the insight that a behavior watching module on a user's machine gives regarding web surfing with the limited view that a server can achieve. These statistics were generated to compare what a Yahoo! server knows about user behavior, compared to what the behavior watching module sees. The x-axis 1202 identifies categories of web sites. The y-axis is a relative scale, with Yahoo! server observation scaled to "1". In each stack, Yahoo! 1203 has a visibility of 1. The behavior watching module has a relative score 1204 that is higher and varies strongly between categories. This surprising degree of difference strongly distinguishes the on-machine behavior watching module from visibility that even a widely used search engine with many affiliated sites can achieve.

FIG. 13 depicts a web page highly relevant to the keyword "cars". Applying a ranking algorithm, the CarsDirect home page scores 97 of 100. Factors used to calculate this score can be categorized by initial visit metrics, subsequent visit metrics and user level metrics. Observing users' response to this site being listed in search results of various search engines responsive to the keyword "cars", the behavior watching module observed a click through rate of 12 percent. An average user viewed five pages at this web site, following the initial link, before they left the site. The average user spent 55 seconds looking at the pages and the conversion rate, here a registration more likely than a purchase, was 80 percent. On subsequent occasions, within a predetermined time after the search or the first visit, an average returnee viewed 15 pages and spent 300 seconds on the site. Returnees registered with a conversion rate by 15 percent. Among users following this link for this keyword, category (e.g., car category) involvement was high, ranked "Expert". Search engine usage was "Maven", indicating that common users were more frequent than computer experts. For this category, among U.S. users, the geographic location of the web site was important. Bet sites in the U.S. were more interesting to users (e.g., car buyers) than overseas web sites.

Figure 14:
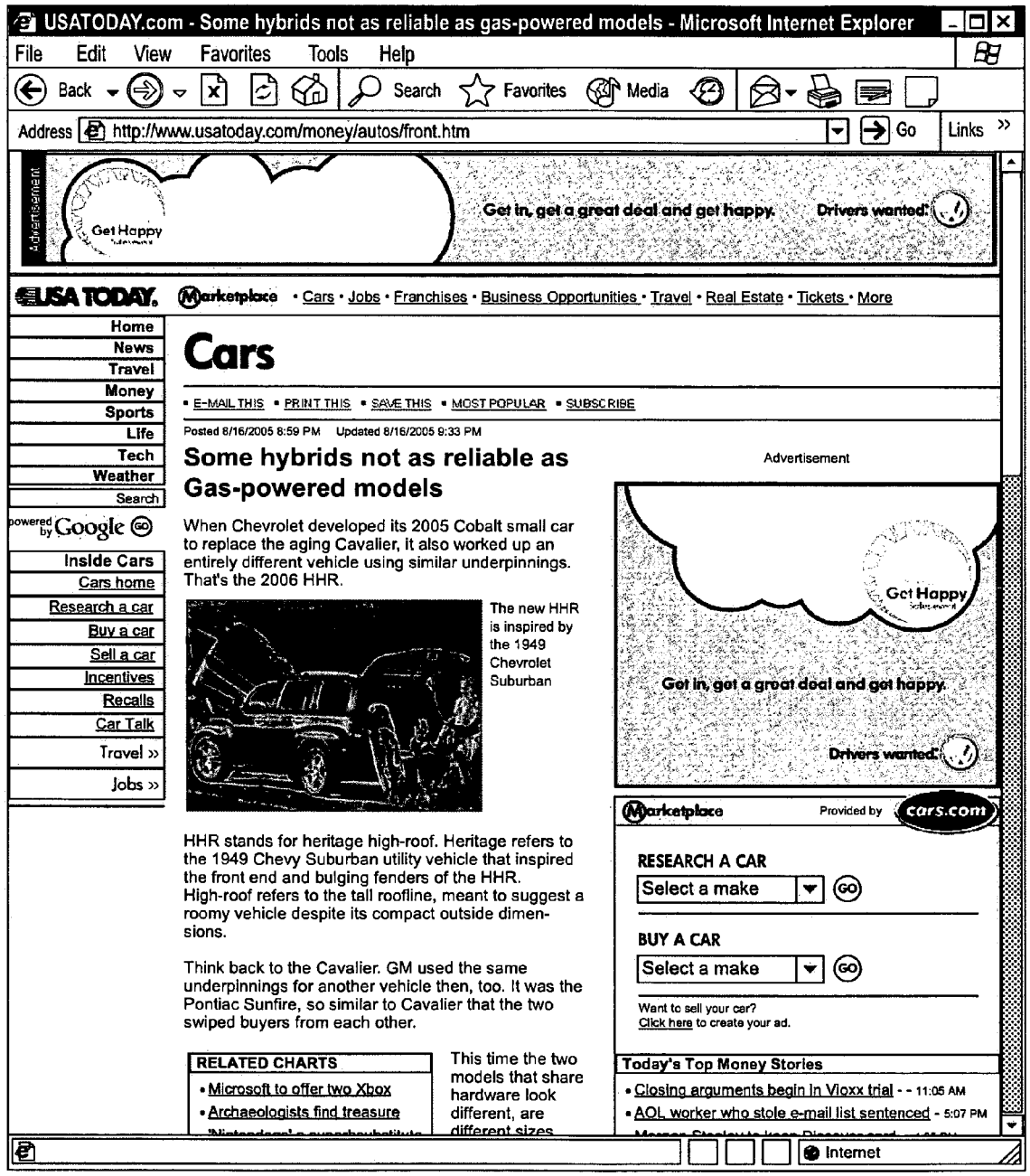
FIG. 14 is a counter example of a page weakly relevant to "cars".

FIG. 14 is a counter example of a page weakly relevant to "cars". The title of this article matches the keyword, but the click through rate and other metrics indicate that users considered this page much less relevant to searching for "cars" than the CarsDirect home page. The calculated relevancy score for this page is only 11.

Figure 15:
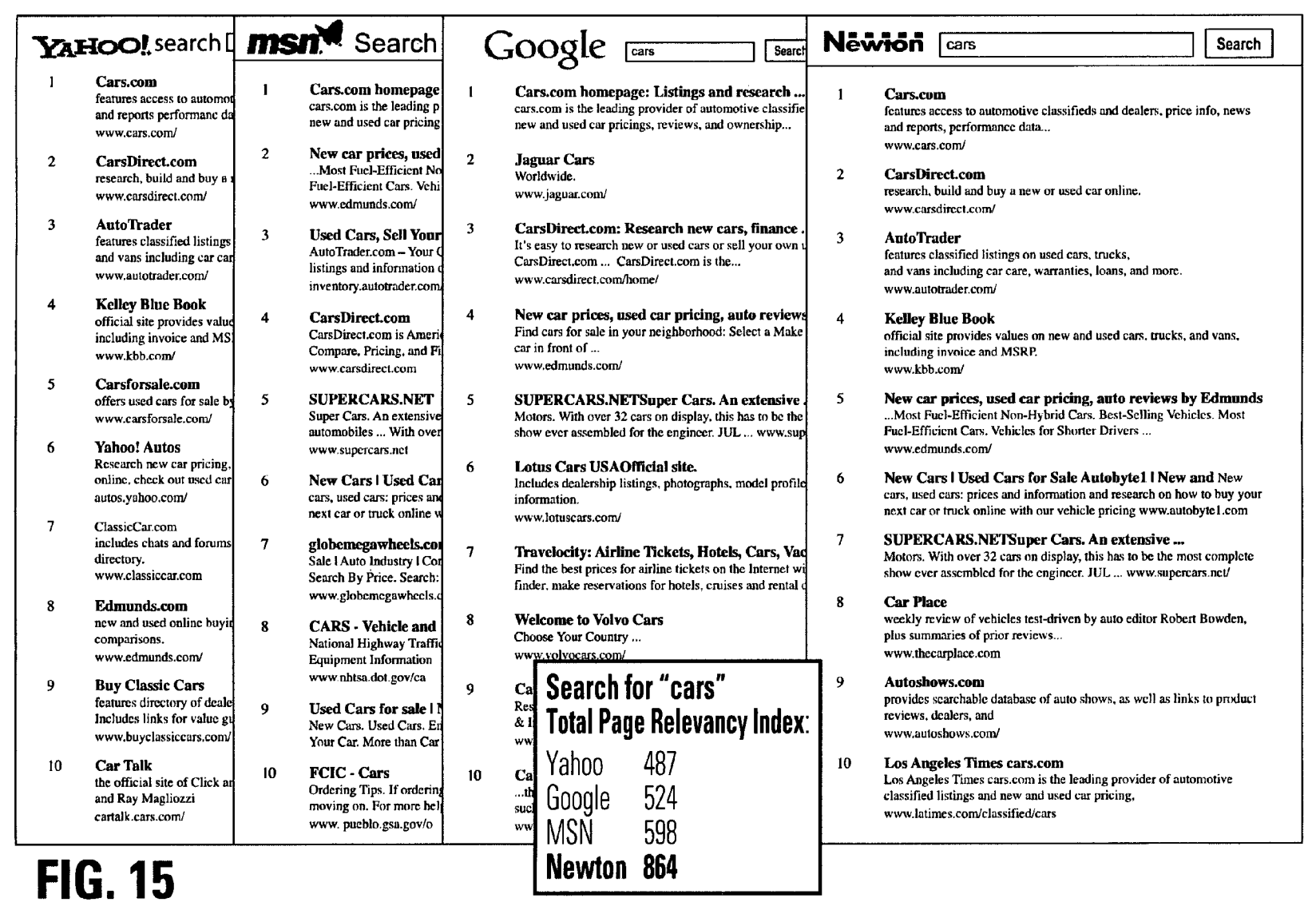

FIG. 15 juxtaposes the results for "cars" from Yahoo!, MSN Search and Google with an embodiment of the search engine described herein. Using a relevancy index, this embodiment produces more relevant search results. The relevancy index is the ranking score, which reflects users' responses to links in search result lists. The relative scores are this embodiment 864, MSN 598, Google 524 and Yahoo! 487. This significantly improved score strongly distinguishes the use of an on-machine behavior watching module and the aggregate of a multitude of users from the ranking algorithms of the leading search engines.

FIG. 16 illustrates user differentiation using results from a behavior watching module. A large sample of user behavior, particularly shopping in the apparel category, is reported in this figure. Users were classified in nine boxes along attributes of amount of browsing in the category (1601) and degree of loyalty (1602) to a particular web domain (alternatively, to a vendor, brand or other category). Amount of browsing was classified as light, medium or heavy. One quarter of users were in each of the heavy and medium usage categories and the remaining half in the light usage category. Loyalty is classified as loyal, a switcher among sources or loyal to competitors. The 3-by-3 arrangement of attributes produces nine boxes. Among loyal shoppers, about one million unique observations were made. The heavy users had a higher click through rate when a particular result was displayed in response to a search, the rate being 7.90%, compared to 5.40% for medium users and just 3.00% for light users. After a click-through event, heavy users converted to purchase or registration at a rate of 8.00%, compared to 7.20% for medium users and 6.50% for light users. Not surprisingly, there are more switchers and competitive loyal unique observations than for the particular domain observed. Personalization of content, such as ads, may depend on which of the nine boxes the user fits. For instance, a loyal, heavy user will get a different message (a la frequent flier programs) than a medium to light switcher. A competitor-loyal heavy user might get a trial offer that would be completely misdirected to a loyal user. The strategy for advertising a heavy, loyal user is to insulate them from competitors. For medium to light loyal users, the strategy may target up-selling and cross-selling. For heavy to medium switchers, the objective is to increase share. Heavy to medium competitive loyal users are targeted for acquisition. Light switchers and light competitive loyal users may be ignored, to focus advertising resources.

Return visit data from the behavior watching module can assist an advertiser in measuring the effectiveness of a particular ad. User differentiation by box can further be associated with selection of ads and evaluation of ad effectiveness.

Cross-browsing of users also can be reported. Users can be selected by follow-through, for instance all click-throughs or all users with conversions. The users with a conversion at a particular domain (or vendor or brand, for instance) can be rated by the frequency of their visits to competitors' domains (or vendors or brands).

FIG. 17 depicts traffic to a particular domain, from a particular search engine, by keyword. This information may be useful to a company devising ads and also when bidding on keywords for sponsored content positioning on search engine result pages. Data from the behavior watching module can yield impressions, click, click-through rate, conversion rate and position on the search engine's results page.

Some Particular Embodiments

The present invention may be practiced as a method or device adapted to practice the method. The same method can be viewed from the perspective of a user at their terminal or personal computer or on the server side, collecting information from users. The invention may be an article of manufacture such as media impressed with logic to carry out computer-assisted method.

A device embodiment, from the user perspective, may be embodied in a module running on the user's computer and collecting behavioral observations, coupled to a server that responds to the behavioral observations with information personalized to the user.

While the present invention is disclosed by reference to the preferred embodiments and examples detailed above, it is understood that these examples are intended in an illustrative rather than in a limiting sense. Computer-assisted processing is implicated in the described embodiments. Accordingly, the present invention may be embodied in methods aggregating of communication patterns, pre-processing links responsive to keyword searches, responding to keyword searches using aggregated communication patterns to rank the responsive links, and responding to keyword searches using recent and current navigation information systems to resolve ambiguities and/or personalize responses based on user characteristics. Other embodiments, as devices, include logic and resources to carry out these methods. As systems, still other embodiments include behavior watching modules on terminals, servers that process or respond to the behavioral data, or both. Other embodiments include media impressed with logic to carry out the methods, data streams impressed with logic to carry out the methods, or computer-accessible services that carry out the methods. It is contemplated that modifications and combinations will readily occur to those skilled in the art, which modifications and combinations will be within the spirit of the invention and the scope of the following claims.

A further embodiment is a method resolving ambiguity in a keyword search terms submitted by user to a search engine. This method includes receiving, from a behavior watching module operating on the user's computer, information regarding the user's recent navigation behavior. The navigation behavior includes accessing documents that are not all associated with a particular server-side behavior data collection network and further includes at least one of a mouse click-through, enter key stroke or other selection action and at least one keyword derived from context of the selection action. The server determines a plurality of interest categories to which the search term plausibly belongs and selects among the plurality of interest categories using the recent navigation information.

One aspect of the behavior watching modules operation is that it may categorize behaviors by interest categories and recency. The documents accessed may be web pages and the server-side behavior data collection network may be an advertising network.

From this perspective of the behavior watching module, this embodiment may be practiced as a method of supplementing a search request with information that reflects a user's recent navigation behavior among documents accessible via a network. This method includes operating a behavior watching module on the users computer, collecting information regarding the users recent navigation behavior. The recent navigation behavior information includes at least identifying documents electronically accessed by the user; categorizing the documents accessed; and indicating when documents in the categories were accessed. The behavior watching module submits at least a summary of the recent navigation behavior information along with a query to one or more servers including a search engine. The user receives from the search engine a set of results by asked to an interest category corresponding to the submitted recent navigation behavior information. Alternatively, the user may receive from the search engine a set of results by us to a budget category corresponding to the submitted recent navigation behavior information. More generally, any category that can be discerned from the recent navigation behavior can be reflected in a bias of search engine results received in response to the query.

Another embodiment is a method of personalizing content in response to a keyword search term submitted by a user to a search engine. As with the disambiguation method above, this method includes receiving, from a behavior watching module operating on the user's computer, information regarding the user's recent navigation behavior. The navigation behavior includes accessing documents that are not all associated with a particular server-side behavior data collection network and further includes at least one of a mouse click-through, enter key stroke or other selection action and at least one keyword derived from context of the selection action. The server determines a plurality of likely budget categories to which results belong and selects among the likely budget categories using the recent navigation information.

For embodiments using recent navigation behavior, the navigation behavior may reflect recent navigations, including navigations with in the last hour and the last day. Alternatively, it may include recent navigations within periods of time determined to correlate to user responsiveness to information. The user navigation information may be summarized into interest categories were likely budget categories when it is received or after it is received. More generally, any category that can be discerned from the recent navigation behavior can be reflected in a bias of search engine results received in response to the query.

The embodiments and various aspects of the embodiments described above may be practiced as a machine readable memory including instructions to carry out the methods and aspects of methods described or a data stream including the machine-readable instructions. Further, a device may include one or more servers, personal computers or other computer devices having logic and resources adapted to practice the methods and aspects of methods described.

We claim as follows:

1. A method of resolving ambiguity in a keyword search term submitted to a search engine, the method comprising:
   (A) receiving, from a client-side behavior watching module operating on a computer system, recent navigation information regarding recent navigation behavior on the computer system, said navigation information including behavioral data and at least one keyword;
   (B) checking the at least one keyword against a list of commercial terms;
   (C) based at least in part on said checking in (B), determining whether the at least one keyword is a commercial keyword;
   (D) if the at least one keyword is determined in (C) to be a commercial keyword:
   (d1) assigning the at least one keyword a keyword ID;
   (d2) generating a first data structure that includes the keyword ID, the behavioral data, and a domain ID that corresponds to a domain of a search location; and
   (d3) loading the first data structure into a first section of a data warehouse that is associated with commercial keywords;
   (E) if the at least one keyword is not determined in (C) to be a commercial keyword:
   (e1) assigning the at least one keyword an other ID;
   (e2) generating a second data structure that includes the other ID, the behavioral data, and a domain ID that corresponds to a domain of a search location; and
   (e3) loading the second data structure into a second section of a data warehouse that is associated with non-commercial keywords;
   (F) ranking links associated with the at least one keyword with results from client-side behavior watching modules on other computer systems; and
   (G) preferentially providing higher ranked commercial links in response to relevant search criteria.

2. The method of claim 1, wherein the recent navigation information is categorized by interest categories and by recency of behavior.

3. The method of claim 1, wherein the recent navigation information includes data regarding accessing documents that are not all associated with a particular server-side behavior data collection network.

4. The method of claim 3, wherein the documents are web pages and the server-side behavior data collection network is an advertising network.

5. The method of claim 1, wherein the keyword is derived from context of a selection action.

6. The method of claim 1, further comprising assigning the keyword another keyword ID if the keyword is determined to be noncommercial.

7. The method of claim 1, further comprising:
   identifying a conversion associated with an online purchase or registration made in response to an advertisement; and
   using the conversion as a factor in ranking the links.

8. The method of claim 1, further comprising:
   determining that the keyword search term is submitted from a heavy searcher using the collected information; and
   weighting the results from the client-side behavior watching module more heavily when ranking links because the keyword search term is submitted from a heavy searcher.

9. The method of claim 1, further comprising:
   determining that the keyword search term is submitted among a high degree of involvement in a particular category using the collected information; and
   weighting the results from the client-side behavior watching module more heavily when ranking links associated with the particular category because the keyword search term is submitted among a high degree of involvement in the particular category.

10. The method of claim 1 wherein the client-side behavior watching module is browser independent.

11. The method of claim 1 wherein the client-side behavior watching module is separate from a web browser.

12. The method of claim 1 wherein the client-side behavior watching module runs independently of browser programs on the computer system.

13. A method of supplementing a search request with information that reflects recent navigation behavior among documents accessible via a network, the method comprising:
(A) operating a client-side behavior watching module on a computer system to collect recent navigation behavior information regarding recent navigation behavior, wherein the recent navigation behavior information collected includes:
 (i) identification of documents electronically accessed;
 (ii) categorization of the documents electronically accessed into various categories;
 (iii) an indication of when documents in the various categories were electronically accessed; and
 (iv) data sufficient to identify a conversion from an online purchase or registration in response to an advertisement;
(B) submitting at least a summary of the recent navigation behavior information along with a query including a keyword to one or more servers with a search engine, the summary including identification of the conversion in the data sufficient to identify a conversion; and
(C) in response to said submitting in (B), receiving from the search engine a list of results biased to an interest category corresponding to the submitted recent navigation behavior information and ranked using results from multiple client-side behavior watching modules on other computer systems, wherein the list of results comprises higher ranked commercial links in response to relevant search criteria of the query if the keyword is associated with the conversion.

14. The method of claim 13, further including the behavior watching module filtering the documents accessed and categorizing the indication of when the categories were accessed.

15. The method of claim 13, wherein the keyword is derived from context of a selection action.

16. The method of claim 13 wherein the list of results is generated based, at least in part, on whether or not the keyword corresponds to a commercial keyword.

17. The method of claim 16 further comprising:
determining whether or not the keyword corresponds to a commercial keyword.

18. The method of claim 13 wherein the client-side behavior watching module is browser independent.

19. The method of claim 13 wherein the client-side behavior watching module is separate from a web browser.

20. The method of claim 13 wherein the client-side behavior watching module runs independently of browser programs on the computer system.

21. A method of resolving ambiguity in a keyword search term submitted to a search engine, the method comprising:
receiving, from a client-side behavior watching module operating on a computer system, recent navigation information, including a keyword and behavioral data, regarding recent navigation behavior on the computer system;
checking the keyword against a list of commercial terms;
determining whether the keyword is commercial;
if the keyword is determined to be commercial:
assigning the keyword a keyword ID;
generating a first data structure that includes the keyword ID, the behavioral data, and a domain ID that corresponds to a domain of a search location; and
loading the first data structure into a first section of a data warehouse that is associated with commercial keywords;
if the keyword is determined to be non-commercial:
assigning the keyword an other ID;
generating a second data structure that includes the other ID, the behavioral data, and a domain ID that corresponds to a domain of a search location; and
loading the second data structure into a second section of a data warehouse that is associated with non-commercial keywords;
ranking links associated with the keyword with results from client-side behavior watching modules on other computer systems; and
preferentially providing higher ranked commercial links in response to relevant search criteria.

22. A computer-readable storage medium having stored thereon computer-executable instructions that configure a computing device on execution to:
receive, from a client-side behavior watching module operating on a computer system, recent navigation information regarding recent navigation behavior on the computer system, said navigation information including behavioral data and a keyword;
check the keyword against a list of commercial terms;
based at least in part on the check, determine whether the keyword is a commercial keyword;
if the keyword is determined to be a commercial keyword:
assign the keyword a keyword ID; and
generate a first data structure that includes the keyword ID, the behavioral data, and a domain ID that corresponds to a domain of a search location;
rank links associated with the keyword with results of other navigation behavior; and
preferentially provide higher ranked commercial links in response to relevant search criteria.

23. A computer-readable storage medium having stored thereon computer-executable instructions that configure a computing device on execution to:
collect recent navigation behavior information regarding recent navigation behavior, wherein the recent navigation behavior information collected includes:
identification of documents electronically accessed;
categorization of the documents electronically accessed into various categories;
an indication of when documents in the various categories were electronically accessed; and
data sufficient to identify a conversion from an online purchase or registration in response to an advertisement;
submit at least a summary of the recent navigation behavior information along with a query including a keyword to one or more servers with a search engine, the summary including identification of the conversion in the data sufficient to identify a conversion; and
in response to said submitting, receive from the search engine a list of results biased to an interest category corresponding to the submitted recent navigation behavior information and ranked using results from multiple client-side behavior watching modules on other computer systems, wherein the list of results comprises higher ranked commercial links in response to relevant search criteria of the query if the keyword is associated with the conversion.

* * * * *

UNITED STATES PATENT AND TRADEMARK OFFICE
CERTIFICATE OF CORRECTION

PATENT NO. : 8,255,413 B2
APPLICATION NO. : 11/207590
DATED : August 28, 2012
INVENTOR(S) : Bennett et al.

It is certified that error appears in the above-identified patent and that said Letters Patent is hereby corrected as shown below:

Title Page;

On Page 6, in Item (56), under "FOREIGN PATENT DOCUMENTS", in Column 2, Line 5, delete "EP 1207468 5/2002".

On Page 7, in Item (56), under "FOREIGN PATENT DOCUMENTS", in Column 1, Line 13, delete "JP 2002334104 11/2002".

On Page 7, in Item (56), under "OTHER PUBLICATIONS", in Column 1, Line 1, delete "al:" and insert -- al.: --, therefor.

On Page 7, in Item (56), under "OTHER PUBLICATIONS", in Column 1, Line 6, delete "Probalistic" and insert -- Probabilistic --, therefor.

On Page 7, in Item (56), under "OTHER PUBLICATIONS", in Column 1, Line 27, delete "Exporations," and insert -- Explorations, --, therefor.

On Page 7, in Item (56), under "OTHER PUBLICATIONS", in Column 2, Lines 5-6, delete "Bac, Sung Min, et al., "Fuzzy............. Nov./Dec. 2003, pp. 62-69.".

On Page 7, in Item (56), under "OTHER PUBLICATIONS", in Column 2, Line 22, delete "intemet:" and insert -- internet: --, therefor.

On Page 7, in Item (56), under "OTHER PUBLICATIONS", in Column 2, Lines 28-30, delete "Diligenti, Michelangelo et al. 2004............... IEEE, vol. 16, No. 1. Jan. 2004, pp. 4-16.".

On Page 8, in Item (56), under "OTHER PUBLICATIONS", in Column 1, Lines 1-2, delete "Gralla, Preston, How the Internet.............. pp. 254 and 266-271.".

Signed and Sealed this
Seventh Day of May, 2013

Teresa Stanek Rea
*Acting Director of the United States Patent and Trademark Office*

CERTIFICATE OF CORRECTION (continued)
U.S. Pat. No. 8,255,413 B2

On Page 8, in Item (56), under "OTHER PUBLICATIONS", in Column 1, Lines 3-5, delete "Greening, Dan R., "Tracking Users:............ pp. 1-9.".

On Page 8, in Item (56), under "OTHER PUBLICATIONS", in Column 1, Line 48, delete "Wrtitten" and insert -- Written --, therefor.

On Page 8, in Item (56), under "OTHER PUBLICATIONS", in Column 2, Line 1, delete "12," and insert -- 19, --, therefor.

On Page 8, in Item (56), under "OTHER PUBLICATIONS", in Column 2, Lines 4-6, delete "Ishitani, Lucila, et al., "Masks:.............. pp. 18-23.".

On Page 8, in Item (56), under "OTHER PUBLICATIONS", in Column 2, Lines 27-28, delete "Lee, Ching-Cheng, et al., "Category-Based.................. pp. 621-625.".

On Page 8, in Item (56), under "OTHER PUBLICATIONS", in Column 2, Lines 29-30, delete "Leuski, Anton et al. 2000. Lighthouse:.............. pp. 125-129.".

On Page 8, in Item (56), under "OTHER PUBLICATIONS", in Column 2, Line 57, delete "intemet" and insert -- internet --, therefor.

On Page 9, in Item (56), under "OTHER PUBLICATIONS", in Column 1, Line 53, delete "Offie" and insert -- Office --, therefor.

On Page 9, in Item (56), under "OTHER PUBLICATIONS", in Column 1, Lines 66-68, delete "Payton, D., et al. 1999. Dynamic................ pp. 1-8.".

On Page 9, in Item (56), under "OTHER PUBLICATIONS", in Column 2, Lines 30-32, delete "Srivastava, Jaideep, et al., "Web Usage................ pp. 12-23.".

On Page 10, in Item (56), under "OTHER PUBLICATIONS", in Column 2, Line 10, delete "Jul. 30, 2002 p. 0037-0047 (downloaded." and insert -- Jul. 31, 2002 p. 0037-0047 (downloaded). --, therefor.

On Page 10, in Item (56), under "OTHER PUBLICATIONS", in Column 2, Line 32, delete "plublished" and insert -- published --, therefor.

On Page 10, in Item (56), under "OTHER PUBLICATIONS", in Column 2, Line 34, delete "et al." and insert -- et al., --, therefor.

On Page 10, in Item (56), under "OTHER PUBLICATIONS", in Column 2, Line 37, delete "Toronta," and insert -- Toronto, --, therefor.

On Page 10, in Item (56), under "OTHER PUBLICATIONS", in Column 2, Line 57, delete "coM/get/nopops.shtml>." and insert -- com/get/nopops.shtml>. --, therefor.

In the Specifications:

In Column 2, Line 10, delete "Interpreation" and insert -- Interpretation --, therefor.

In Column 3, Line 1, delete "FIG. 16," and insert -- FIG. 16 --, therefor.

In Column 3, Line 27, delete "e.g.," and insert -- (e.g., --, therefor.

In Column 5, Line 20, delete "ore" and insert -- or --, therefor.

In Column 5, Line 58, delete "far" and insert -- for --, therefor.

In Column 5, Line 62, delete "sever" and insert -- server --, therefor.

In Column 6, Line 30, delete "client-sever" and insert -- client-server --, therefor.

In Column 6, Line 47, delete "(ie.," and insert -- (i.e., --, therefor.

In Column 7, Line 43, delete "far" and insert -- for --, therefor.

In Column 11, Line 39, delete "and-maintain" and insert -- and maintain --, therefor.

In Column 11, Line 50, delete "http://www.bmwmotorcycles.com" and insert -- http://www.bmwmotorcycles.com. --, therefor.

In Column 12, Line 45, delete "(402" and insert -- (402) --, therefor.

In Column 12, Line 60, delete "threshold" and insert -- threshold. --, therefor.

In Column 13, Line 4, delete "gamer" and insert -- garner --, therefor.

In Column 16, Line 37, delete "(ex:" and insert -- (e.g., --, therefor.

In Column 16, Line 43, delete "selected (405)" and insert -- selected --, therefor.

In Column 17, Line 35, delete "HOST" and insert -- HOST. --, therefor.

In Column 19, Lines 18-19, delete "document" and insert -- document. --, therefor.

In Column 20, Line 31, delete "length-66)" and insert -- length-66). --, therefor.

In Column 24, Line 44, delete "thes" and insert -- these --, therefor.